(12) United States Patent
Danelli et al.

(10) Patent No.: US 11,098,830 B2
(45) Date of Patent: Aug. 24, 2021

(54) QUICK CONNECTOR WITH SEMI-INTEGRATED CARTRIDGE

(71) Applicant: FASTER S.R.L., Rivolta d'Adda (IT)

(72) Inventors: Alessandro Danelli, Brignano Gera d'Adda (IT); Roberto Sorbi, Rivolta d'Adda (IT)

(73) Assignee: FASTER S.R.L., Rivolta d'Adda (IT)

( * ) Notice: Subject to any disclaimer, the term of this patent is extended or adjusted under 35 U.S.C. 154(b) by 52 days.

(21) Appl. No.: 16/634,779

(22) PCT Filed: Jul. 31, 2017

(86) PCT No.: PCT/IB2017/054662
§ 371 (c)(1),
(2) Date: Jan. 28, 2020

(87) PCT Pub. No.: WO2019/025830
PCT Pub. Date: Feb. 7, 2019

(65) Prior Publication Data
US 2020/0340608 A1    Oct. 29, 2020

(51) Int. Cl.
*F16L 37/28* (2006.01)
*F16L 29/00* (2006.01)
(Continued)

(52) U.S. Cl.
CPC ............. *F16L 29/007* (2013.01); *F16L 37/28* (2013.01); *F16L 37/30* (2013.01); *F16L 37/146* (2013.01); *F16L 2201/20* (2013.01)

(58) Field of Classification Search
CPC .......... F16L 37/28; F16L 37/30; F16L 29/007
(Continued)

(56) References Cited

U.S. PATENT DOCUMENTS

| 4,881,573 A | * | 11/1989 | Durant et al. | ........... F16L 37/23 137/614.04 |
| 5,429,155 A | * | 7/1995 | Brzyski et al. | ......... F16L 37/35 137/614.04 |

(Continued)

FOREIGN PATENT DOCUMENTS

| WO | 2006/108622 A1 | 10/2006 |
| WO | 2011/044489 A1 | 4/2011 |

OTHER PUBLICATIONS

PCT/IB2018/055967—International Search Report and Written Opinion. dated Nov. 27, 2018.

*Primary Examiner* — Kevin L Lee
(74) *Attorney, Agent, or Firm* — Abelman, Frayne & Schwab

(57) ABSTRACT

A female coupling for a fluid quick connector and configured to be removably connected to a male coupling of the connector. The female coupling includes a valve assembly with a valve alternating between closed and open positions. The flow of a fluid from the female coupling towards the male coupling occurs in the open position. The female coupling includes a hollow body defining an inner cavity with a longitudinal axis for the flow of the fluid. The female valve assembly is housed in the inner cavity. The hollow body includes an end portion configured to be housed in a housing seat of an interface manifold. With the end portion in the housing seat, the tubular inner cavity is placed in fluid connection with at least one inner channel of the interface manifold. A constraint prevents rotation/translation of the end portion of the hollow body with respect to the housing seat.

7 Claims, 55 Drawing Sheets

(51) Int. Cl.
*F16L 37/30* (2006.01)
*F16L 37/14* (2006.01)

(58) Field of Classification Search
USPC ........................................ 137/614.03–614.05
See application file for complete search history.

(56) References Cited

U.S. PATENT DOCUMENTS

| | | | |
|---|---|---|---|
| 5,975,756 A | 11/1999 | Jones | |
| 7,458,400 B2* | 12/2008 | Weh et al. | B67D 7/425 |
| | | | 141/347 |
| 10,704,719 B2* | 7/2020 | Canzi | F16K 11/185 |
| 2012/0181465 A1* | 7/2012 | Rusconi | F16L 37/36 |
| | | | 251/149.6 |

* cited by examiner

QUICK CONNECTOR WITH SEMI-INTEGRATED CARTRIDGE

CROSS-REFERENCE TO RELATED APPLICATIONS

This application claims priority to PCT application no. PCT/IB2017/054662, filed Jul. 31, 2018, the contents of which is incorporated by reference in its entirety.

TECHNICAL FIELD

The present invention relates to the field of quick connectors for hydrodynamic and/or pneumatic applications, in particular for hydraulic and/or pneumatic circuits and the like. In particular, the present invention relates to a coupling for quick connectors of the type disclosed above and to a connector assembly equipped with said coupling. In detail, the present invention relates to solutions for equipping a connector assembly with at least one coupling in a semi-integrated mode. Even more in detail, the present invention relates to solutions for equipping a connector assembly with at least one coupling in a semi-integrated mode and to allow the use of the at least one coupling according to advantageous modes which are not possible in the case of the known couplings.

Background Art

Quick connectors for reciprocally connecting hydraulic circuits by means of flexible pipes are known in prior art. For example, quick connectors of the push-pull type are known for reciprocally connecting the hydraulic circuits of a main tractor and of a tool, respectively, wherein the connection and the disconnection of the female and male couplings is obtained by means of pushing and pulling actions, respectively. Furthermore, the female and male couplings of the quick connectors of the push-pull type are shaped so that the mechanical connection (by pushing, usually on the male coupling) of the female and male couplings results in the automatic positioning of the respective valve assemblies in the opening position (and thus in the hydraulic connection, so that the fluid flow between the two female and male couplings is possible), while the disconnection (by pulling, usually on the male coupling) of the female and male couplings results in the automatic repositioning of the female and male valve assemblies in the respective closing positions (in which the hydraulic circuits are closed and separate and the fluid flow between the two female and male couplings is not possible).

Manifolds with integrated cartridges (usually female couplings) and provided with a lever are known as well, wherein in this case the connection and disconnection methods of the respective male coupling envisage the actuation of the lever with respective actuation (switching) of the component parts provided for the respective constraining of the male and female couplings and possibly with respective repositioning of the respective valve assemblies.

In practice, the known systems may be essentially of two types, wherein the systems of a first type are commonly known as simple interface manifolds, whereas the systems of the second type are known as blocks with cartridges and integrated lever.

A simple interface manifold substantially consists of a block (generally made of cast-iron), comprises an interface to be connected to the distributor of a hydraulic circuit and inner channels for the passage of oil (one for each hydraulic line) which each terminate with a threaded end into which the quick coupling (generally the female part) is screwed.

A manifold with cartridges and integrated lever substantially consists of a block (generally made of cast-iron), comprises an interface to be connected to the distributor of a hydraulic circuit, inner channels for the passage of oil (one for each hydraulic line) and a seat appropriately shaped to house inside a cartridge (completely integrated and usually of female type) and a lever for actuating the cartridge.

The advantages offered by the simple interface manifolds comprise:

Central oil flow (which guarantees lower loss of load);
Ease of replacement of the quick coupling in case of malfunctioning;
Possibility of using a wide range of couplings.

The advantages offered by the manifolds with integrated cartridges comprise: the possibility of actuating the lever to reduce the connection/disconnection efforts; the possibility of recovering the oil by virtue of a possibly decompressed (cleaned) oil recovery system directly integrated in the block.

Although appreciable in consideration of the advantages and/or the opportunities offered and summarized above, however none of the known system types are entirely free from disadvantages and/or drawbacks.

For example, the manifolds with integrated cartridges necessarily require the provision of specific channels in which the oil passes in a radial manner with respect to the cartridge itself, creating turbulence on the oil flow and thereby greater loss of load.

Furthermore, the provision of the lever with respective maneuvering space is often disadvantageous if not unfeasible, in the case of small-size equipment.

On the other hand, in the case of simple interface manifolds, the disconnection of the male and female couplings may be difficult if not impossible (unless with long and difficult supplementary operations), if there is residual pressure in both couplings, this problem being indeed overcome by virtue of the lever provided in the case of manifolds with integrated cartridges.

The risk of accidental movement or displacement of the female valve assembly from the opening position (even in the coupling or reciprocal connection condition of the male and female couplings) is well known, e.g. as a consequence of the fluid flow inversion, in particular in the case of push-pull connectors, where the accidental displacement of the female valve assembly results in a displacement of the male valve assembly from the opening position to the closing position, with consequent discontinuity between the two hydraulic circuits (connected to the female coupling and to the male coupling, respectively), which obviously, in turn, causes an interruption of the fluid flow, where the equipment or tool is thus no longer hydraulically assisted by the hydraulic circuit of the main operating machine.

Different are the solutions suggested in the prior art for overcoming or at least minimizing the risk of accidental movement of the female valve assembly and thus of accidental closing of the male valve assembly. For example, hydraulic type solutions are known, in which the female valve assembly is locked in the opening position by means of a secondary hydraulic circuit. However, said solutions of the hydraulic type are much more costly and complicated, and thus often incompatible with market needs.

Mechanical type solutions have been alternatively suggested (alternatively to manifolds with integrated cartridges and lever), i.e. in which the female valve assembly is automatically locked in opening position by means of a mechanical device as result of the reciprocal coupling of the male and female couplings. Said solutions of the mechanical type are also not free from drawbacks and/or contraindications.

In particular, the main drawback is related to the fact that being the lock mechanism necessarily accommodated inside the female coupling, the often excessive dimensions of the locking mechanism often results in an acceptable increase of the dimensions of the female coupling for the most common applications.

A further drawback relates to the structural complexity of the mechanical mechanism, which often comprehends a very high number of component parts, where the high number of components parts often inevitably results in an unacceptable increase of manufacturing costs, in particular of assembly costs, and equally often into a reduced reliability of the locking mechanism, with consequent increased need for maintenance operations.

DESCRIPTION OF THE PRESENT INVENTION

It is the object of the present invention to overcome or at least minimize the drawbacks affecting the solutions according to the prior art, in particular both simple interface manifolds and those with integrated cartridges.

In particular, it is an object or goal of the present invention to achieve a solution which allows to combine the advantages offered by both the simple interface manifolds and those with integrated cartridge and lever in a single system.

In detail, the system according to the present invention shall:

allow the central flow of oil or fluid in general (and thus guarantee less loss of load) which today is only possible in simple interface manifolds;

allow the replacement of the quick coupling (e.g. in case of malfunctioning), in a simple and immediate manner;

offer the possibility of using and exchanging a wide range of couplings, in particular of ISO 7241 couplings and ISO 16028 couplings (of the agri or flat face type);

offer the possibility of using couplings of the same type (and/or referred to the same ISO standard), but with different sizes (e.g. size ½" or ¾");

allow both the connection and the disconnection also in the presence of residual pressure in one or both couplings and without using the lever (today possible exclusively in the case of manifolds with integrated cartridges by actuating the lever);

allow the connection and disconnection both with and without the actuation of the lever;

allow the recovery of the possibly decompressed (clean) oil;

facilitate and simplify the connection and disconnection operations in general;

guarantee a reliable connection without the risks of accidental disconnection;

allow to provide a compact system of small dimensions and low cost, which can be installed on a wide range of equipment according to simple and equally low cost methods.

In consideration of the disadvantages affecting the solutions according to the prior art and the objects outlined above, innovative cartridges and a system are suggested according to the present invention, in which, unlike the standard couplings (which are usually screwed into the cast-iron block), said innovative cartridges are partially inserted in the cast-iron block and fixed according to equally innovative methods, e.g. by means of one or more side pins.

This type of fixing and a specific slot obtained in the rear part thereof allow its actuation by means of a lever (also present in the block), where the lever also helps to reduce the connection/disconnection efforts.

According to a variant embodiment, decompression niches and respective seals (in the rear part) are envisaged on the coupling and cartridge to allow the coupling in case of residual pressure inside the cartridge.

Such a feature (present today only in some types of couplings) allows to recover the decompressed oil with a system directly integrated in the block.

Furthermore, according to the present invention, the male coupling can be disconnected in case of residual pressure with the help of the lever or alternatively by pulling, according to methods similar to the push-pull type, by means of some special components (ring and ring slider).

Again in consideration of both the drawbacks affecting the solutions according to the prior art and the set objects, the present invention relates to a female coupling for a hydraulic and/or pneumatic quick connector, said female coupling being adapted to be alternatively connected to and disconnected from a corresponding male coupling of said connector, said female coupling comprising a female valve assembly adapted to be translated alternatively between a first closing position and a second opening position, where the flow of a fluid is possible from the inside of said female coupling outwards and from the outside inwards with said female valve assembly in said second opening position, where said female coupling comprises a hollow main body, which defines a first inner passage with a longitudinal extension axis for the flow of said fluid, said female valve assembly being housed in said first inner passage of said hollow main body, said hollow main body comprising a first end portion adapted to be housed in a first housing seat of an interface manifold, where with said first end portion of said hollow main body in said first housing seat, said first inner passage of the hollow main body is placed in fluid connection with at least one inner channel of said interface manifold, said female coupling comprising mechanical constraining means for mutually constraining said first end portion of said hollow main body in said first housing seat, where said mechanical constraining means are shaped so as to prevent both the rotation and the translation of said hollow main body with respect to said first housing seat.

According to an embodiment, said mechanical constraining means are shaped so as to prevent both the rotation of said hollow main body with respect to any rotation axis substantially parallel to said longitudinal symmetry axis of said first inner passage and the translation of said hollow main body along any direction substantially parallel to said longitudinal symmetry axis of said first inner passage. According to an embodiment, said mechanical constraining means comprise an engagement seat defined by said first end portion of said hollow main body and adapted to be engaged by a pin or peg-shaped constraining member when it is inserted in a second housing seat of said interface manifold.

According to an embodiment, said engagement seat of said first end portion comprises a groove which extends in depth from the outer surface of said first end portion of said hollow main body and along a direction which is substantially perpendicular to said longitudinal symmetry axis of said first inner passage of said hollow main body.

According to an embodiment, said female valve assembly comprises a hollow inner body housed in said first inner passage of said hollow main body which can translate with respect to said hollow main body, where said hollow inner body defines a second inner passage coaxial and in fluid communication with said first inner passage, and where the translation of said hollow inner body with respect to said hollow main body in a first translation direction results in the translation of said female valve assembly towards said second opening position, whereas the translation of said hollow inner body with respect to the hollow main body in a second translation direction opposite to the first results in the translation of said female valve group towards said first closing position, furthermore, where said first hollow inner body comprises switching means which can be engaged from the outside of said hollow main body to translate said hollow inner body in at least one translation direction.

According to an embodiment, said switching means comprise a protrusion which extends from the outer surface of said hollow inner body, where said hollow main body comprises a through opening across which said protrusion can be accessed from the outside of said hollow main body.

According to an embodiment, said protrusion has an annular shape and defines an engagement surface substantially perpendicular to said longitudinal symmetry axis of said first inner cavity of the hollow main body, where said engagement surface can be engaged by a lever which can be rotated with respect to a rotation axis substantially perpendicular with respect to said longitudinal symmetry axis of said first inner passage of said hollow main body, where the rotation of said lever in a first rotation direction results in the translation of said hollow inner body in said first rotation direction.

The present invention further relates to a connection kit for a hydraulic and/or pneumatic quick connector, said kit comprising a female coupling according to one of the embodiments of the present invention summarized above and/or described in detail below, said kit comprising a constraining member adapted to be alternatively inserted in and removed from a second housing seat of the interface manifold and to engage said engaging seat of said first end portion of said hollow main body when it is at least partially inserted in said second housing seat of said interface manifold.

According to an embodiment, said constraining member is pin or peg-shaped.

The present invention further relates to a hydraulic and/or pneumatic connector assembly, said assembly comprising an interface manifold which defines a first housing seat, said assembly comprises a female coupling according to one of the embodiments of the present invention summarized above and/or described below, where said hollow main body comprises a first end portion housed in said housing seat of said interface manifold, where said first inner cavity of said hollow main body is placed in fluid connection with at least one inner channel of said interface manifold, said female coupling comprising mechanical constraining means for mutually constraining said first end portion of said hollow main body in said first housing seat, and thus where said mechanical constraining means are shaped so as to prevent both the rotation and the translation of said hollow main body with respect to the first housing seat.

According to an embodiment, said interface manifold comprises a second housing seat in which said pin or peg-shaped constraining member is housed, where said engagement seat of said first end portion comprises a groove which extends in depth from the outer surface of said first end portion of said hollow main body and along a direction which is substantially perpendicular to said longitudinal symmetry axis of said first inner passage of said hollow main body, and where said groove is engaged by a portion of the pin or peg-shaped constraining member which extends from said second housing seat of said interface manifold.

According to an embodiment, said assembly comprises a switching lever constrained to and partially housed in said interface manifold, where said lever is adapted to be rotated with respect to a rotation axis which is substantially perpendicular with respect to said longitudinal symmetry axis of said first inner passage of said hollow main body, where the rotation of said lever in a first rotation direction results in the translation of said hollow inner body in said first rotation direction.

According to an embodiment, said lever comprises a grip external to said interface manifold and an engagement leg housed inside said interface manifold, where said engagement leg extends through said through opening of said hollow main body, thus where the rotation of said lever in said first rotation direction results in said annular protrusion of said hollow inner body by said engagement leg, and thus into the translation of said hollow inner body in said first translation direction.

According to an embodiment, said assembly comprises elastic contrasting means housed inside said interface manifold, where the rotation of said lever in said first rotation direction occurs against the elastic bias applied by said elastic contrast means.

According to an embodiment, said elastic contrasting means comprise a helical spring, where said lever comprises a second leg which extends in direction opposite to said first leg, and in that said helical spring is engaged by said second leg.

Further possible embodiments of the present invention are defined in the claims.

BRIEF DESCRIPTION OF THE DRAWINGS

Hereinafter, the present invention will be explained by means of the following detailed description of the embodiments depicted in the drawings. However, the present invention is not limited to the embodiments described hereinafter and depicted in the drawings; on the contrary, all the variants of the embodiments described below and shown in the drawings which will become apparent to those skilled in the art fall within the scope of the invention.

In the drawings:

Figure 1:
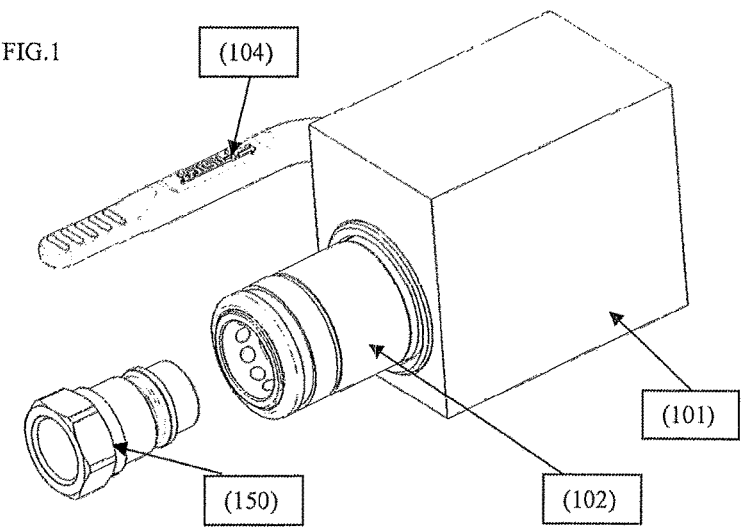
Figure 2:
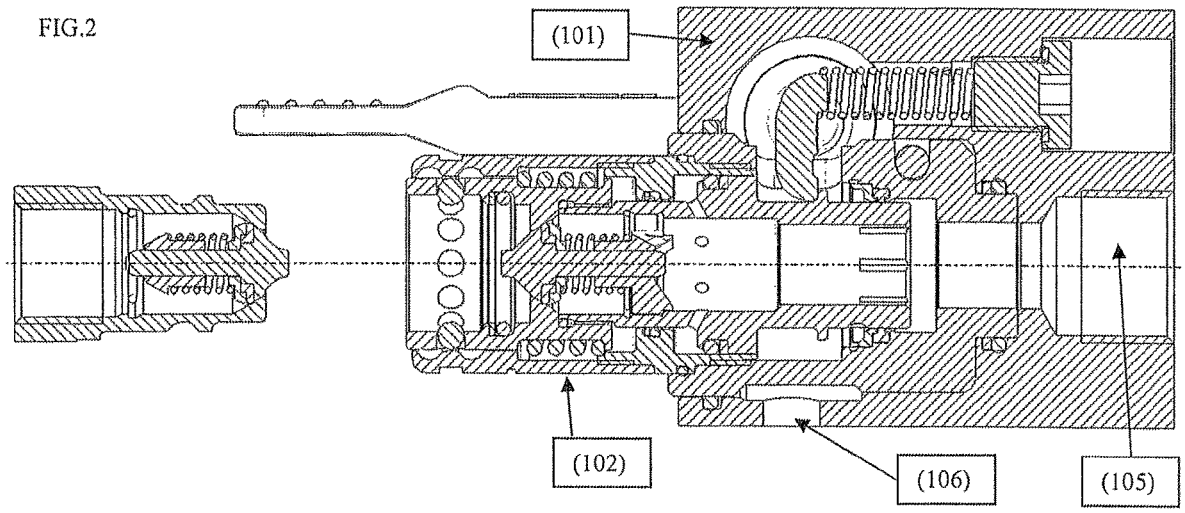
Figure 3:
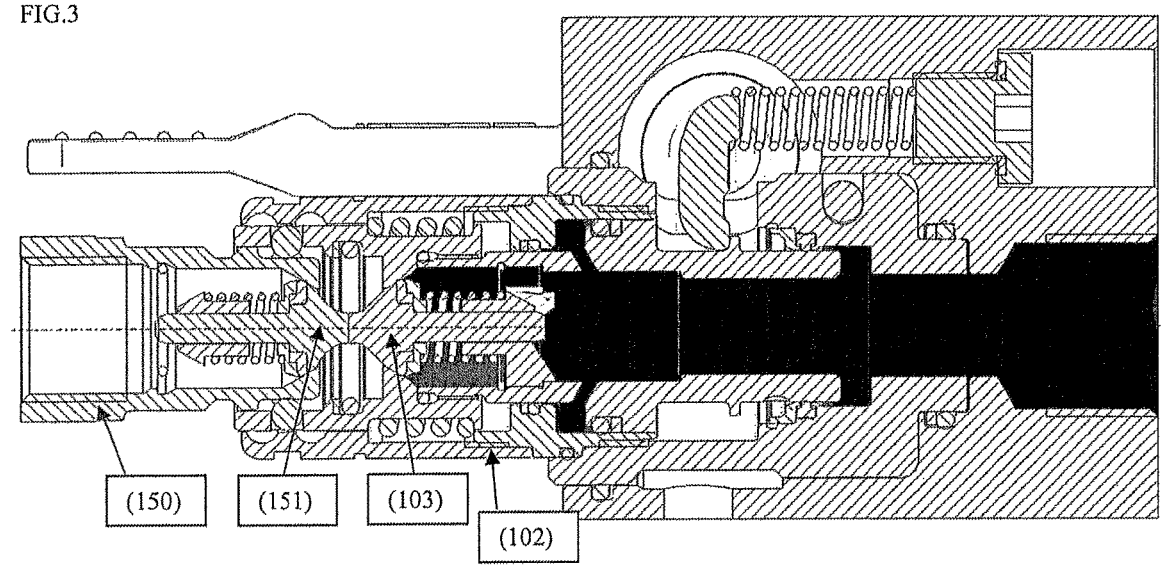

figures from 1 to 18 show a perspective view and section views of a female coupling according to an embodiment of the present invention and of a male coupling according to standard ISO 7241 during the various steps of connecting and/or disconnecting;

figures from 19 to 32 show section views of the main component parts of a female coupling according to an embodiment of the present invention and of a male coupling according to standard ISO 7241 during the various steps of connecting and/or disconnecting;

figures from 33 to 48 show perspective views of the main component parts of a female coupling according to an embodiment of the present invention and of a male coupling according to standard ISO 7241 during the various steps of connecting and/or disconnecting;

figures from 49 to 60 show section views of a female coupling according to an embodiment of the present invention and of a male coupling according to standard ISO 16028 during the various steps of connecting and/or disconnecting;

figures from 61 to 73 show section views of a female coupling according to an embodiment of the present invention and of a male coupling according to standard ISO 16028 during the various steps of connecting and/or disconnecting.

DETAILED DESCRIPTION OF THE PRESENT INVENTION

In figures from 1 to 18, the illustrated female member or coupling (hereinafter also referred to as a cartridge) according to the embodiment of the present invention is identified by reference numeral 102; the cartridge 102 is constrained to an interface manifold 101, where an end portion of the cartridge 102 is housed in the manifold 101 (in a corresponding housing seat, see the description below), while a second end portion protrudes from the manifold 101, this being substantially the reason for which the coupling 102 may also be defined hereinafter as "semi-integrated" (in the manifold 101). In the figures, reference numeral 150 identifies a male coupling, in the particular but not limiting case according to standard ISO 7241, adapted to be alternatively connected to and disconnected from the female coupling 102. As shown, the manifold defines an inner channel 105, where the female coupling 102, when it is inserted as shown (and according to innovative particularities described in detail below), is placed in fluid communication with the channel 105, where the coupling 102, by means of the manifold 101, is placed in fluid communication with a hydraulic (or also pneumatic) circuit (not shown). Obviously, the number of inner channels 105 defined by the manifold 101 (and thus of female couplings applicable to the manifold), such as the shape and size of the manifold 101, may vary according to the applications and/or needs and/or circumstances. The female coupling 102 comprises a main hollow assembly or body which defines a first inner cavity 1001 which, with the semi-integrated coupling 102 in the manifold 101 is placed in fluid communication with the channel 105, the fluid flow in the coupling 102 thus being central (or of axial type). The cavity 1001 has tubular conformation (substantially cylindrical, minus negligible imperfections and/or irregularities and/or asymmetric working) and thus defines a longitudinal axis A; hereinafter, axis A will be referred to either as an "extension" or "symmetry" axis. The hollow main body comprises an adapter 118 (nearly completely housed in a corresponding seat of the manifold 101), a connector 111 fixed to the adapter 118 by means of an interface threading, and a ring 110, fixed in turn to the connector 111 by means of an interface threading. A hollow inner body is housed in the hollow main body which defines a second inner cavity 1002; the cavity 1002 also has tubular conformation (substantially cylindrical, minus negligible imperfections and/or irregularities and/or asymmetric working) and thus defines a longitudinal axis coinciding with axis A; hereinafter, said axis A will also be referred to as either an "extension" or "symmetry" axis.

The hollow inner body comprises a balancing piston 112 and a ball body 108 fixed to the piston 112 by means of an interface threading, the hollow inner body, being translatable inside the hollow main body along a direction substantially parallel to axis A in the two opposite translation directions, from the left rightwards and from the right leftwards with respect to the figures. In particular, as described in greater detail hereinafter, the translation of the piston 112 results in a translation in the same translation direction as the ball body 108.

The various connection and disconnection methods of the male coupling 150 and of the female coupling 102 will be described below, with reference to figures from 1 to 18.

FIG. "3" shows a first step of connecting of the male coupling 150 in the cartridge 102. During this step, the valve 151 of the male coupling 150 enters into contact with the valve 103 of the cartridge 102. The dark part in the figure indicates the presence of pressure in the cartridge 102.

Figure 4:
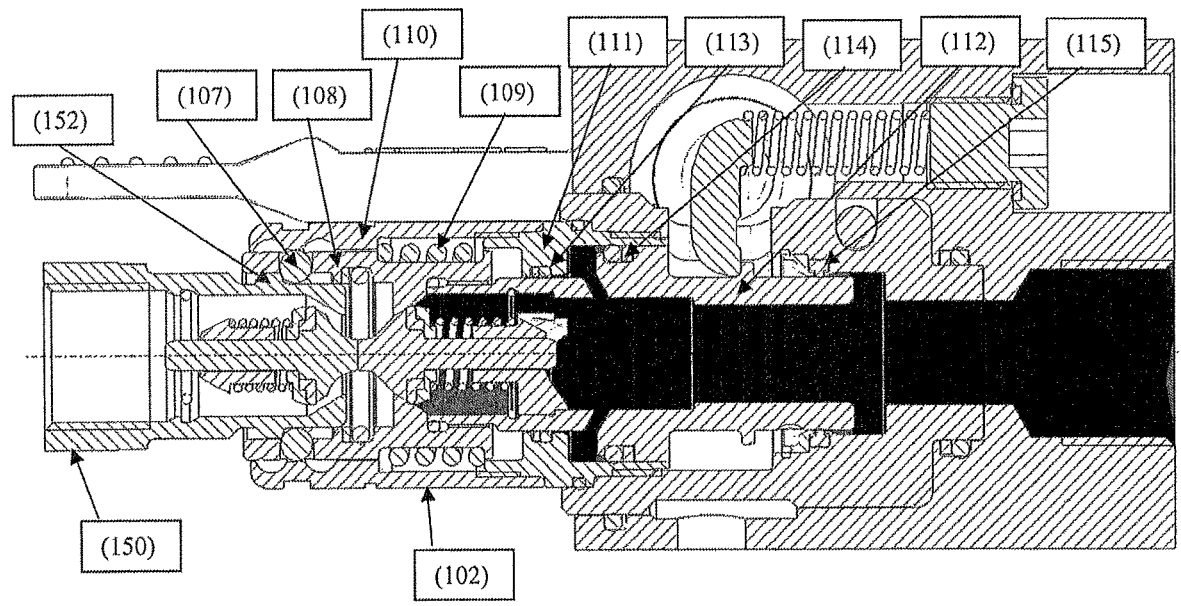

FIG. 4 shows how, proceeding with the step of connecting, the pin 152 of the male coupling 150 enters into contact with the balls 107 of the cartridge 102. The balls are contained in specific holes obtained in the ball body 108, the ball body 108 being held in position by the spring 109 which works between an abutment of the ring 110 and a rest on the central connector 111. As mentioned, the balancing piston 112 is connected by means of a threaded coupling to the ball body 108. Said balancing piston 112 is hydraulically balanced by virtue of the particular arrangement of the seals 113, 114 and 115.

Figure 5:
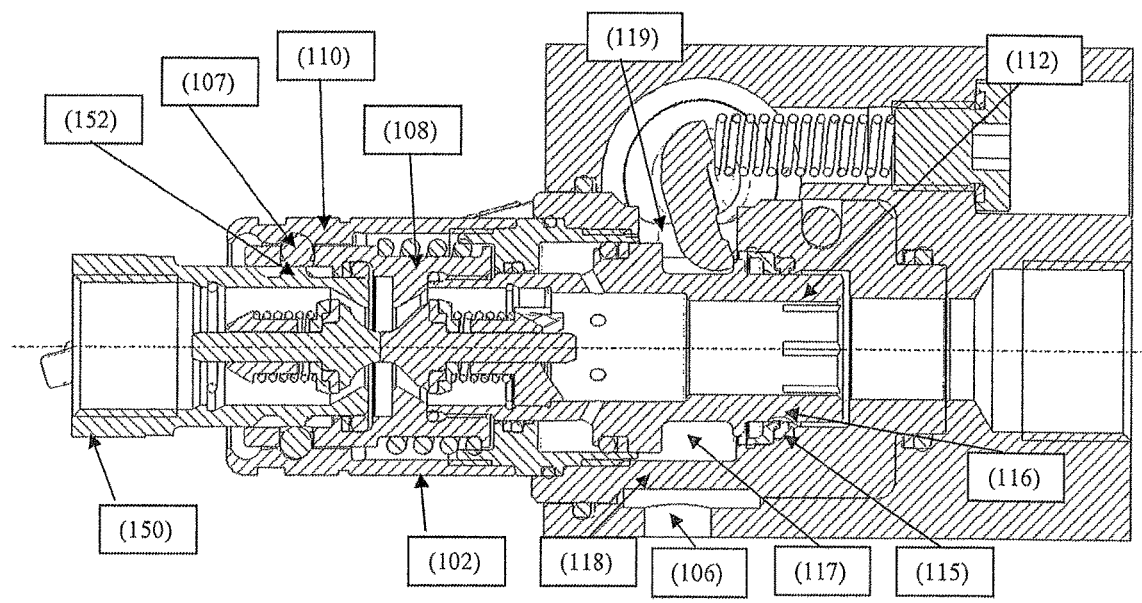

FIG. 5 shows a further step of connecting of the male coupling 150 in the cartridge 102. In particular, it can be appreciated how a tooth of the pin 152 of the male coupling 150 pushes the balls 107 into a specific housing obtained inside the ring 110. Thereby, the ball body 108 and the balancing piston 112 are pushed towards the inside of the cartridge 102 to occupy a more retracted position in the cartridge 102 (with respect to that previously occupied).

Decompression niches 116 are present in the balancing piston 112 and allow to eliminate the residual pressure previously present in the cartridge 102 because they create a passage gap between the balancing piston 112 and the seal 115.

The decompressed oil thus enters into a circular crown-shaped chamber 117 obtained between the balancing piston 112 and the adapter 118, where a hole 119 is present in the adapter 118 through which the oil (in general, the fluid) may spill out, which oil then exits from the hole 106, to be possibly recovered.

In particular, the chamber 117 is concentric circular with the axis A of the coupling 1012, obtained between an inner surface of the adapter 118 and an outer surface of the balancing piston 112. The hole 119 is present in the adapter 118 with the axis normal to axis A of the coupling which intercepts the chamber 117 and is therefore in communication therewith.

Figure 6:
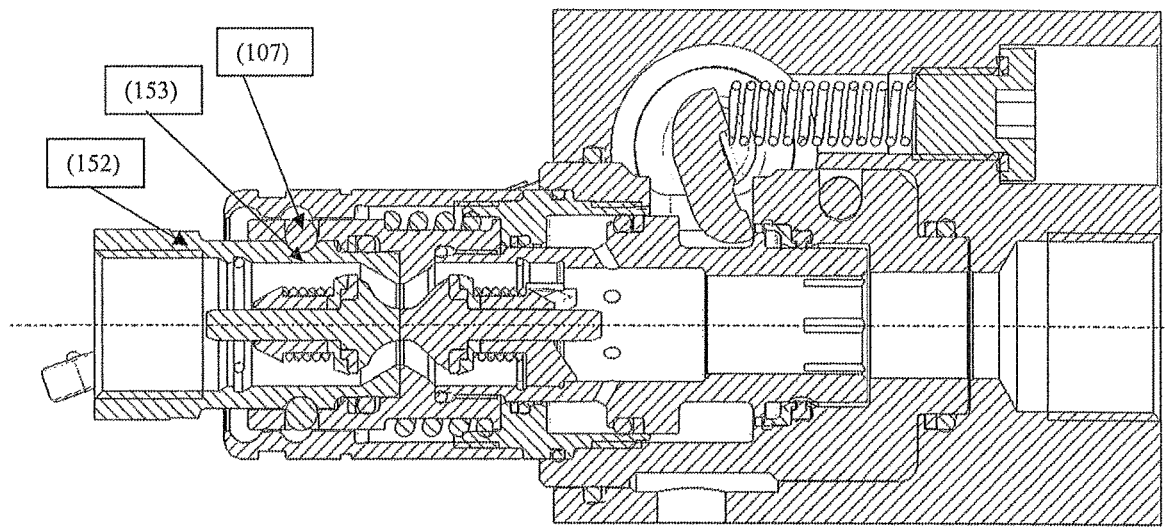

FIG. 6 instead shows how, in the next step, the balls 107 are at the seat 153 of the pin 152 of the male coupling.

Figure 7:
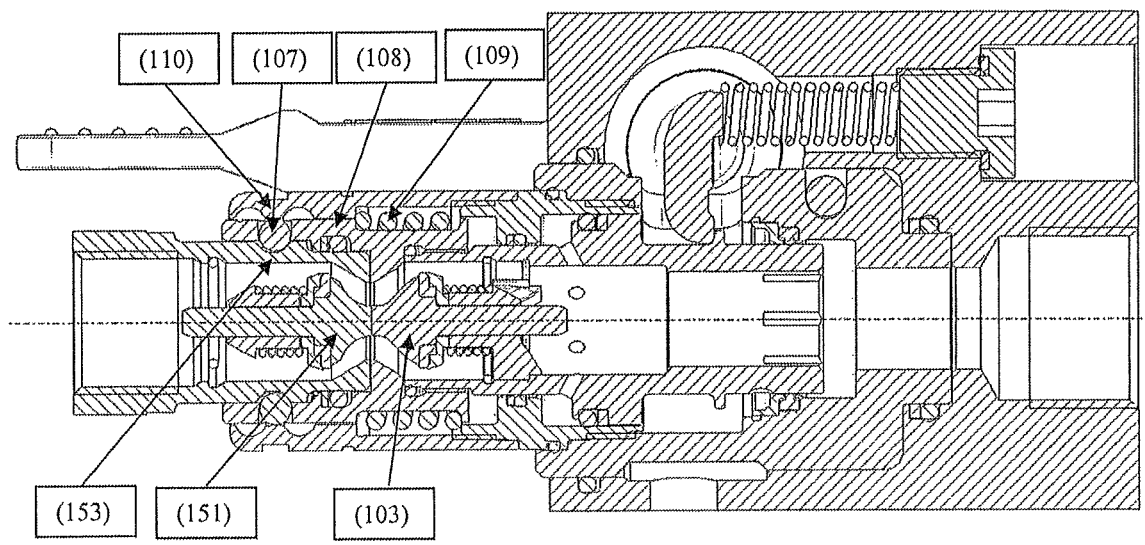

FIG. 7 shows the final configuration, in which the male coupling is connected to the female coupling and is thus mechanically constrained to the female coupling 102 which is in fluid communication with the female coupling 102: The spring (109) has repositioned the ball body (108) and the balls (107) are locked between the groove (153) and the ring (110). The valves (103) and (151) are in open position so as to allow the passage of oil.

The disconnection method of the male coupling 150 from the female coupling 102 by simply pulling the male coupling 150 will be described below with reference to the figures from 8 to 10; in the figures from 8 to 10, component parts and/or features described above with reference to other figures are identified using the same reference numerals.

Figure 8:
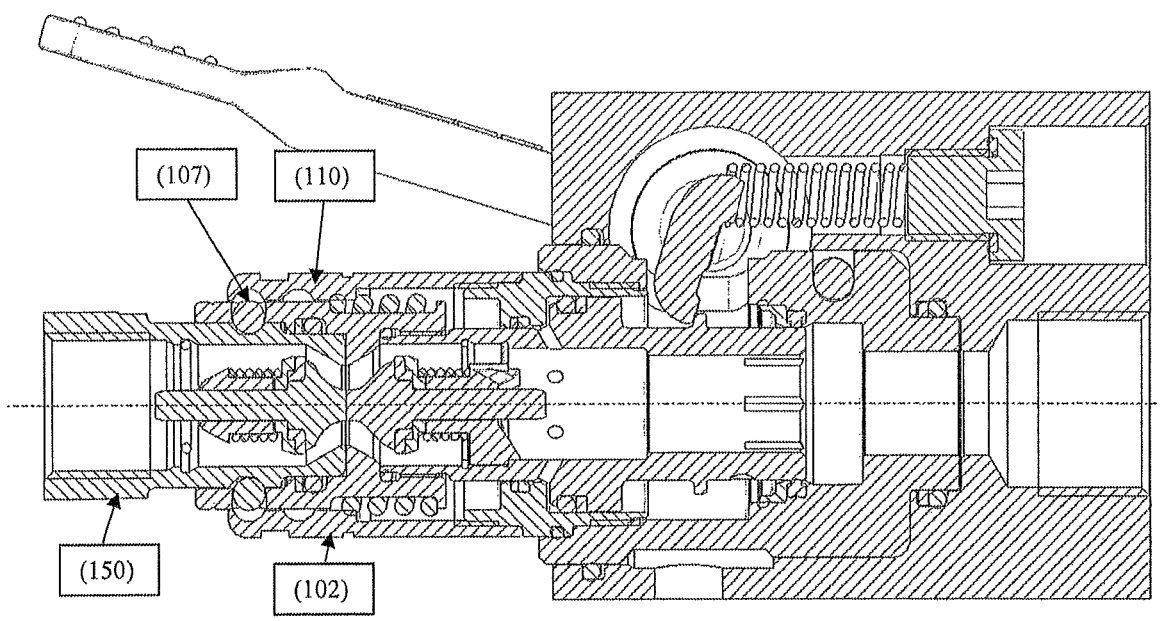

As shown in FIG. 8, starting from the situation in FIG. 7 (male coupling 150 and female coupling 102 reciprocally connected), pulling the male coupling 150 towards the outside of the cartridge 102, will reposition the balls 107 at a groove present in the ring 110.

Figure 9:
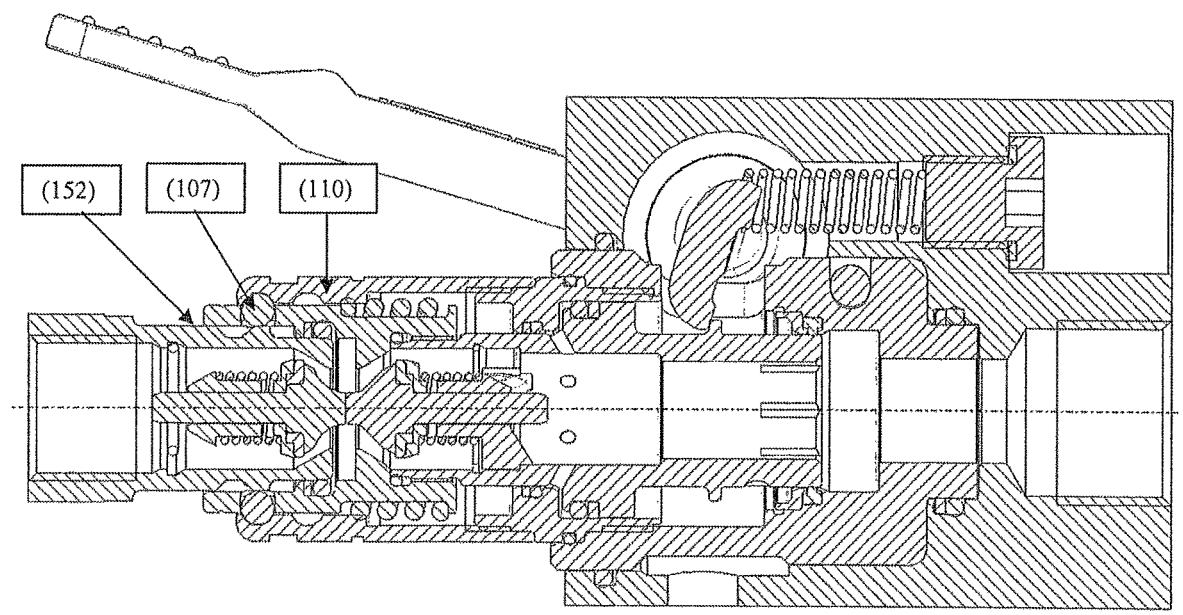

So, during the further step of releasing of shown in FIG. 9, the pin 152 acts by pushing against the balls 107, which are arranged inside the groove of the ring 110.

Figure 10:
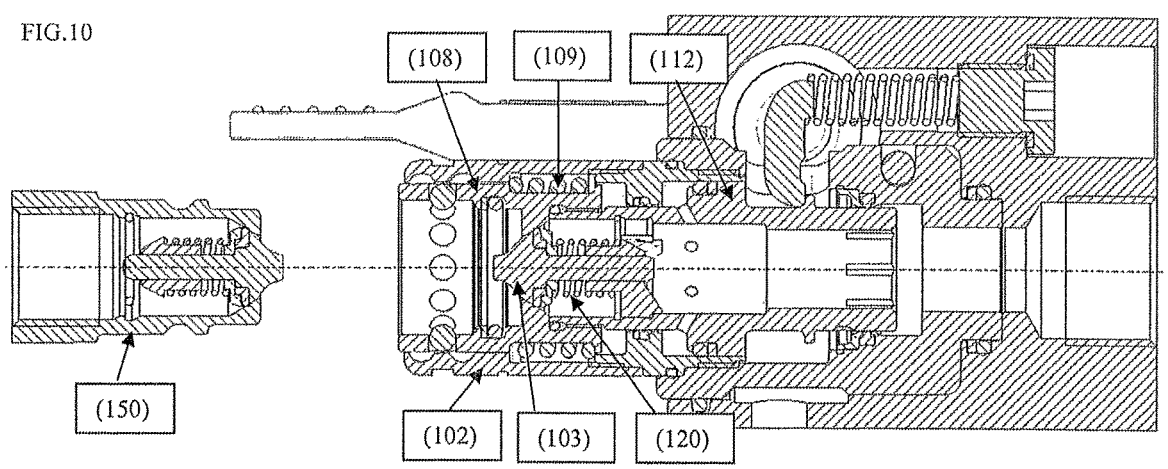

So, FIG. 10 shows the male coupling 150 and the cartridge 102 after the disconnection, where the spring 109 has repositioned the ball body 108 and the balancing piston 112. Furthermore, the spring 120 has also repositioned the valve 103, thus closing the oil passage.

The disconnection method of the male coupling 150 from the female coupling 102 in case of absence of residual pressure, but in this case by using the lever 104 will be described below with reference to the figures from 11 to 15; in the figures from 11 to 15, component parts and/or features described above with reference to other figures are identified using the same reference numerals.

Figure 11:
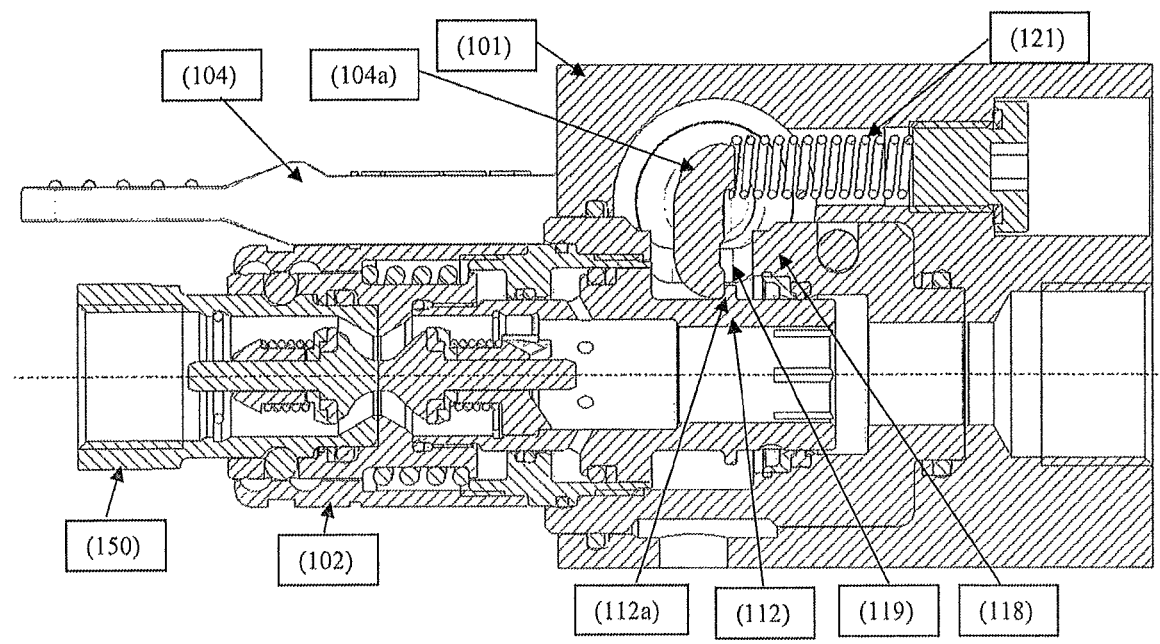

In FIG. 11 the male coupling 150 is shown connected to the cartridge 102. FIG. 11 also shows how a lever 104 is applied to the manifold 101, where the lever 104 comprises a leg 104a which extends in a through opening 119 which allows to access the piston 112 from the outside of the adapter 118. The leg 104a is shaped and positioned so as to engage a surface 112a defined by an annular protrusion which extends towards the outside of the outer surface of the balancing piston (112) by virtue of the pushing action of the spring 121.

Figure 12:
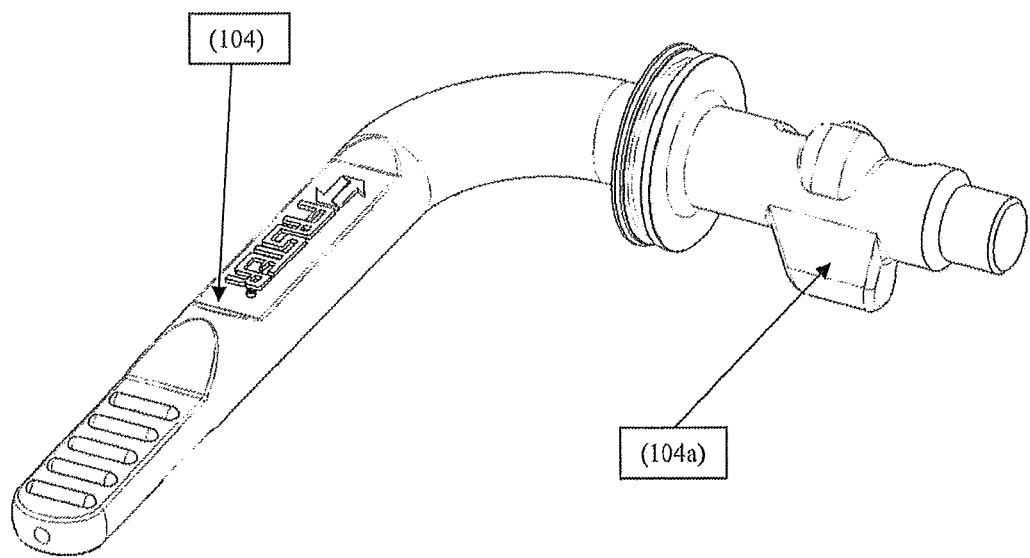

FIG. 12 shows the details of the lever 104 and of the leg 104a.

Figure 13:
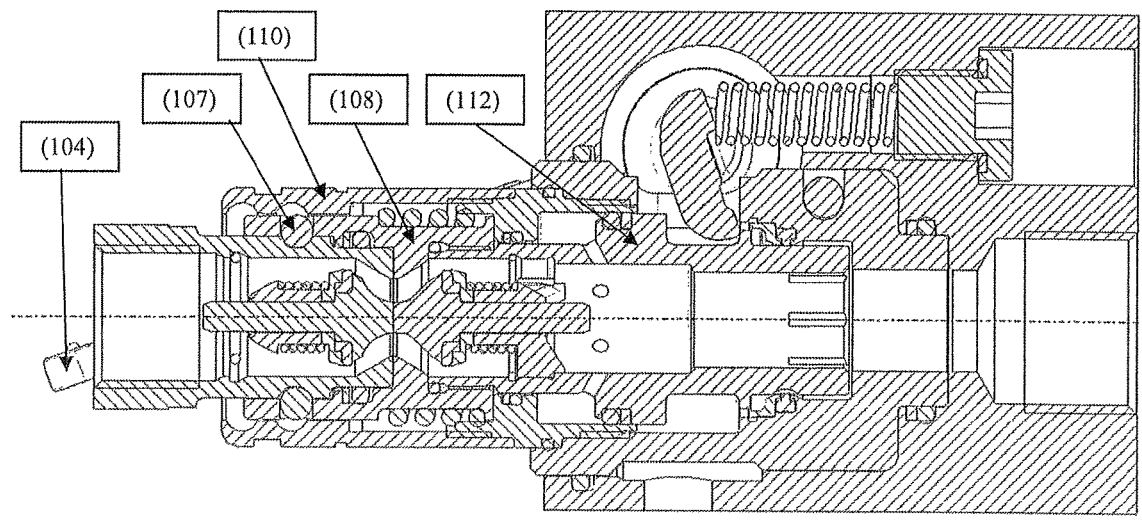

FIG. 13 shows that by pushing the lever 104 downwards (counterclockwise with respect to the figure), the retraction of the balancing piston 112 and of the ball body 108 is obtained to a position in which the balls 107 are at the groove present in the ring 110.

Figure 14:
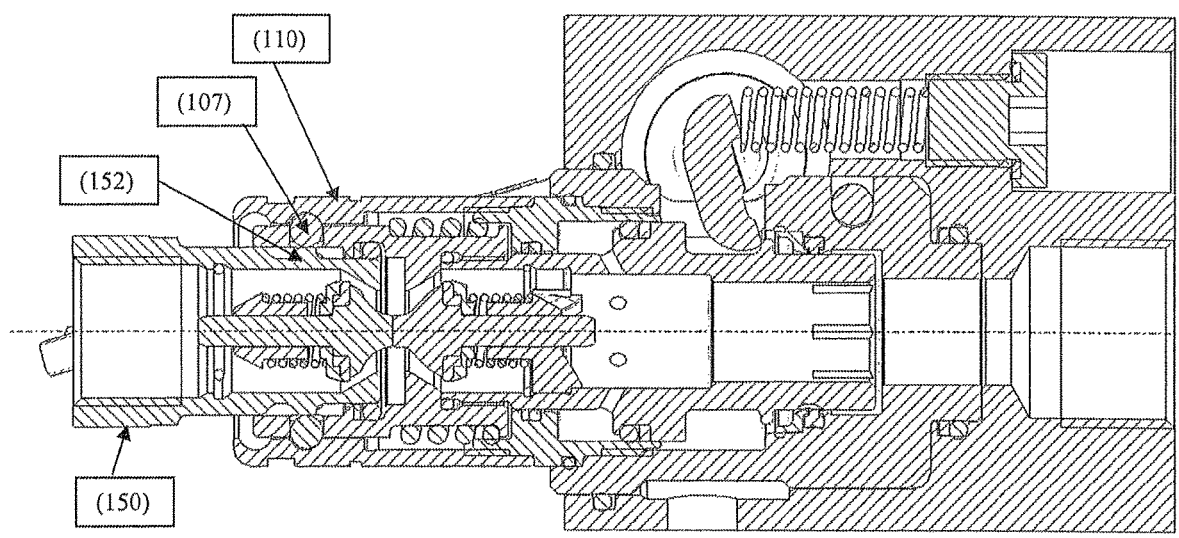

At this point, a tooth present on the pin 152 of the male coupling 150 pushes the balls 107 into the seat present in the ring 110 as shown in FIG. 14.

Figure 15:
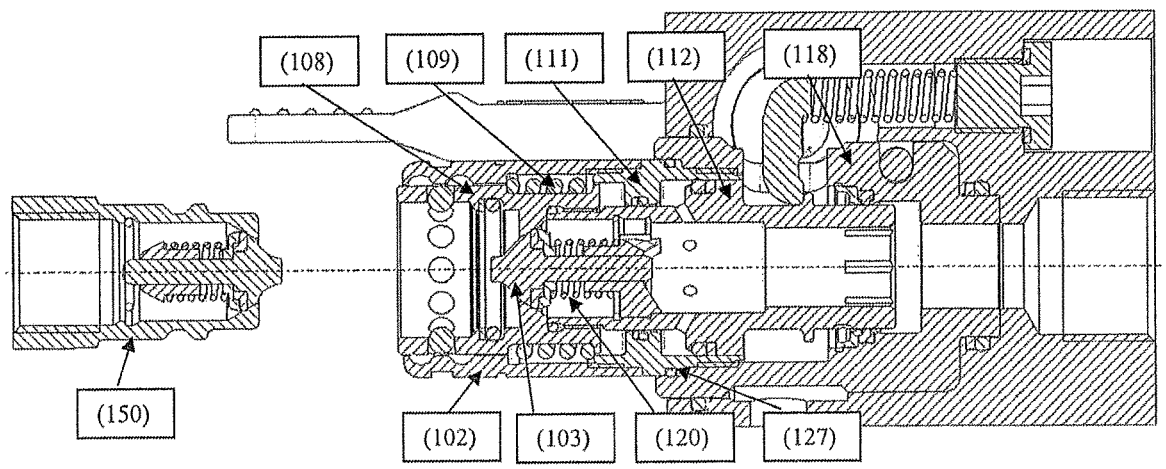

FIG. 15 shows the male coupling 150 and the cartridge 102 after the disconnection, where the spring 109 has repositioned the ball body 108 and the balancing piston 112. Furthermore, the spring 120 has repositioned the valve 103, thus closing the oil passage. An O-ring 127 type seal is inserted between the central connector 111 and the adapter 118.

The application and fixing method of the female coupling 102 in the interface manifold 101 will be described below with reference to the figures from 16 to 18; in the figures from 16 to 18, component parts and/or features described above with reference to other figures are identified using the same reference numerals.

Figure 16:
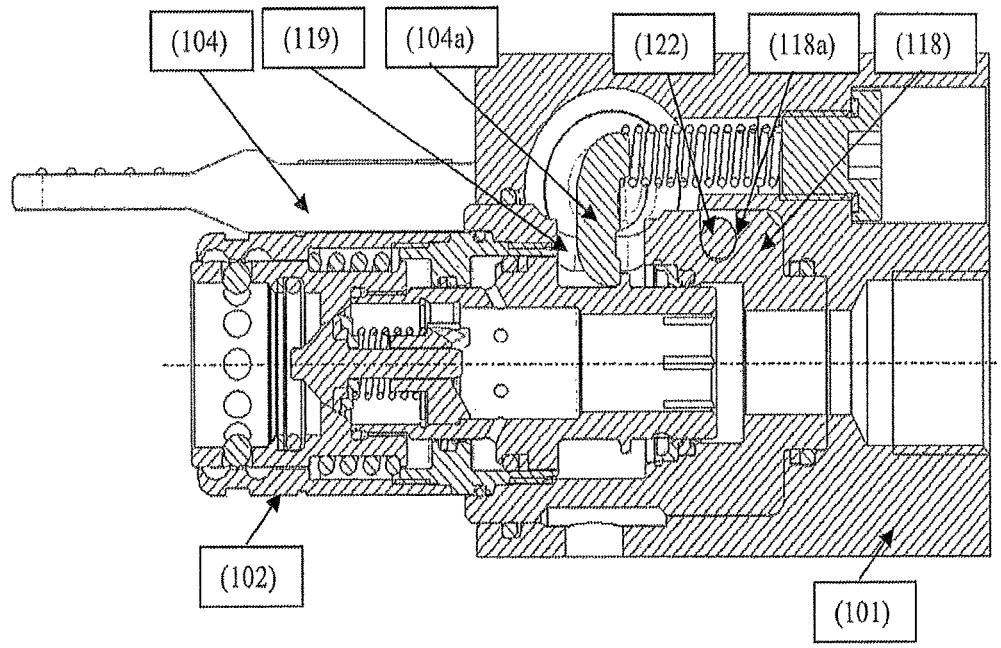

FIG. 16 shows how a groove 118a is present in the adapter 118 which extends in depth from the outer surface of the adapter 118 along a direction substantially perpendicular to the axis A. A pin 122 is inserted longitudinally in said groove 118a, the groove 118a being provided so as to position the hole 119 of the adapter 118 at the leg 104a of the lever 104. The application and constraining methods of the female coupling 102 to the manifold 101 thus envisage that the end portion of the female coupling (opposite to that intended to be engaged by the male coupling 150) is inserted in the seat corresponding to the housing of the manifold 101 and thus is fixed there by inserting the pin 122 in a hole of the manifold 101 to engage the groove 118a, where the reciprocal engagement of the pin 122 and its groove 118a prevents any rotation about any axis parallel to axis A and any translation along any direction parallel to axis A of the female coupling 102.

Figure 17:
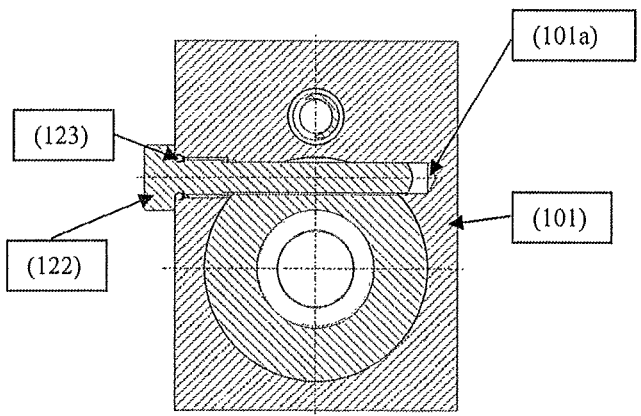
Figure 18:
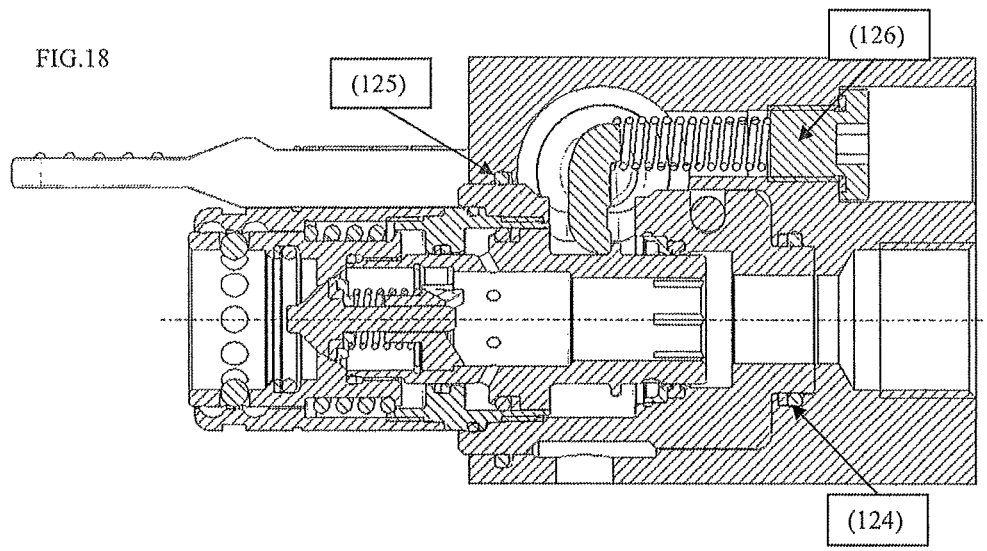
Figure 19:
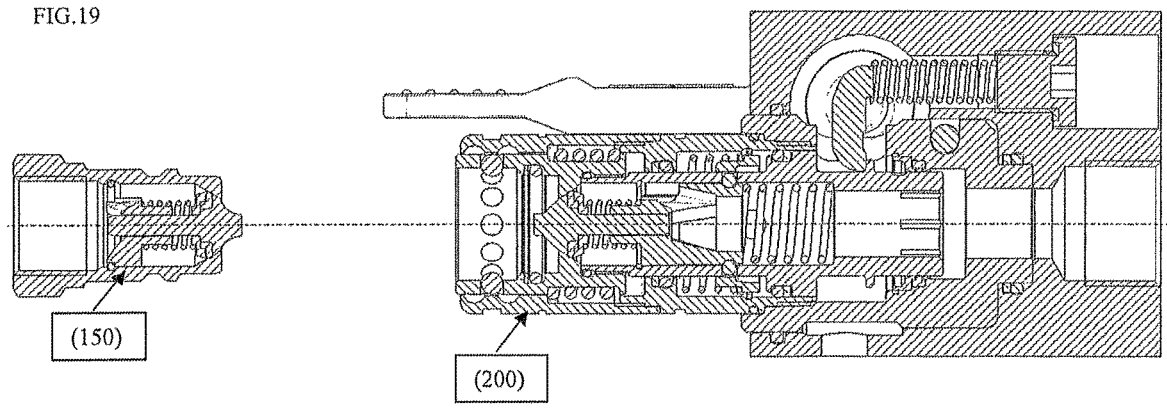

FIG. 17 shows a longitudinal section of the manifold 101 and thus allows to appreciate how a seal 123 is arranged between the pin 122 and the respective hole of the manifold 101. Finally, FIG. 18 shows a further seal 124 which guarantees the tightness of the pressurized channel and the seal 125 and the cap 126 which guarantee the decompressed oil tightness.

A further embodiment of the present invention and of the respective connection and disconnection methods will be described below with reference to the figures from 19 to 32; also in the figures from 19 to 32, component parts and/or features described with reference to other figures are identified using the same reference numerals.

Figure 20:
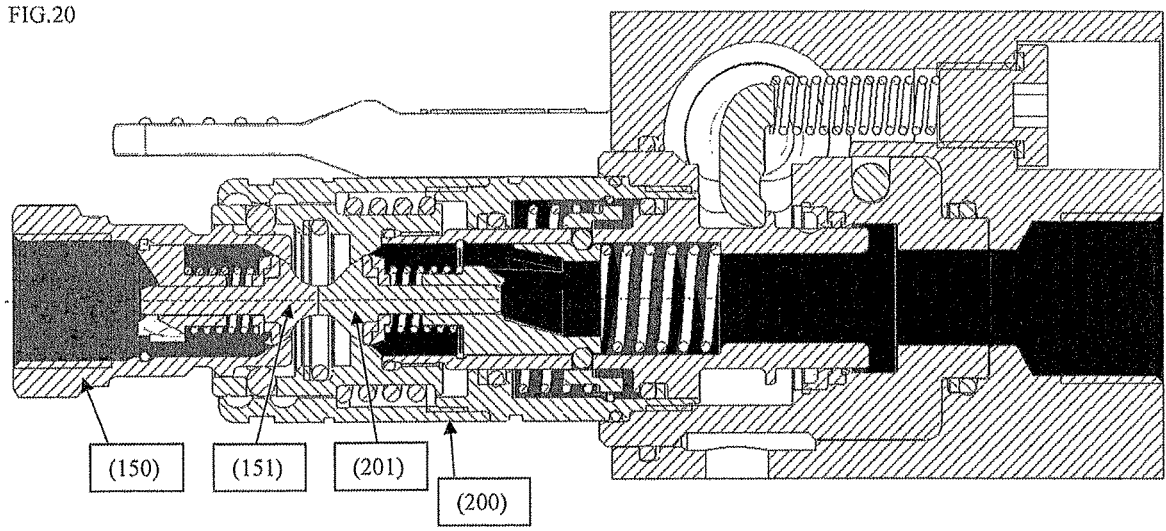

FIG. 20 shows a first step of connecting of the male coupling 150 in the cartridge 102, in which the valve 151 of the male coupling enters into contact with the valve 103 of the cartridge 102. In the figure, the dark part indicates the presence of pressure inside the cartridge 102 and inside the male coupling 150.

Figure 21:
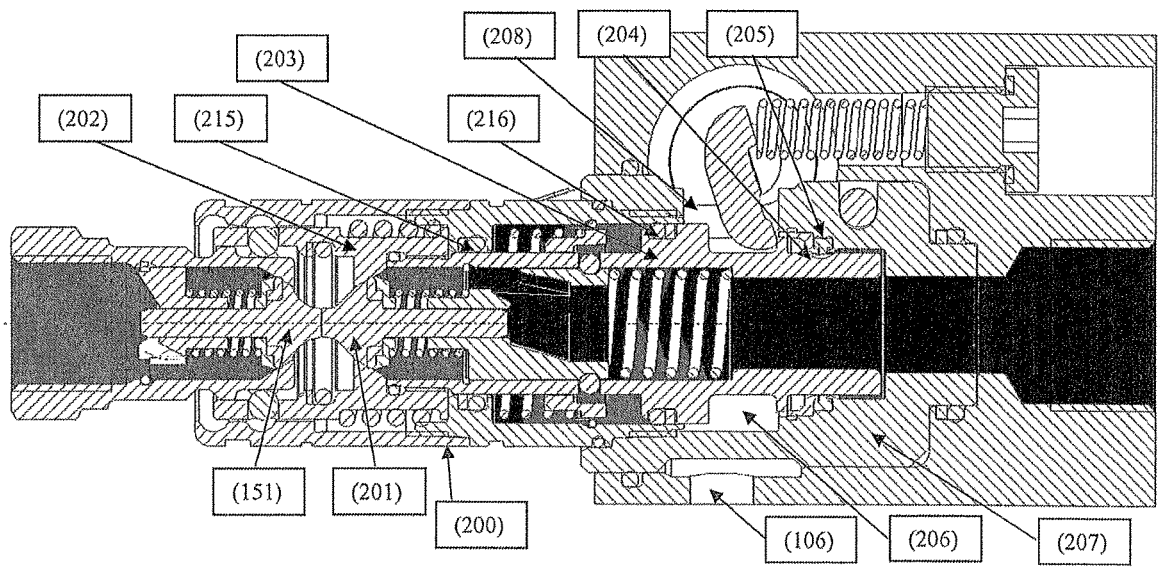

FIG. 21 shows a further step of connecting in which the valve 151 of the male coupling 150 pushes the valve 103 of the female coupling, where because of the presence of the pressure in the cartridge 102 also the ball body 108 and the balancing piston 112 retract towards the inside of the cartridge. Such a balancing piston 112 is hydraulically balanced by virtue of the particular arrangement of the seals 115, 113 and 114.

One or more decompression niches 116 are present in the balancing piston 112 and allow to eliminate the residual pressure previously present in the cartridge 102 because they create a passage gap between the balancing piston 112 and the seal 115.

The decompressed oil enters into a circular crown-shaped chamber 117 obtained between the balancing piston 112 and the adapter 118. A hole 119 is present in the adapter 118 from where the oil may pour out, then exiting from the hole 106, to be possibly recovered.

Figure 22:
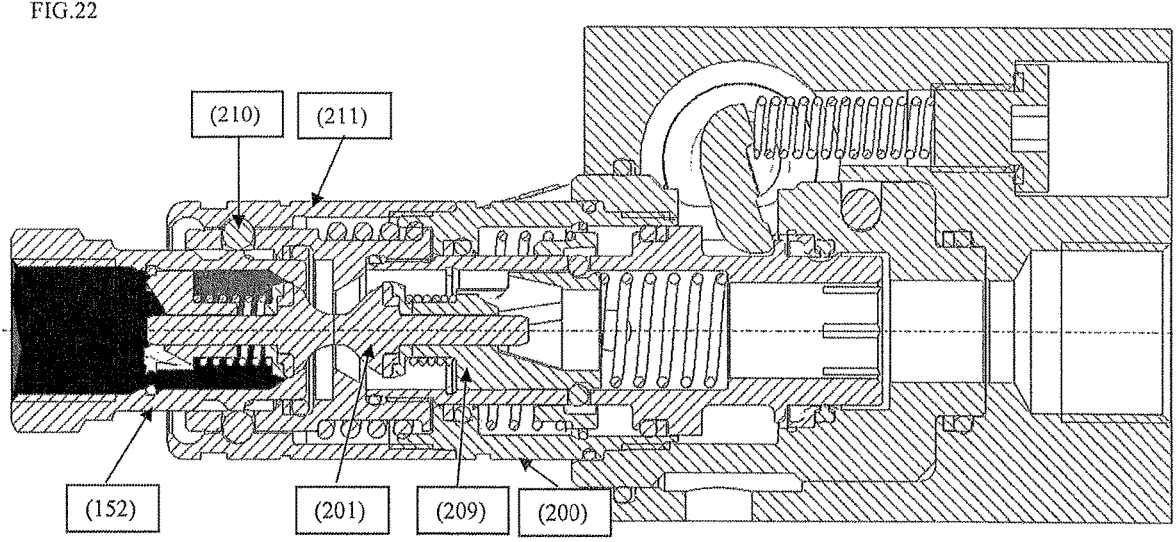

FIG. 22 shows a further step of connecting in which the valve 103 retracts into contact with the valve guide 209 by virtue of the fact that the residual pressure in the cartridge 102 was eliminated.

Figure 23:
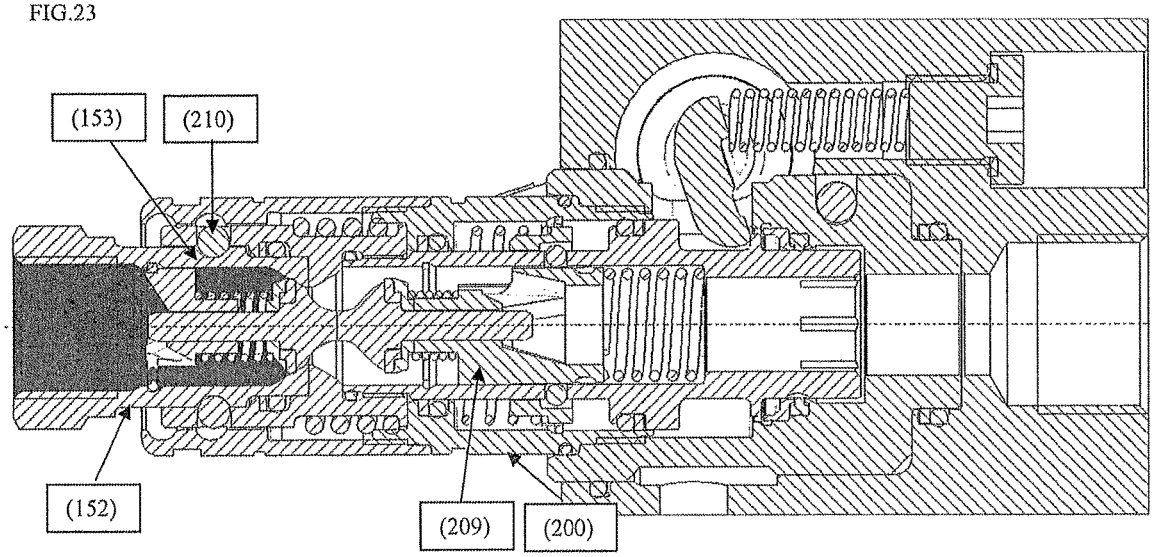
Figure 24:
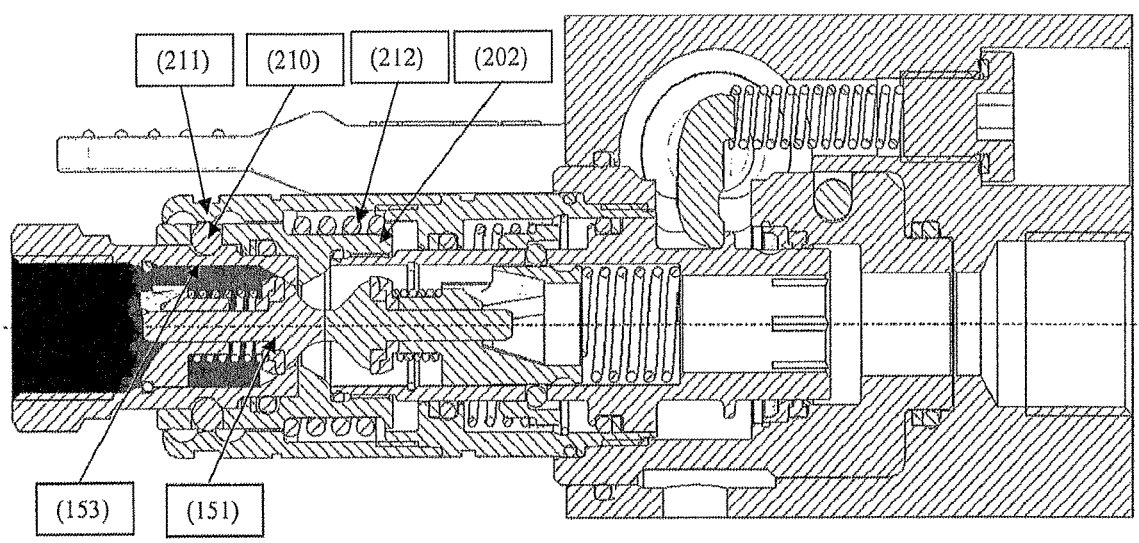

The pin of the male coupling 152 can thus advance towards the inside of the cartridge 102 and push the balls 107 into the groove present in the ring 110. During the further step of connecting shown in FIG. 23 the valve guide 209 retracts towards the inside of the cartridge 102, thus where the balls 107 are positioned at a groove 153 present in the pin 152 of the male coupling 150. FIG. 24 shows the connection (only mechanical, not yet hydraulic) between the male coupling 150 and the female coupling 102; it is worth noting that the spring 109 has repositioned the ball body 108 and the balls 107 are locked between the groove 153 and the ring 110. Furthermore, it is worth noting that the male coupling 150 is connected to the female part but the valve 151 is still closed maintaining pressure in the male coupling 150.

The opening of the valve 151 is thus obtained simply by pressurizing the cartridge 102 at a pressure higher than that present in the male coupling 150.

Figure 25:
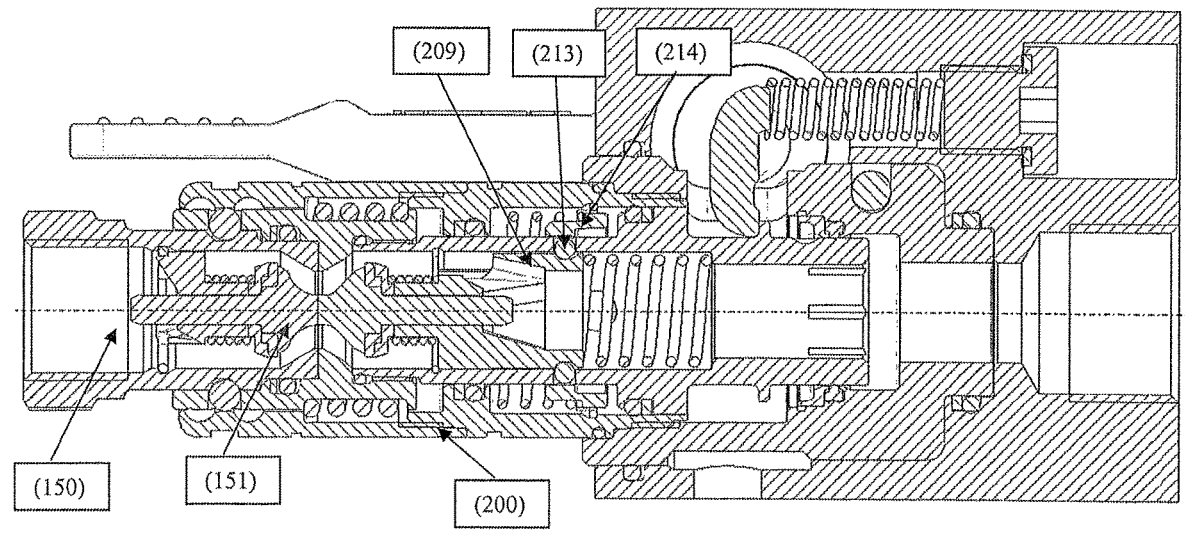

FIG. 25 shows the performed hydraulic connection with the respective opening of the valves.

It is worth noting that the valve guide (209) is locked in position by a crown of ball 213 which cannot move radially because of the presence of the stop 214 which prevents their displacement (such a system is usually referred to as a "mechanical lock").

The disconnection method in the absence of residual pressure and simply by pulling the male coupling 150 will be described below with reference to the figures from 26 to 28.

Figure 26:
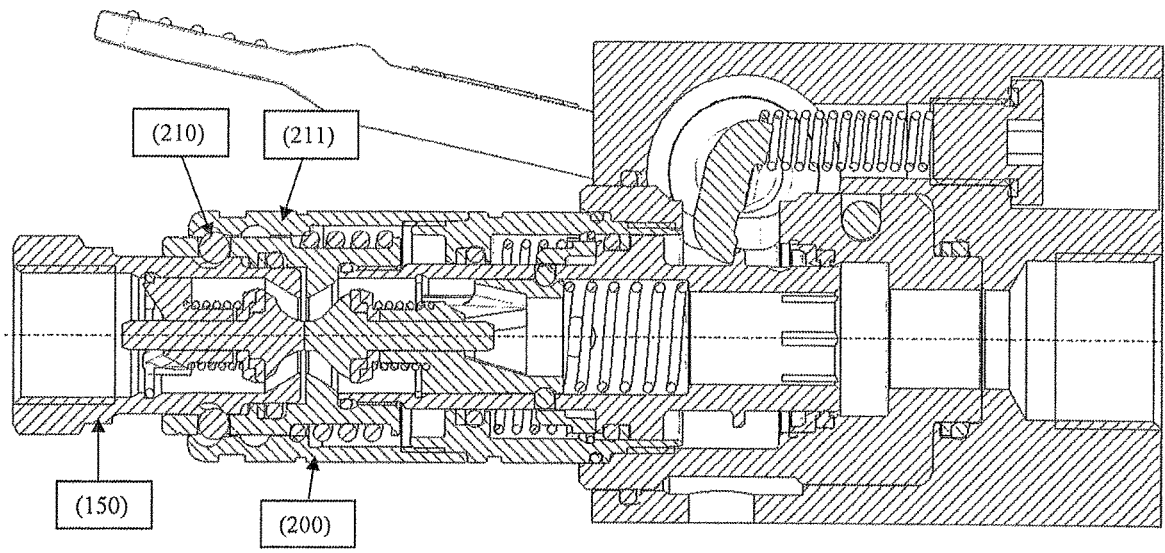
Figure 27:
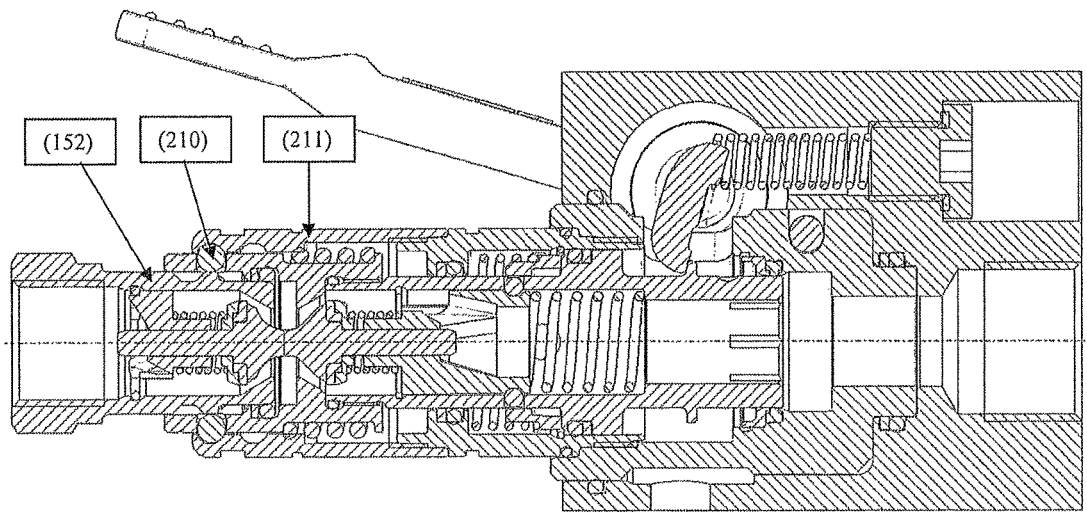

Starting from the situation in FIG. 25 in which the two male and female couplings are reciprocally connected, both mechanically and hydraulically, the repositioning of the balls 107 at a groove present in the ring 110 (FIG. 26) is obtained by pulling the male coupling 150 towards the outside of the cartridge 102, where the pin 152 pushes the balls 107 into the groove of the ring 110 during the further step of disconnecting in FIG. 27.

Figure 28:
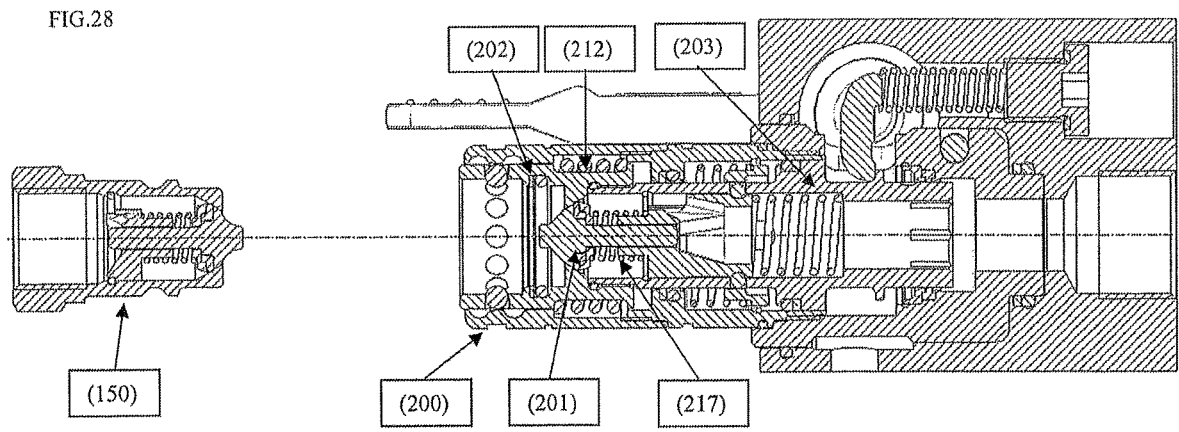

Finally, after disconnecting the male coupling 150 from the cartridge 102, as shown in FIG. 28, the spring 109 repositions the ball body 108 and the balancing piston 112. Furthermore, the spring 120 has repositioned the valve 103, thus closing the oil passage.

The disconnection method in case of absence of residual pressure and by actuating the lever 104 will be described below with reference to the figures from 29 to 32.

Figure 29:
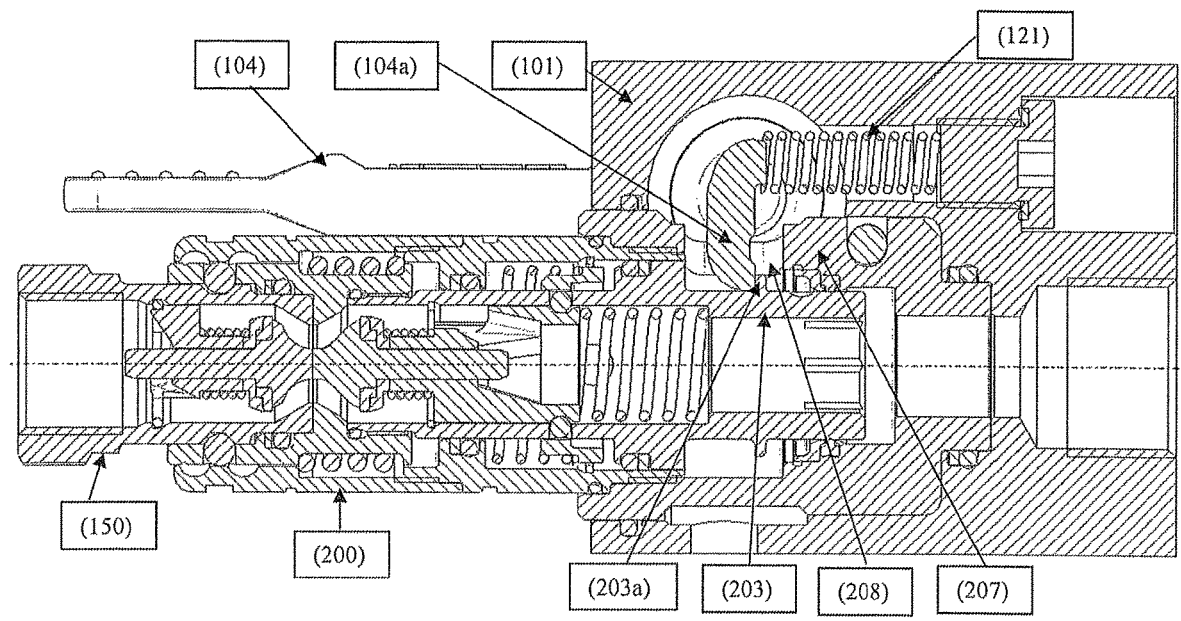

FIG. 29 shows the male coupling 150 connected to the cartridge 102, where also in this case the leg 104a is in contact with (engages) the surface 112a of the balancing piston 112 by virtue of the thrust of the spring 121.

Figure 30:
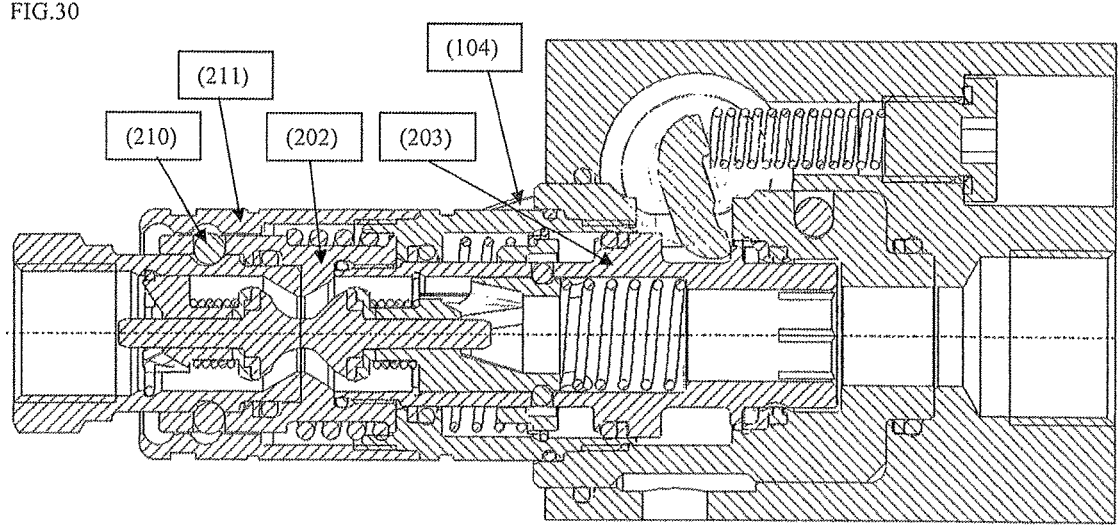
Figure 31:
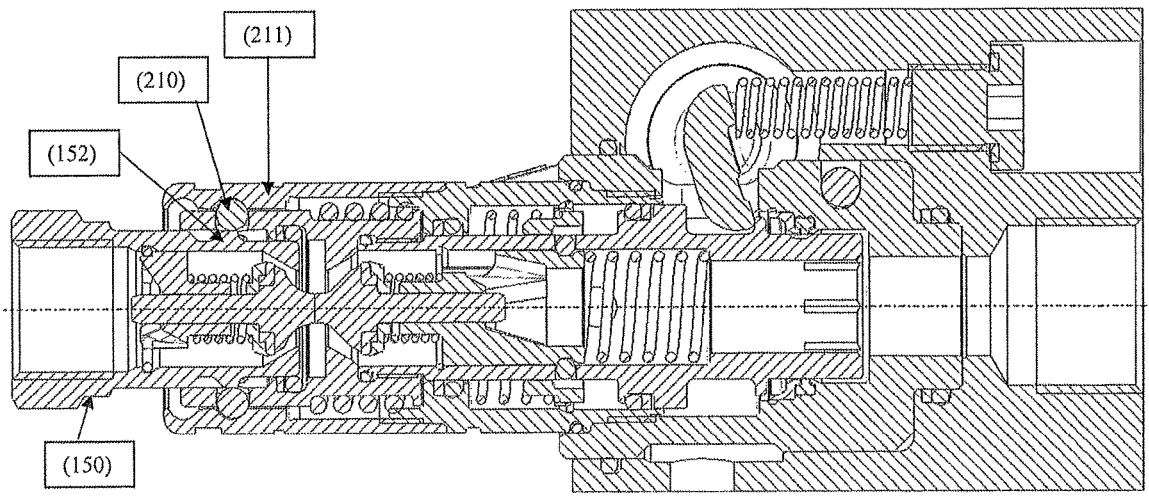

Therefore, as shown in FIG. 30, by pushing the lever 104 downwards, the retraction of the balancing piston 112 and of the ball body 108 is obtained until the balls 107 are at the groove present in the ring 110. At this point, a tooth present on the pin 152 of the male coupling 150 pushes the balls 107 into the seat present in the ring 110, as shown in FIG. 31.

Figure 32:
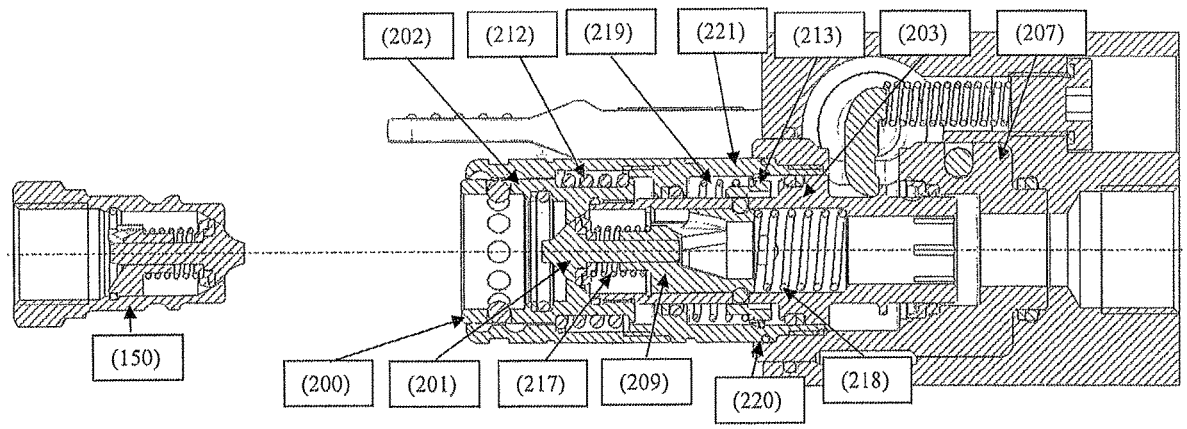
Figure 33:
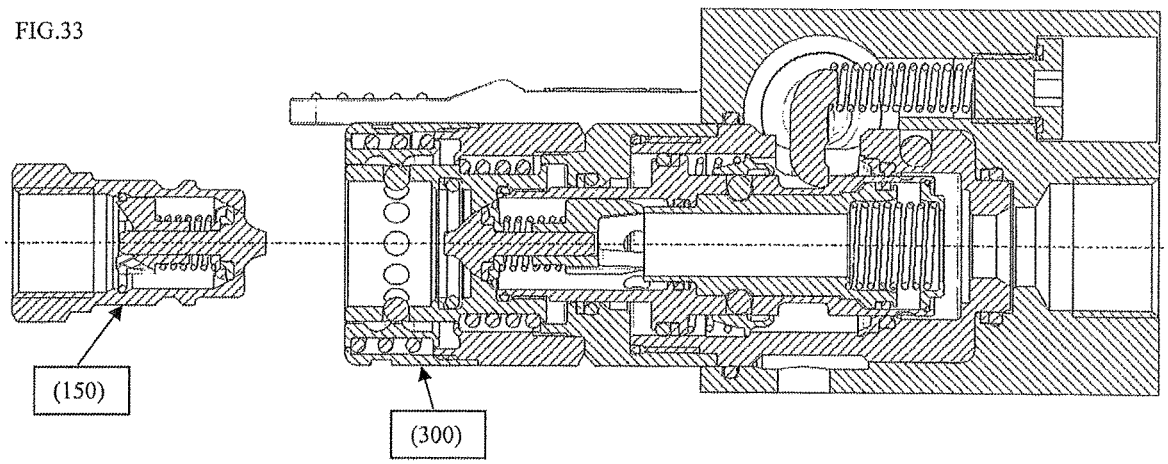

FIG. 32 shows the male coupling 150 and the cartridge 102 after the disconnection, where the spring 109 has repositioned the ball body 108 and the balancing piston 112. Furthermore, the spring 120 has repositioned the valve 103, thus closing the oil passage. Further two springs (218) and (219) reposition the valve guide (209) and the stop of the mechanical lock 213, an O-ring type seal 220 being inserted between the central connector 111 and the adapter 118.

The various connection and disconnection methods of the male and female couplings will be described below with reference to figures from 33 to 48.

Figures from 33 to 48 show the case of the embodiment of an interchangeable cartridge (female coupling) which allows the connection of a male coupling with presence of residual pressure therein and which has a hydraulically imbalanced slider therein to allow the opening of the male coupling also with much lower pressures in the female coupling (opening ratio).

Furthermore, by virtue of a special ring slider and a double series of decompression niches, disconnection is possible in the presence of residual pressure either by actuating the lever or by pulling it manually. This embodiment allows in particular: push-pull type connection, connection with pressurized female coupling, disconnection under pressure (by means of lever), connection with pressurized male coupling, disconnection under pressure (by pulling).

The steps of a first connection method are shown in the figures from 33 to 39, in which component parts and/or features described above with reference to other figures are identified using the same reference numerals.

Figure 34:
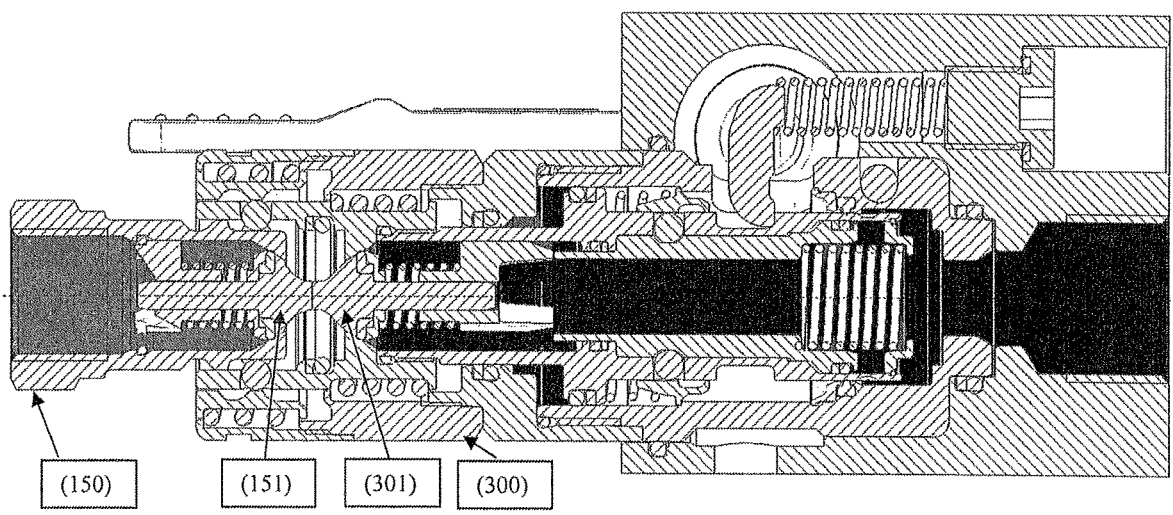

FIG. 34 shows a first step of connecting of the male coupling 150 in the cartridge 102 (in the presence of pressure in the male coupling 150 and in the cartridge 102), during which the valve 151 of the male coupling enters into contact with the valve 103 of the cartridge 102.

Figure 35:
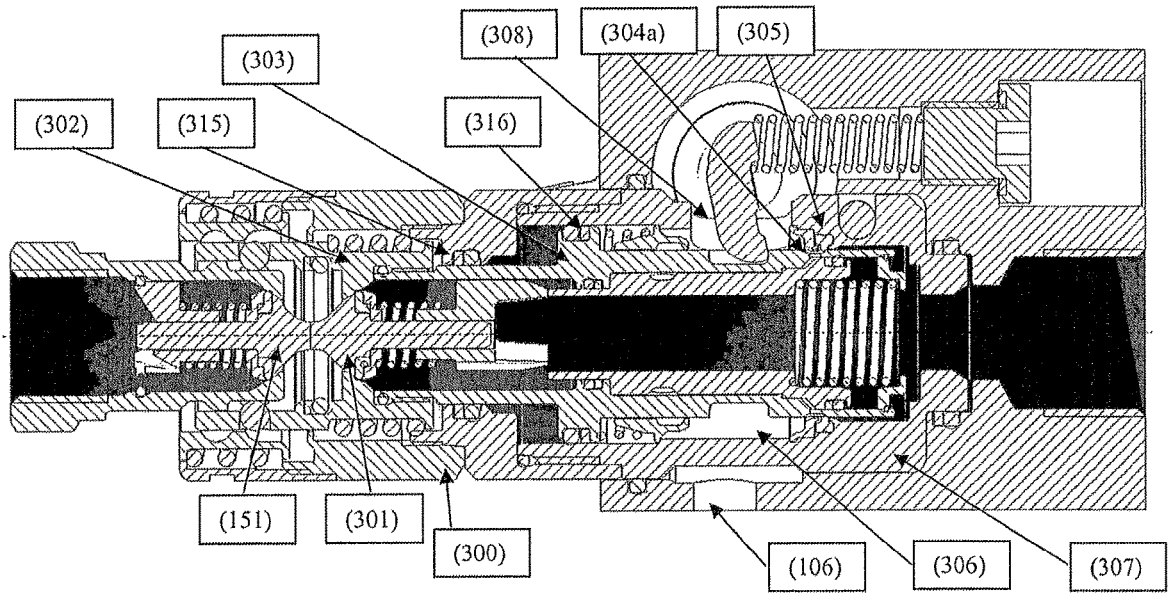

FIG. 35 shows a step after the connection during which the valve 151 of the male coupling pushes the valve 103 of the female coupling 102, where because of the presence of the pressure in the cartridge 102 also the ball body 108 and the balancing piston 112 retract towards the inside of the cartridge 102. In this case, the balancing piston 112 is hydraulically balanced by virtue of the particular arrangement of the seals 113, 114 and 115. A first series of decompression niches 304a is present in the balancing piston 112, which niches allow to eliminate the residual pressure previously present in the cartridge 102 because they create a passage gap between the balancing piston 112 and the seal 115. The decompressed oil (or fluid in general) enters into a circular crown-shaped chamber 117 obtained between the balancing piston 112 and the adapter 118, in which a hole is present through which the oil may spill out from the hole 106, to be possibly recovered.

Figure 36:
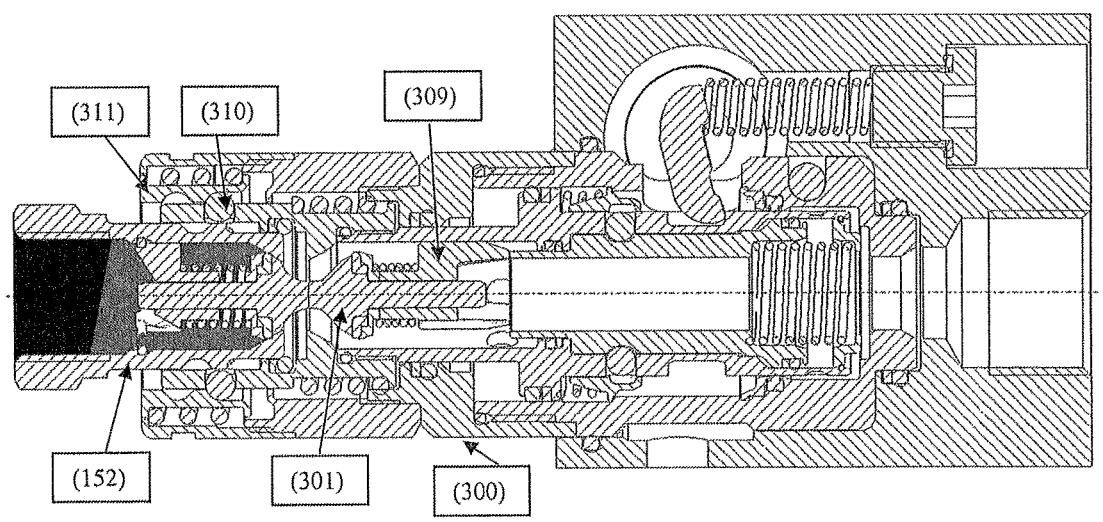

FIG. 36 shows a further step of connecting in which the valve 103 retracts into contact with the valve guide 209 by virtue of the fact that the residual pressure in the cartridge 102 was eliminated. Furthermore, the pin of the male coupling 152 can advance towards the inside of the cartridge 102 and push the balls 107 into the groove present in the ring slider 110.

Figure 37:
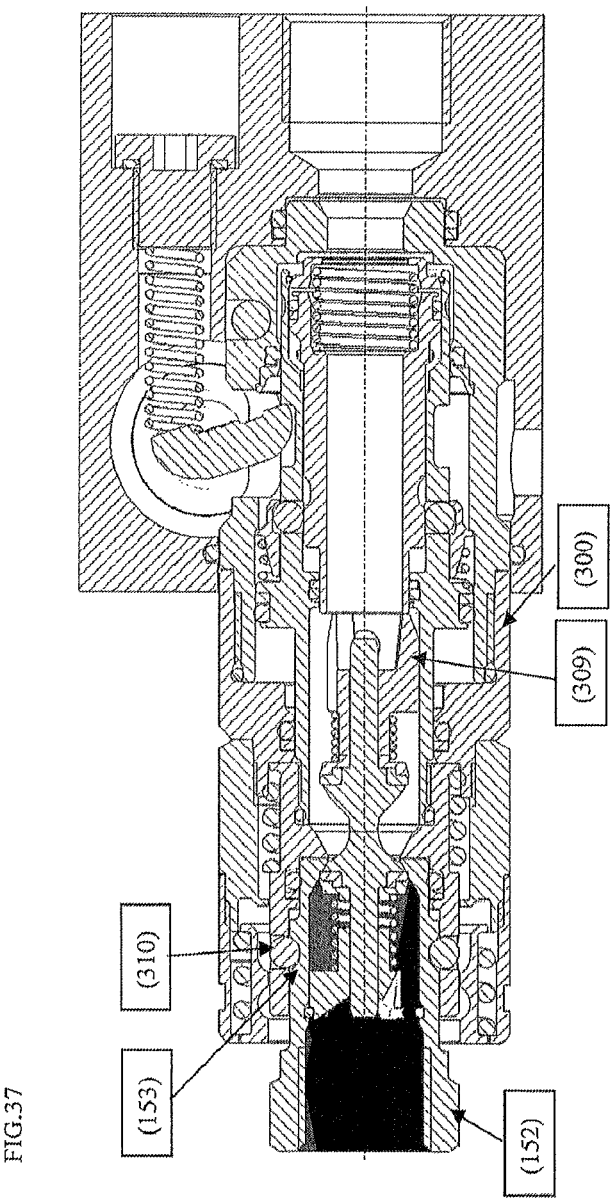

During the further step of connecting in FIG. 37 the valve guide 209 retracts towards the inside of the cartridge 102, thus where the balls 107 are repositioned at a groove 153 present in the pin 152 of the male coupling 150.

Figure 38:
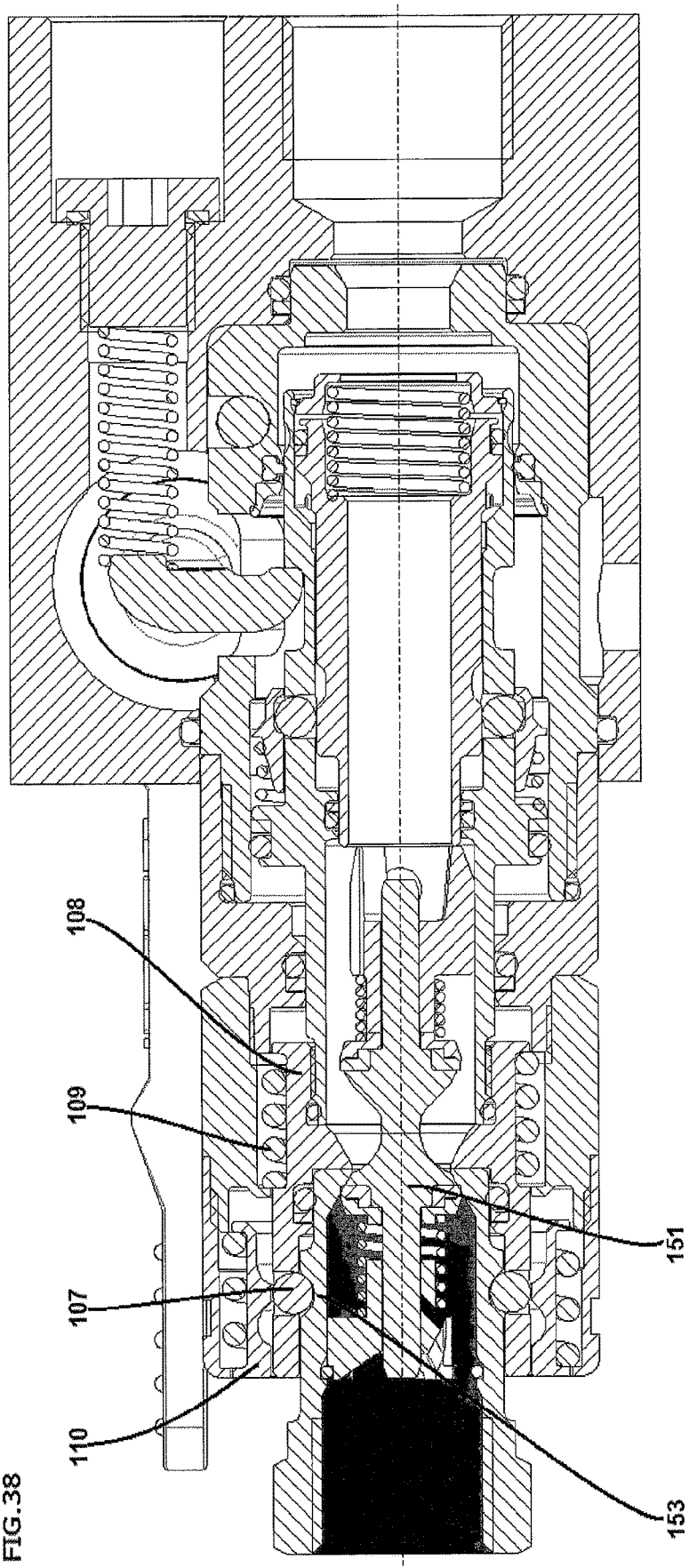

The male coupling is shown in FIG. 38, where:
the spring 109 has repositioned the ball body 108 and the balls 107 are locked between the groove 153 and the ring 110, where incidentally the male coupling 150 is connected to the female coupling 102 but the valve 151 is still closed because of the pressure still present in the male coupling. In order to open the valve 151 of the male coupling 150 it is thus sufficient to pressurize the cartridge 102. As shown, an inner slider 322 is present in the cartridge 102 which is hydraulically imbalanced by virtue of the seals 323 and 324 which work on two different diameters. Therefore, in order to open the valve 151 of the male coupling 150 it is sufficient to apply a considerably pressure lower than that present in the male coupling 150 (opening ratio).

Figure 39:
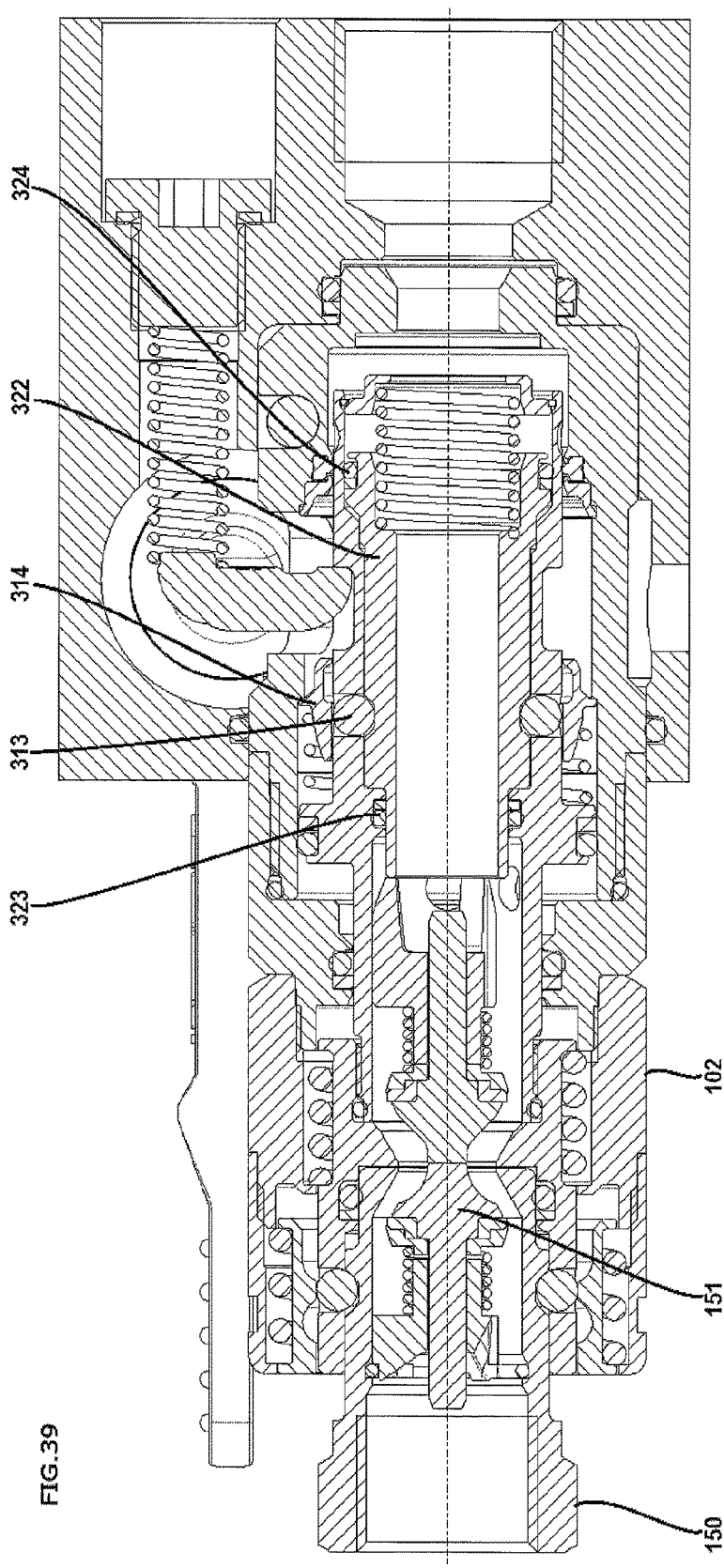

Finally, FIG. 39 shows the performed coupling with the respective opening of the valves, where the inner slider 322 is locked in position by a crown of balls 313 which cannot move radially because of the presence of the stop 314 which prevents their displacement (such a system is usually referred to as a "mechanical lock").

Figure 40:
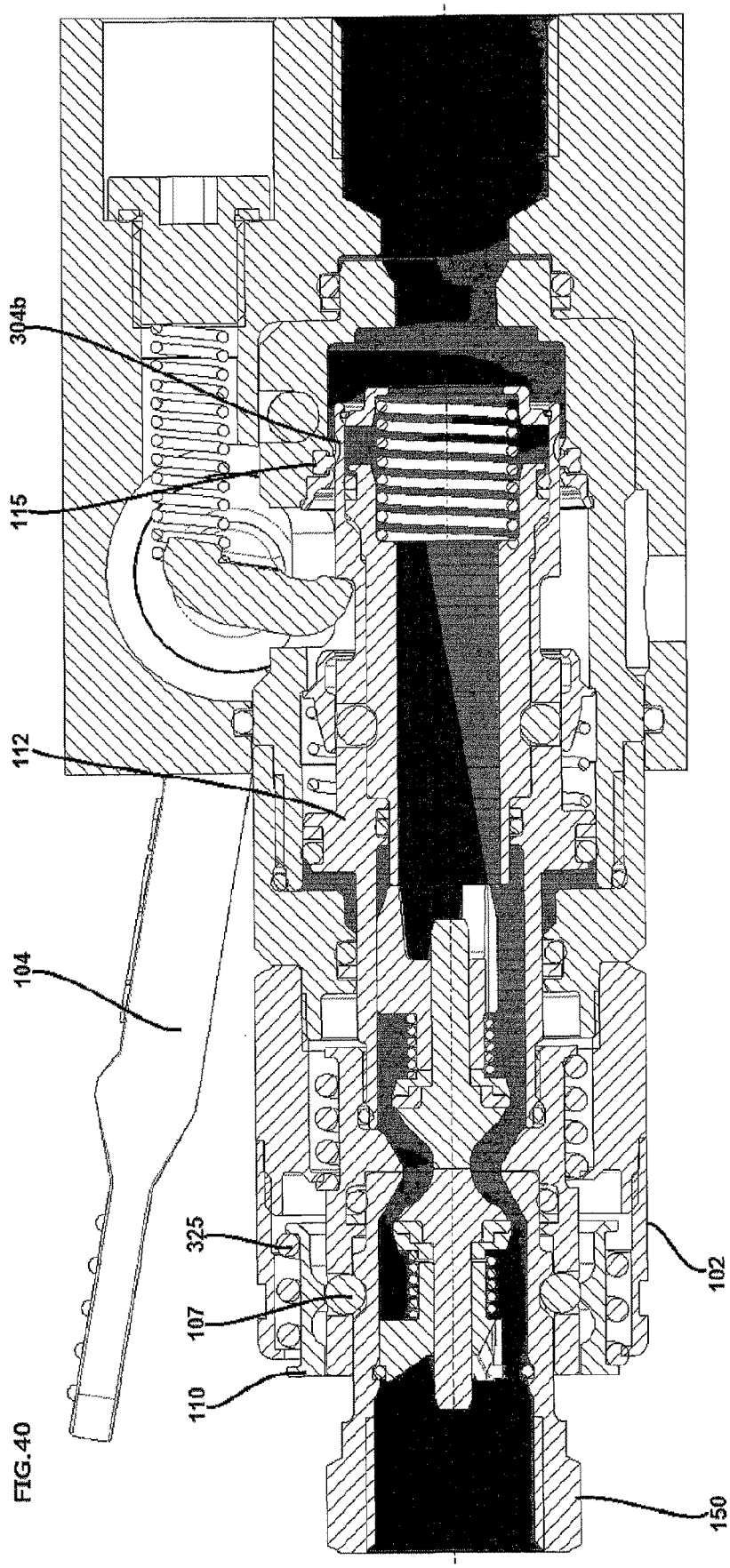

The disconnection method in the presence of pressure and simply by pulling the male coupling will be described below with reference to the figures from 40 to 43. Starting from the reciprocal connection of the male coupling 150 and female coupling 102 in FIG. 39, pulling the male coupling 150 towards the outside of the cartridge 102, the balls 107, by virtue of the friction generated by the pressure thrust, move the ring slider 110 outwards, thus compressing the spring 325 (FIG. 40).

A second series of decompression niches 304b is present in the balancing piston 112, which niches allow to eliminate the residual pressure previously present in the cartridge 102 because they create a passage gap between the balancing piston 112 and the seal 115.

Figure 41:
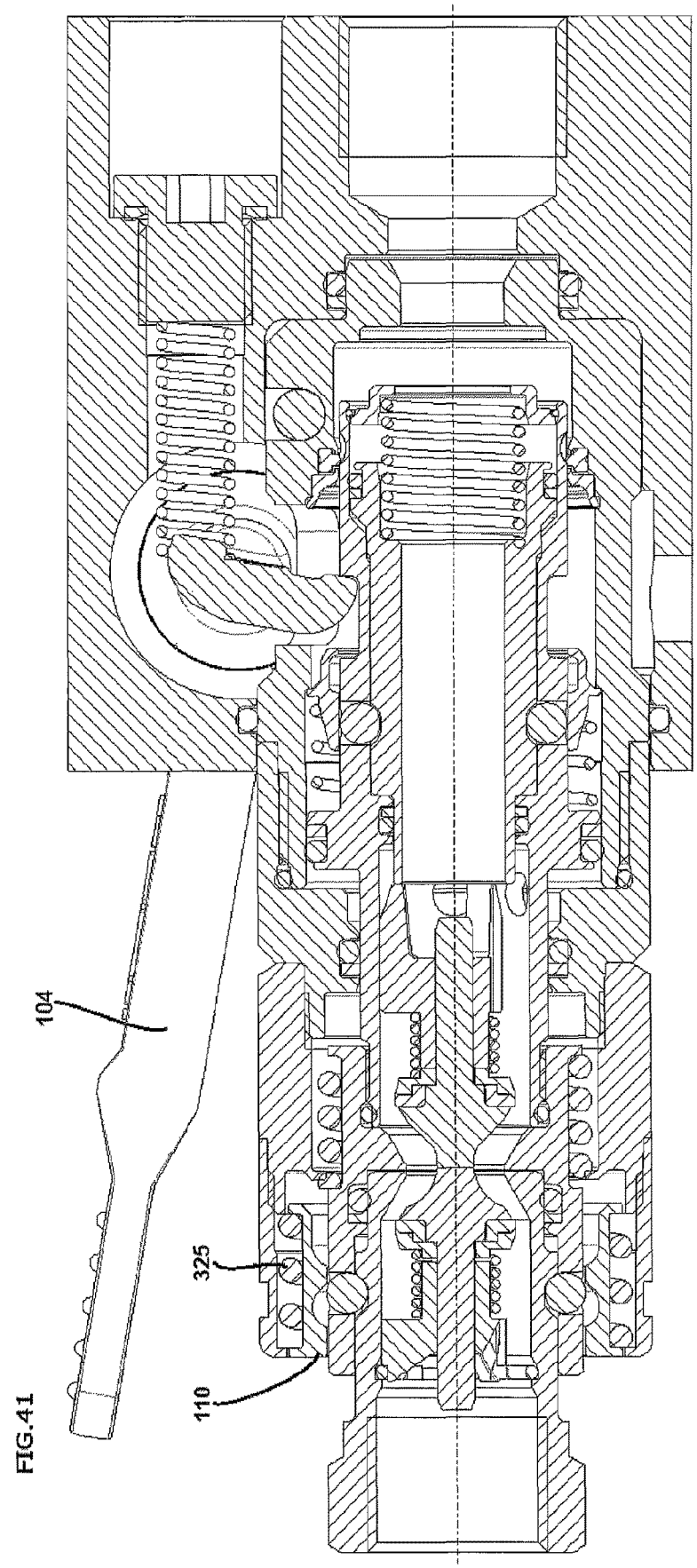

FIG. 41 shows how the ring slider 110 returns to position by virtue of the spring 325 after the decompression.

Figure 42:
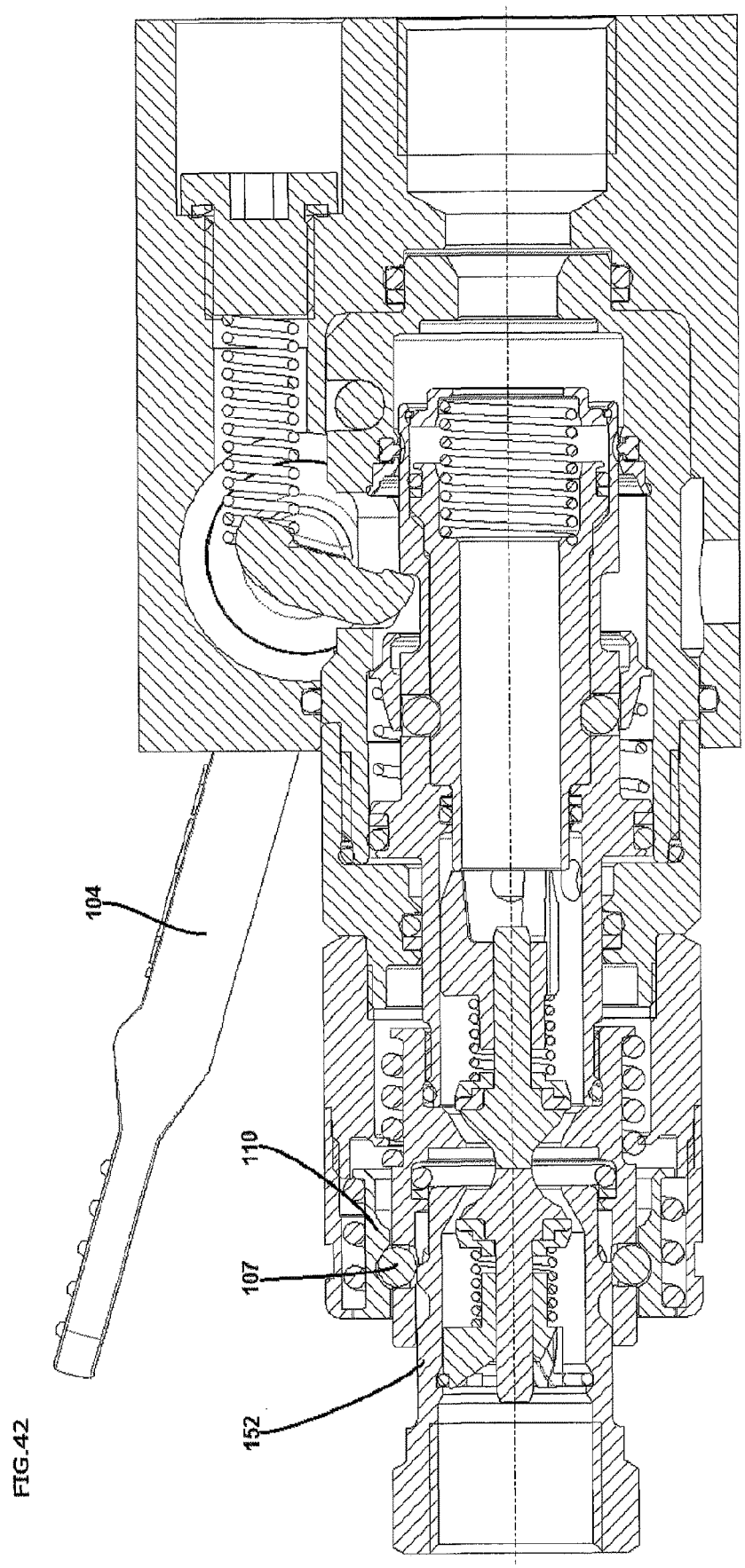

During the further step of disconnecting in FIG. 42, the pin 152 pushes the balls 107 into the groove of the ring slider 110.

Figure 43:
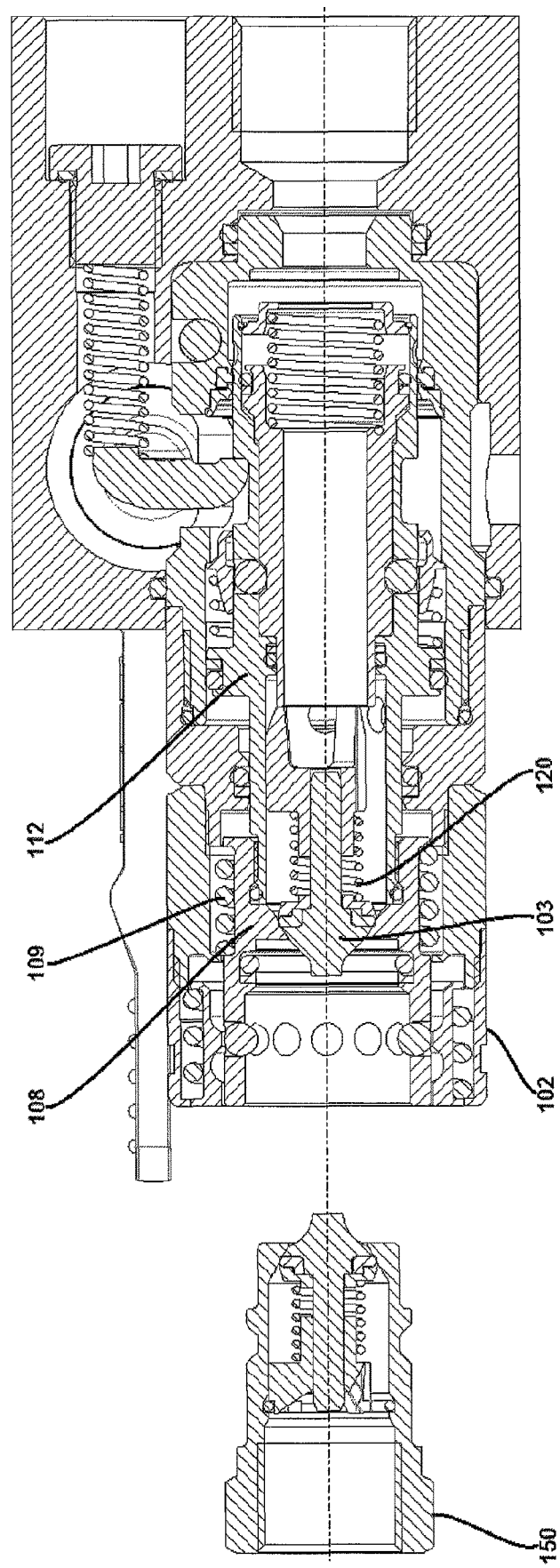

FIG. 43 shows the male coupling 150 and the cartridge 102 after the disconnection, where the spring 109 has repositioned the ball body 108 and the balancing piston 112, while the spring 120 has repositioned the valve 103 closing the oil passage.

The disconnection method in the presence of pressure and actuating the lever will be described below with reference to the figures from 44 to 48.

Figure 44:
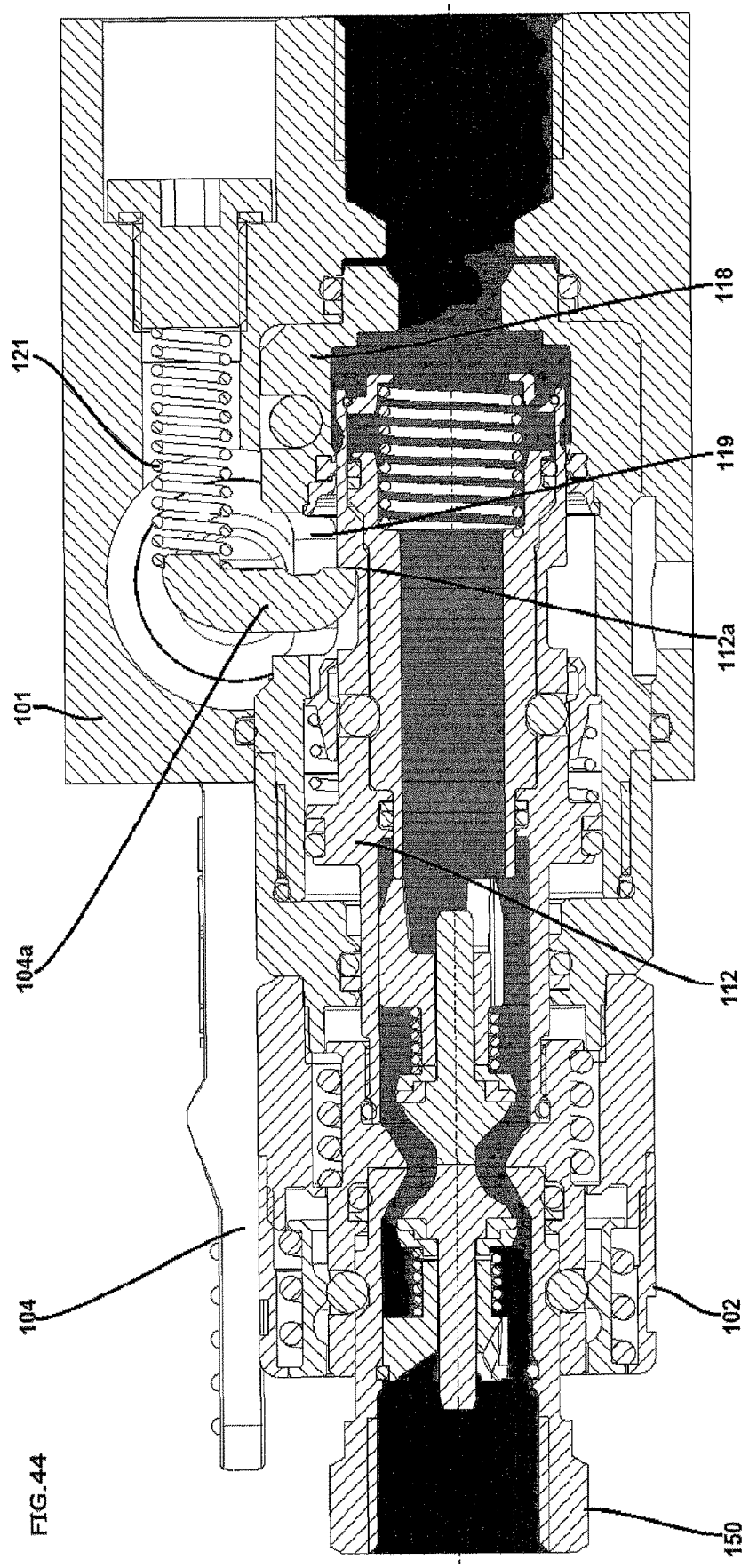
Figure 45:
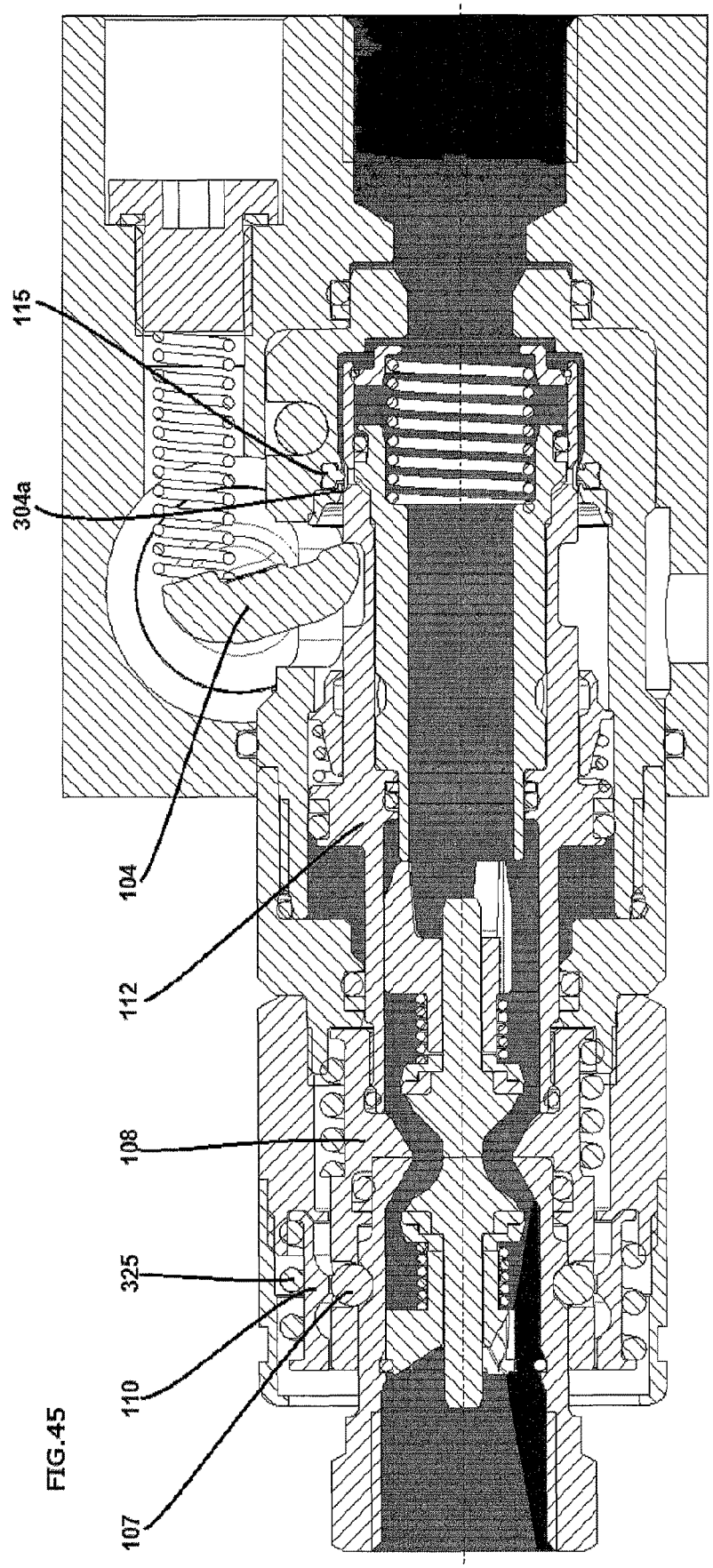

Starting from the reciprocal connection of the male coupling 150 and female coupling 102 in FIG. 44, the balancing piston 112 and the ball body 108 (FIG. 45) are retracted by pushing the lever 104 downwards, where the balls 107, by virtue of the friction generated by the pressure thrust, move the ring slider 110 inwards, thus compressing the spring 325. During this step, the seal 115 is at a series of decompression niches 304a, thus discharging the residual pressure present in the pipe.

Figure 46:
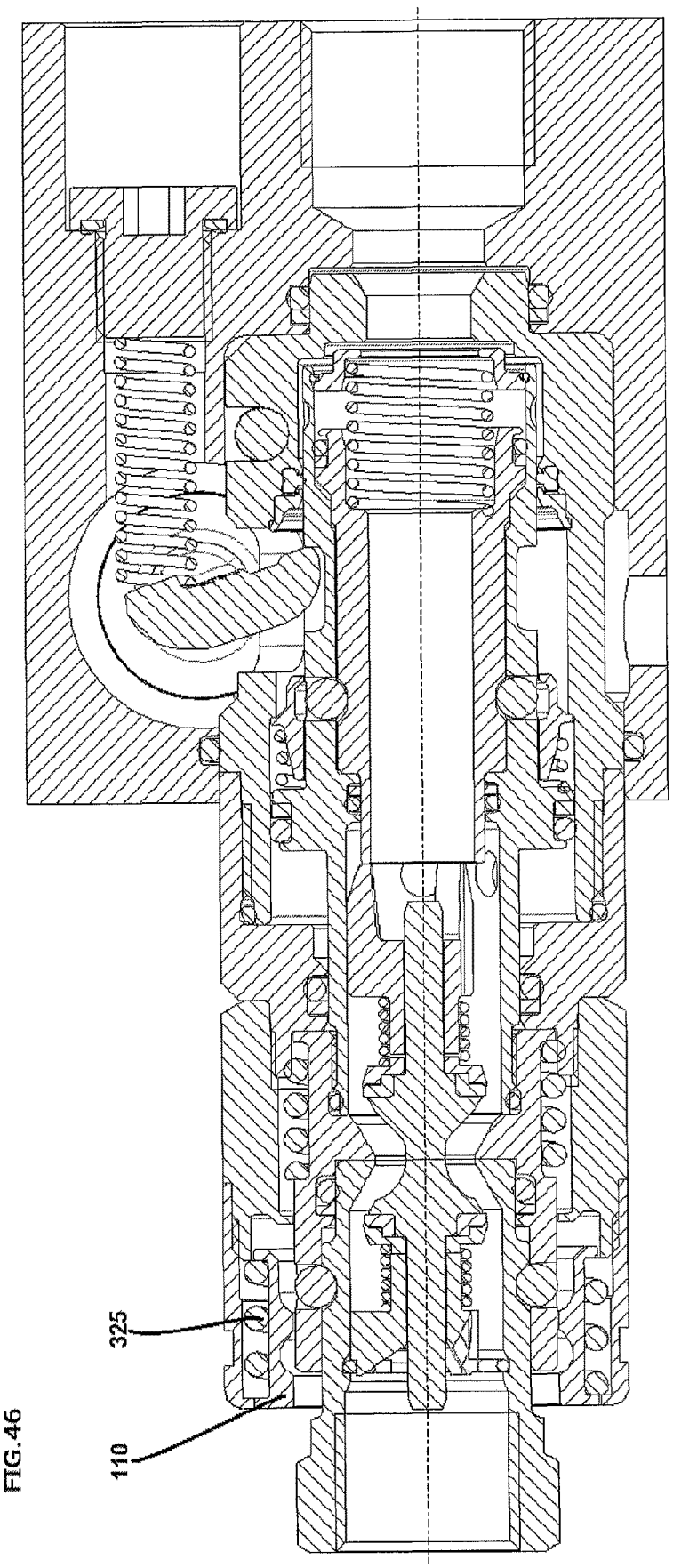
Figure 47:
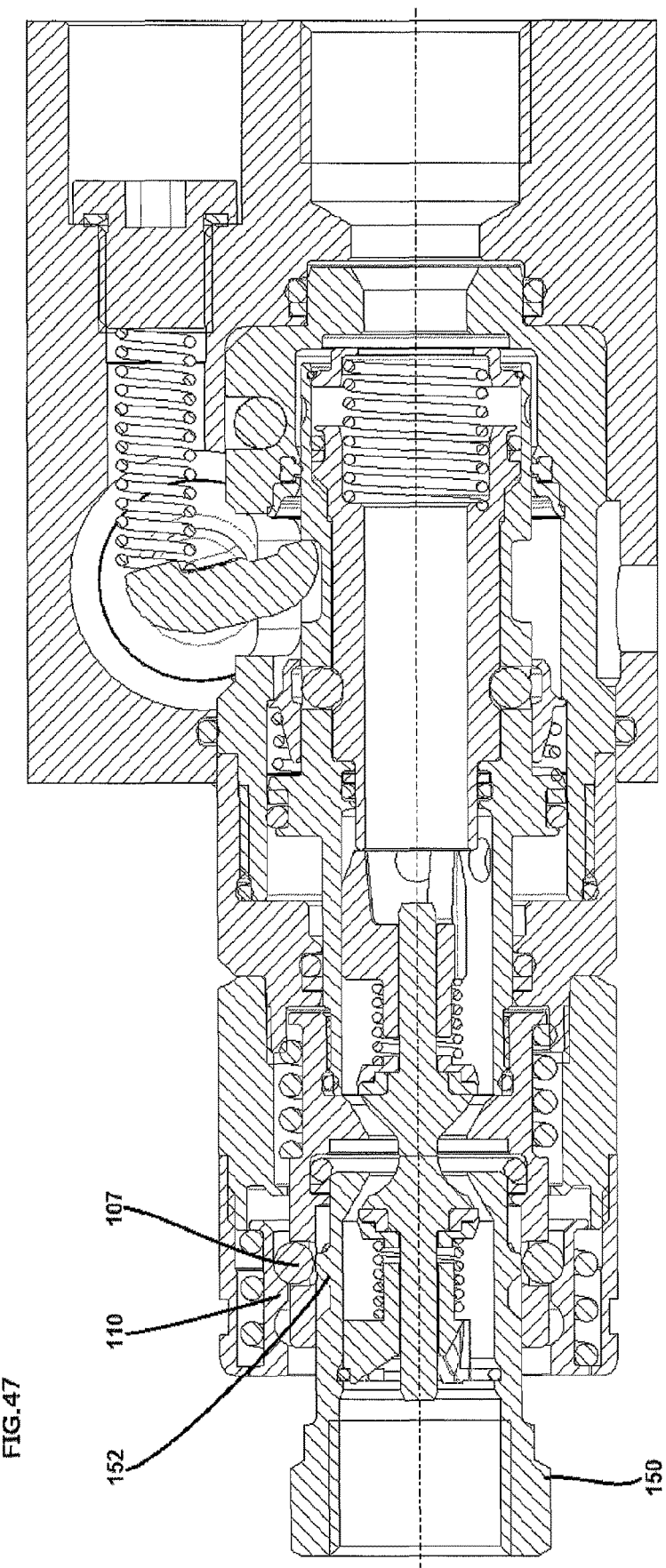

FIG. 46 shows how the ring slider 110 returns to position by virtue of the spring 325 after the decompression. At this point, a tooth present on the pin 152 of the male coupling 150 pushes the balls 107 into the seat present in the ring slider 110 as shown in FIG. 47.

Figure 48:
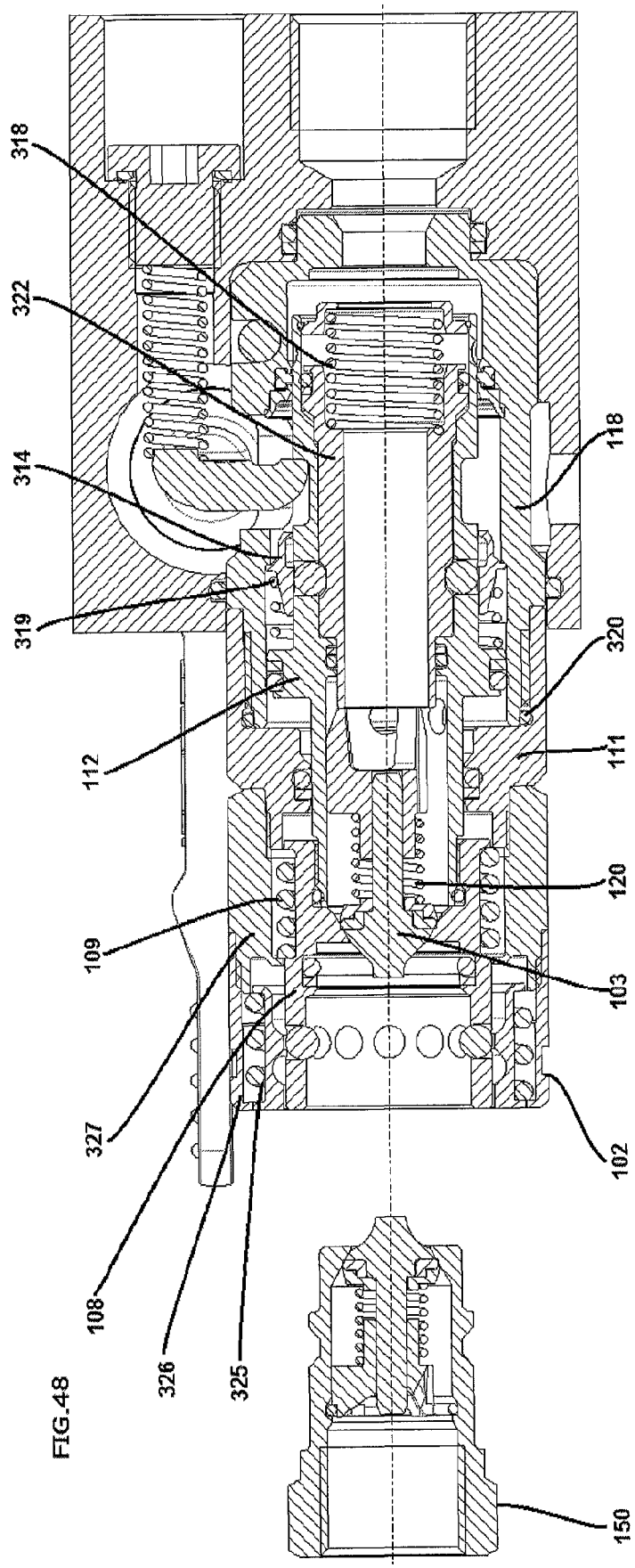

FIG. 48 shows the male coupling 150 and the cartridge 102 after the disconnection, where the spring 109 has repositioned the ball body 108 and the balancing piston 112, and the spring 120 has repositioned the valve 103 closing the oil passage.

Further two springs 318 and 319 reposition the inner slider 322 and the reference of the mechanical lock 314, where an O-ring type seal 320 is inserted between the central connector 111 and the adapter 118.

Two outer shells 326 and 327 are inserted to protect the inner components further creating resting planes for the springs 109 and 325.

We have thus shown how in the case of this embodiment the disconnection is possible in the presence of residual pressure either by pulling the male coupling or by actuating the lever. This feature is possible by virtue of the presence of a slider ring 110 (which can slide both towards the outside or the inside of the cartridge) and two series of decompression niches 304a and 304b positioned before and after the seal 115.

It is thus possible to implement such a feature also on the cartridges described above, simply by assembling the ring slider itself and providing a double series of decompression niches on the balancing piston.

A further embodiment of the present invention and of the respective connection and disconnection methods will be described below with reference to the figures from 49 to 60; in the figures from 49 to 60, component parts and/or features described above with reference to other figures are identified by means of the same reference numbers.

The female coupling according to the present embodiment allows push-pull type connection/disconnection, connection with coupling under pressure, disconnection in the presence of pressure (with actuation of the lever).

Figure 49:
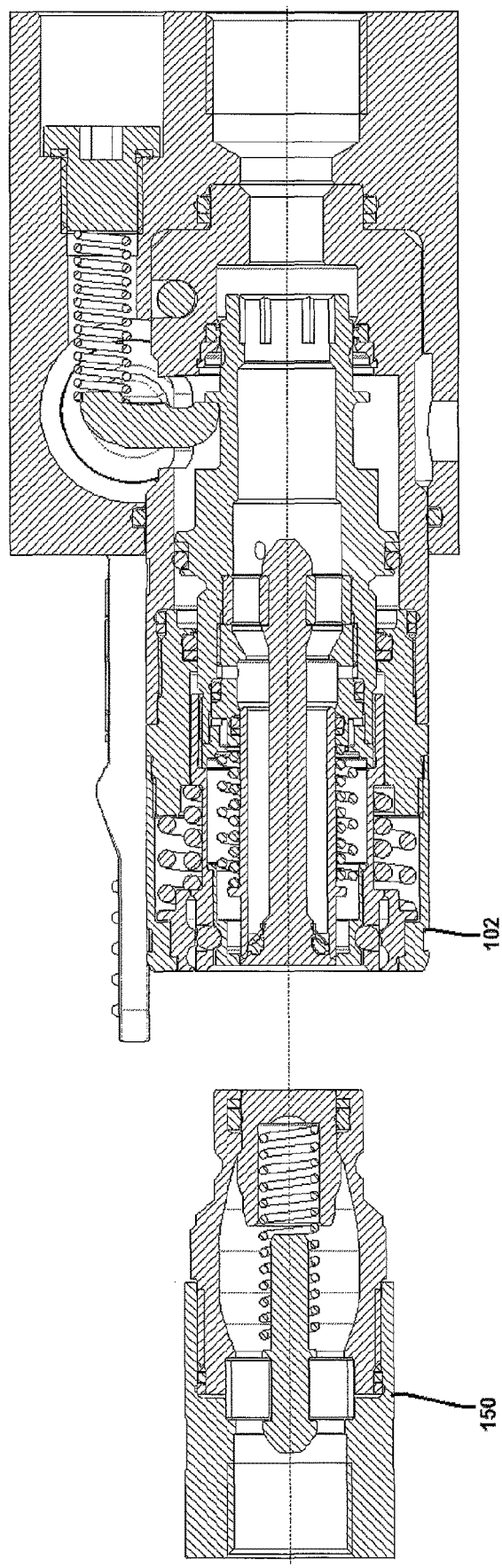
Figure 50:
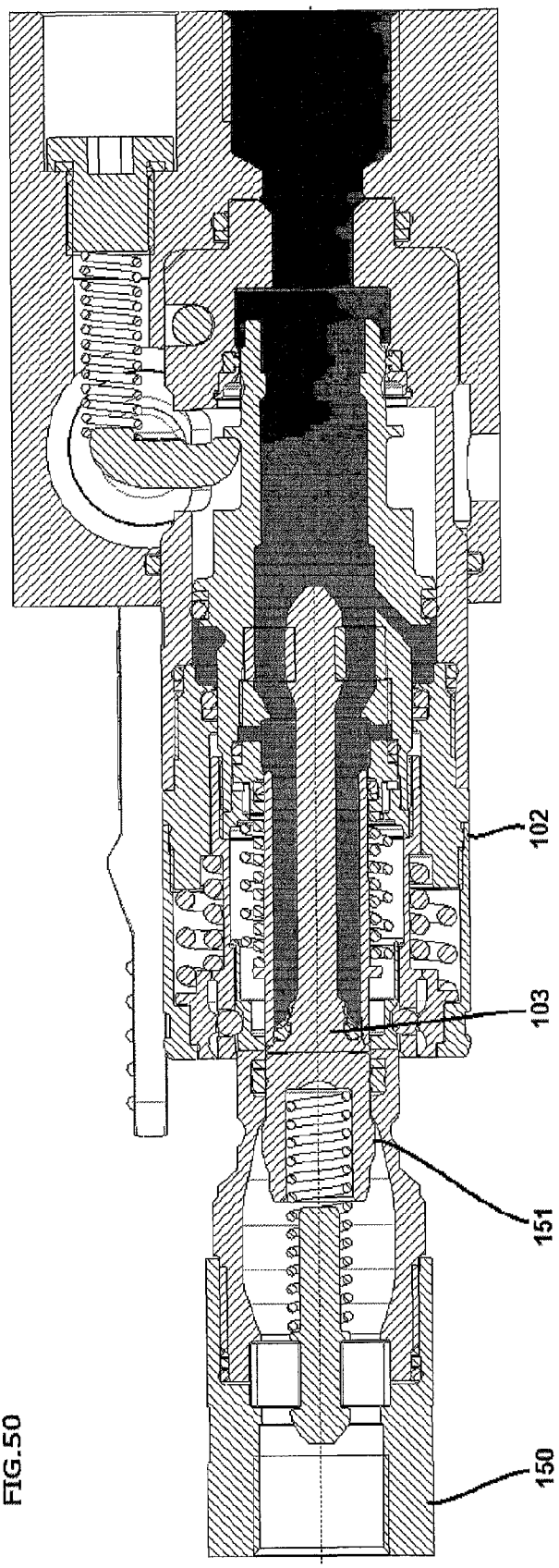

FIG. 49 shows the male coupling 150 according to standard ISO 16028 and the semi-integrated cartridge 102 reciprocally disconnected, while FIG. 50 shows a first step of connecting of the male coupling 150 in the cartridge 102 during which the valve 151 of the male coupling 150 enters into contact with the valve 103 of the cartridge 102. The dark part in the figure indicates the presence of residual pressure in the cartridge 102.

Figure 51:
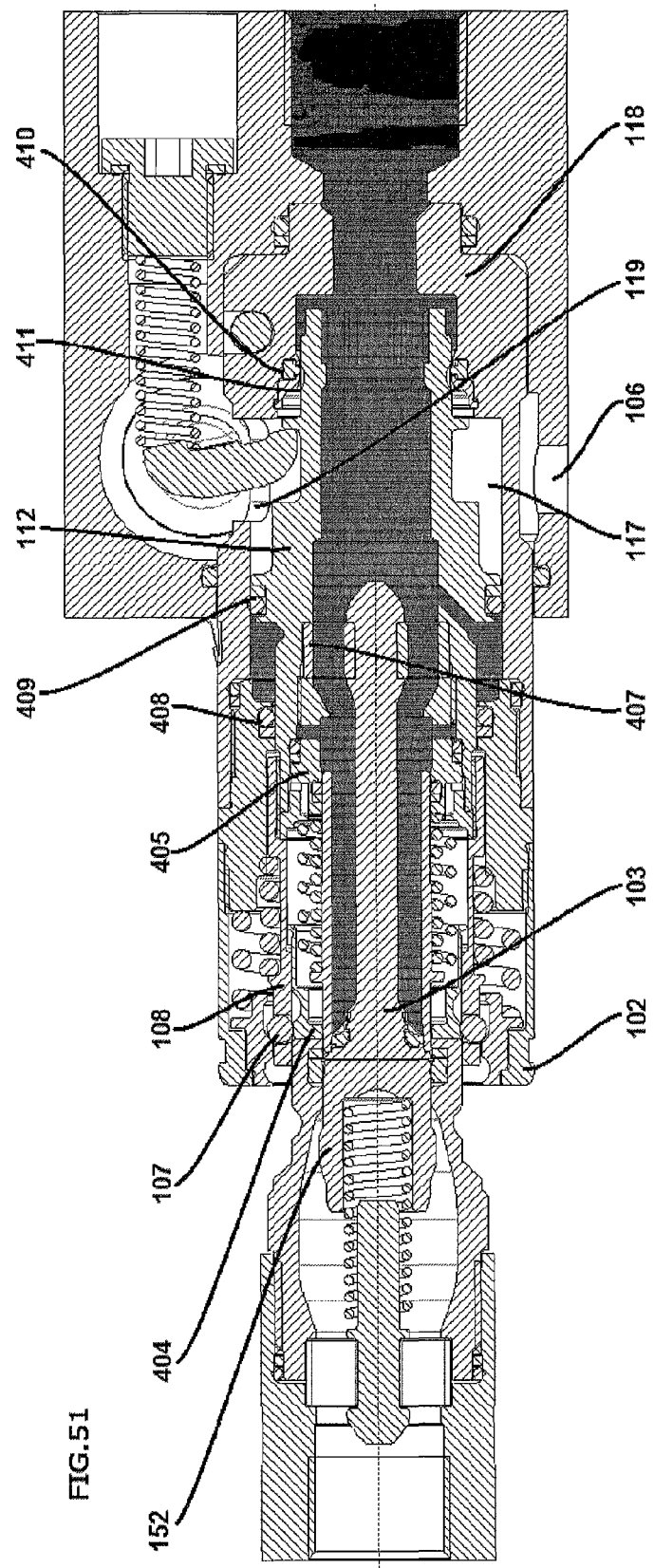

During the following step of connecting shown in FIG. 51, the pin 152 of the male coupling 150 pushes the outer slider 404 of the female coupling 102, where the ball body 108 is moved to retracted position by virtue of the particular shape of the outer slider 404 and the presence of the ball ring 107. An inner body 405, a balancing piston 112, two half-shells 407 and the valve 103 are connected to the ball body 108. The aforesaid component assembly is hydraulically balanced by virtue of the particular arrangement of the seals 408, 409 and 410.

Decompression niches 411 are present in the balancing piston 112 and allow to eliminate the residual pressure previously present in the cartridge 102 because they create a passage gap between the balancing piston 112 and the seal 410.

The decompressed oil enters into a circular crown-shape chamber 117 obtained between the balancing piston 112 and the adapter 118, where a hole 119 is present in the adapter 118 through which the oil may spill out, which oil then exits from the hole 106, to be possibly recovered.

Figure 52:
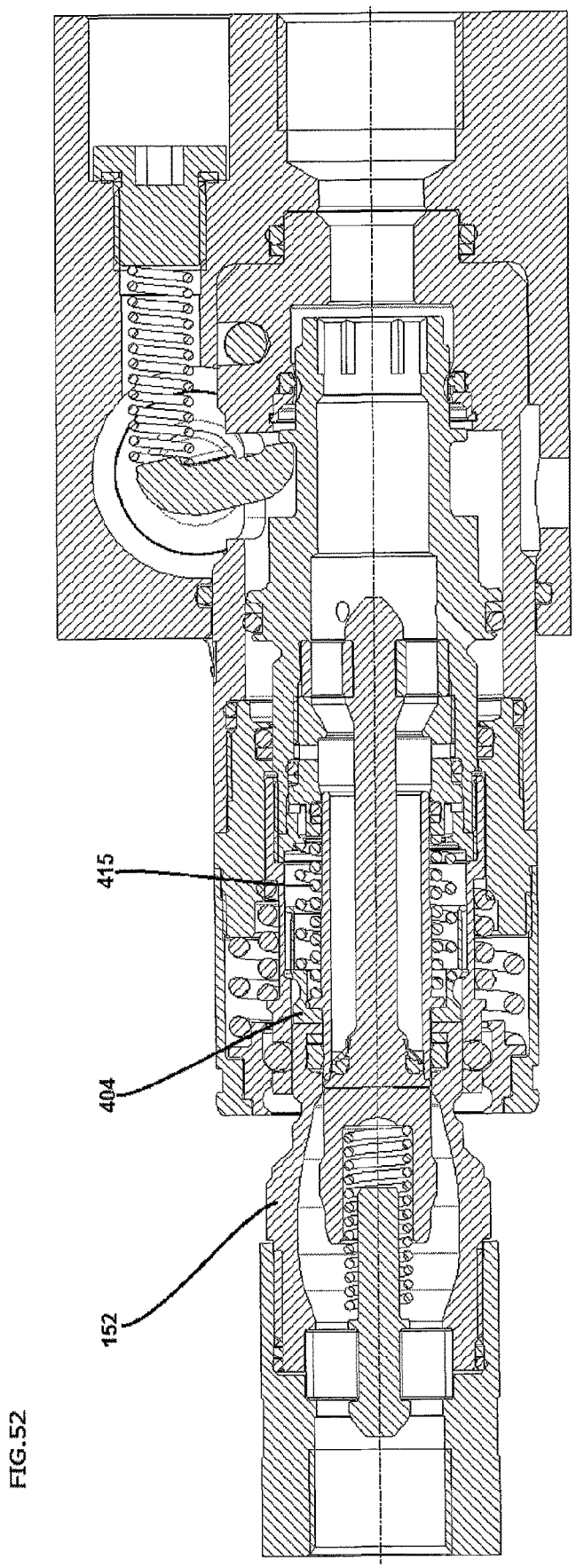

FIG. 52 shows a next step of connecting, during which the pin 152 of the male coupling pushed the outer slider 404 into contact with the inner slider 415. It is worth noting that the pressure in the cartridge was released.

Figure 53:
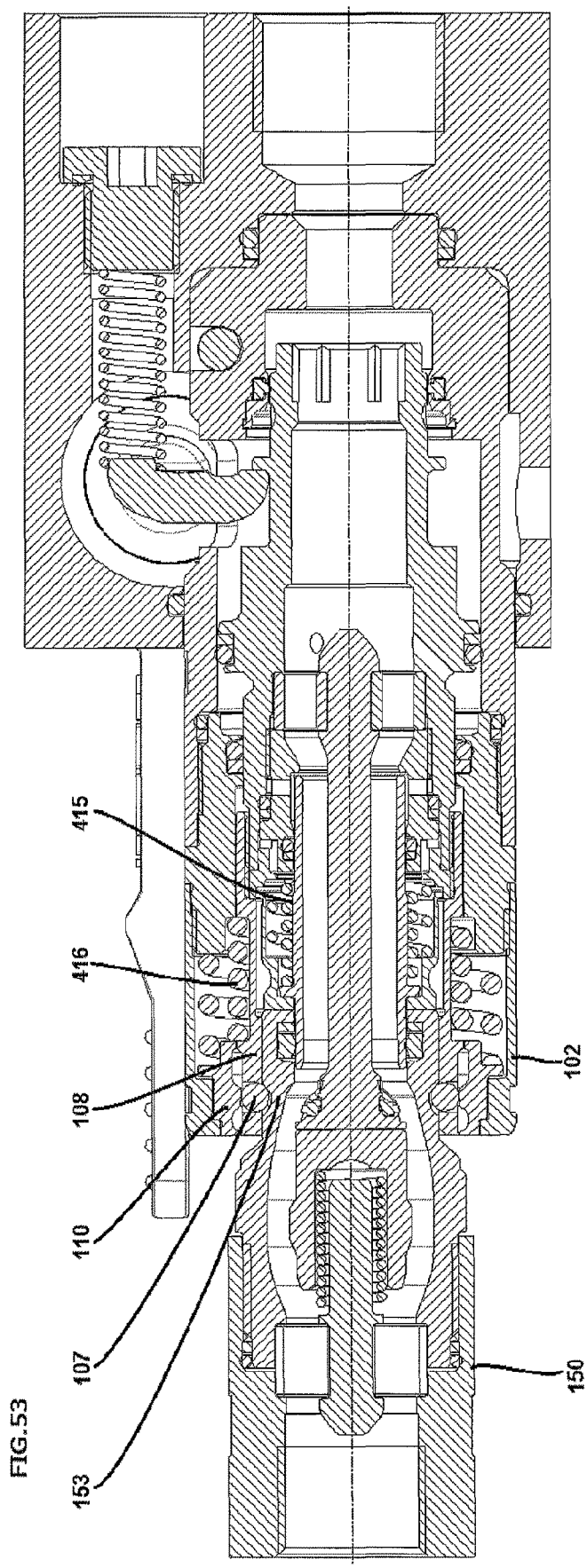

FIG. 53 shows the male coupling 150 and female coupling 102 mutually connected, where the spring 416 has repositioned the ball body 108 and all the components connected thereto. The balls 107 are locked between the groove 453 and the ring slider 110, where the inner slider 415 is in retracted position thereby opening the oil passage.

The disconnection of the male coupling 150 from the female coupling 102 in the absence of residual pressure and simply by pulling the male coupling 150 towards the outside the cartridge 102 is described below with reference to figures from 54 to 56.

Figure 54:
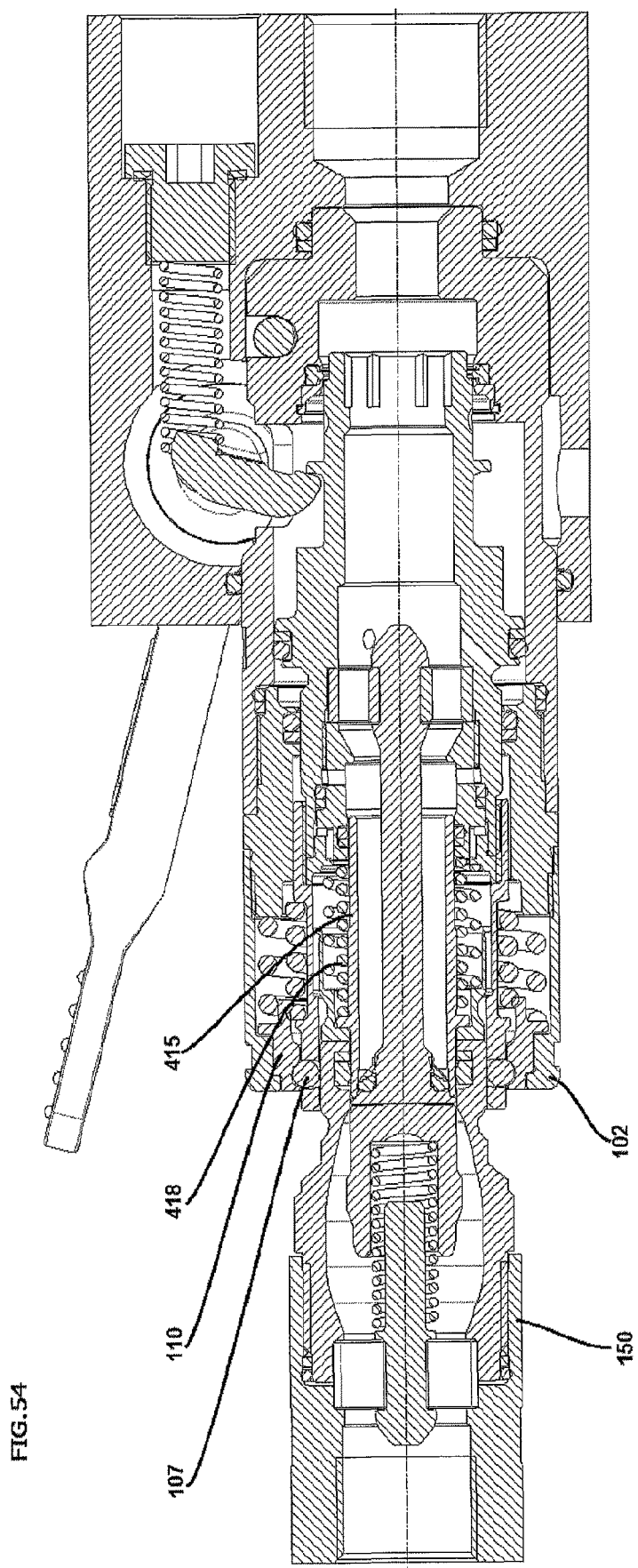

Starting from the coupled position in FIG. 53, the balls 107 are repositioned at a groove present inside the ring slider 110 (FIG. 54) by pulling the male coupling 150 towards the outside of the cartridge 102, where the inner slider 415 returns to position pushed by the spring 418, and thus closing the oil passage.

Figure 55:
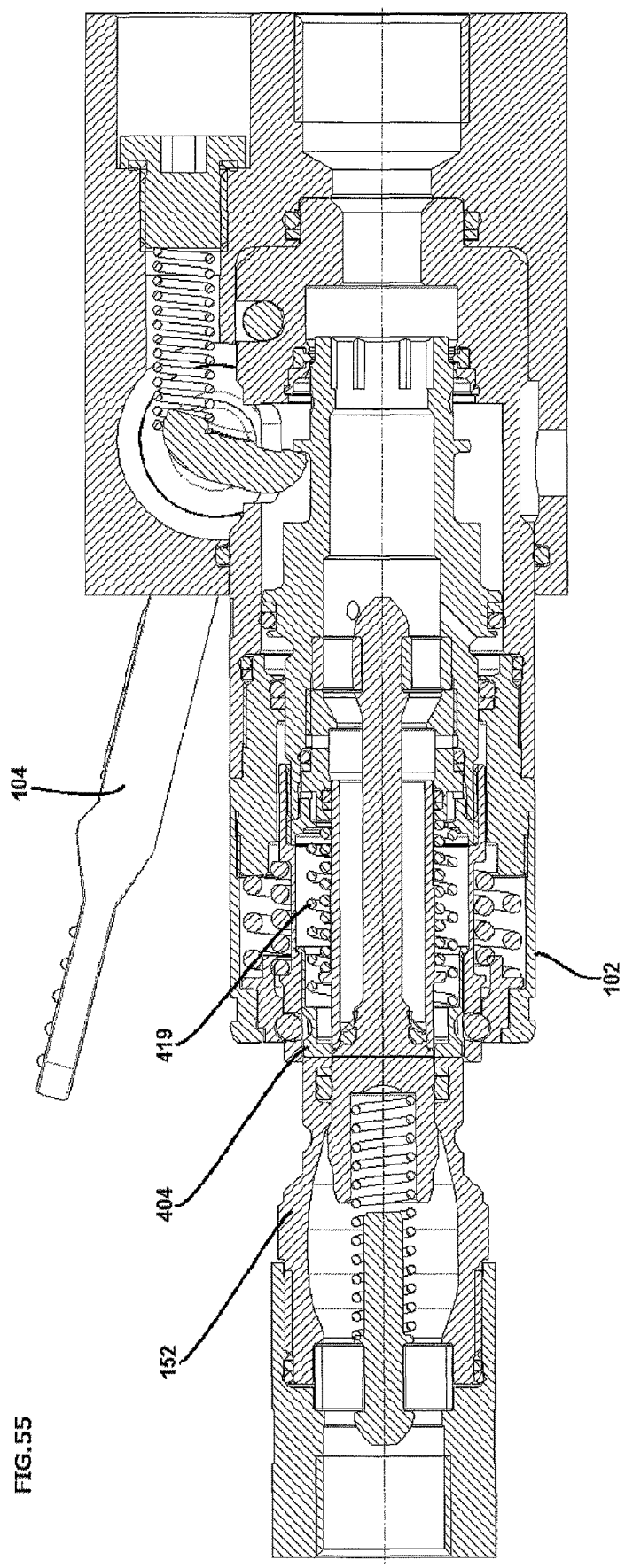

During the further step in FIG. 55, the pin 152 exits from the cartridge 102, where the outer slider 404 is repositioned by the spring 419.

Figure 56:
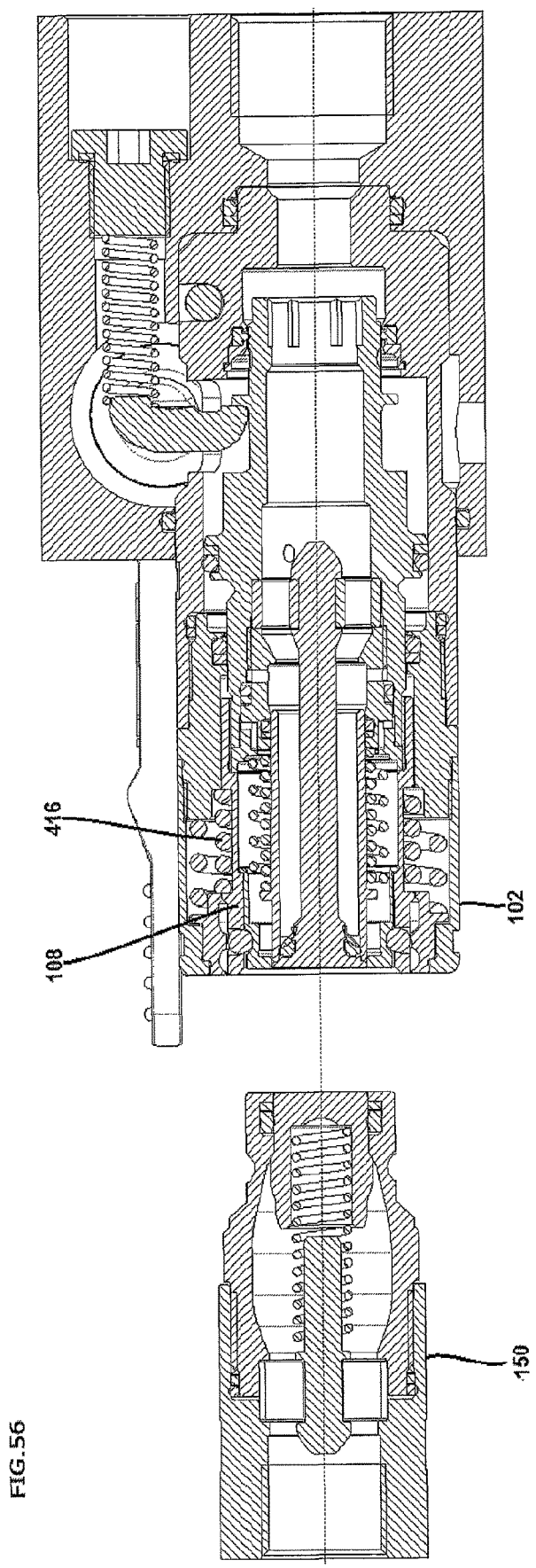

Finally, as shown in FIG. 56, with the completion of the disconnection of the male coupling 150 from the cartridge 102, the spring 416 repositions the ball body 108 and all the components connected thereto.

Figures from 57 to 60 show the disconnection of the male coupling 150 from the female coupling 102 in the presence of residual pressure and by actuating the lever 104.

Figure 57:
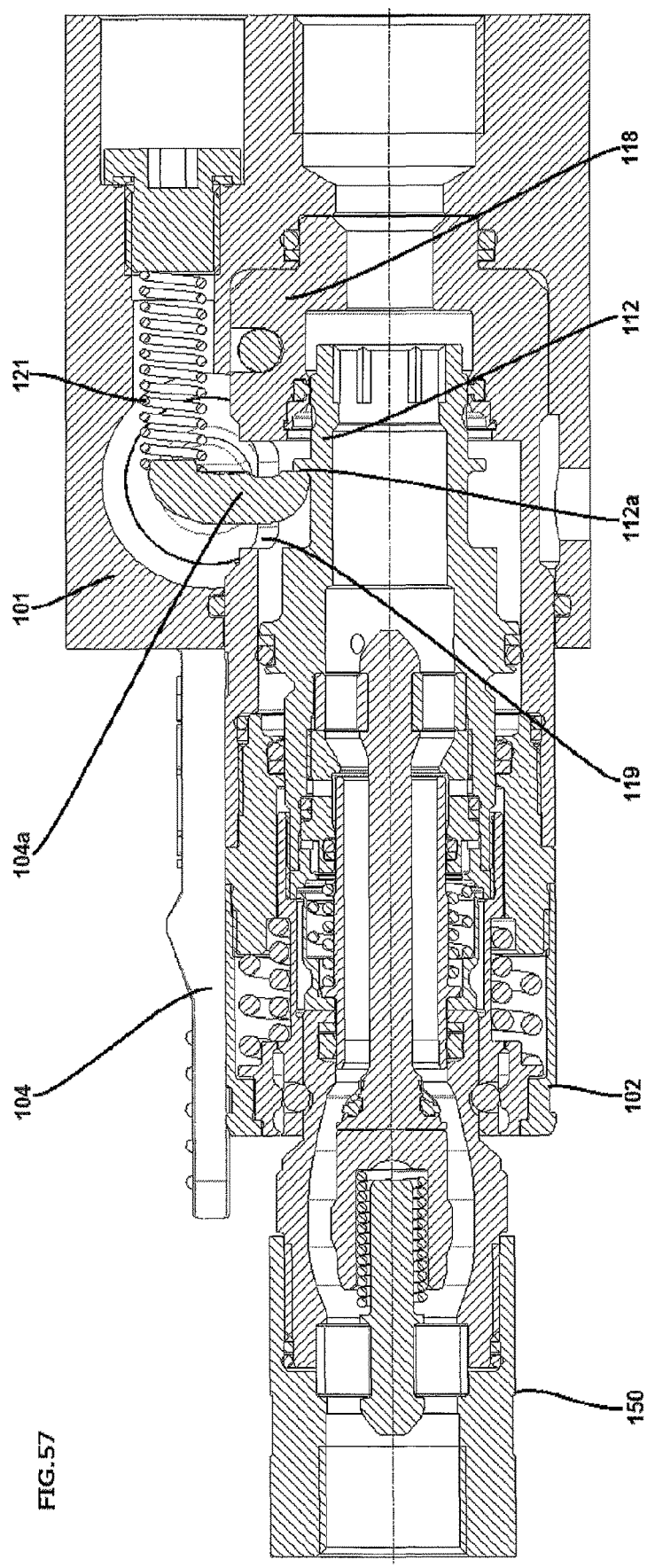

In FIG. 57 the male coupling 150 is shown connected to the cartridge 102; where the leg 104a of the lever 104 is in contact with a surface 112a of the balancing piston 112 by virtue of the thrust of the spring 121.

Figure 58:
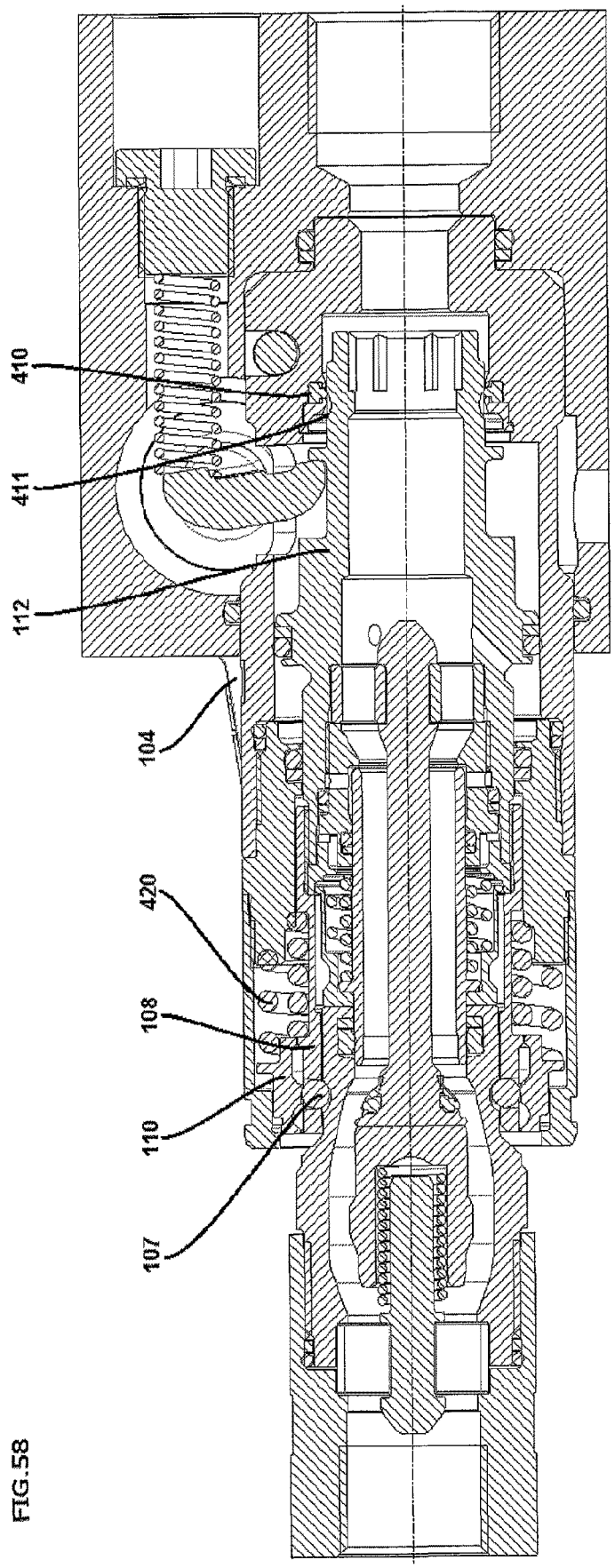

FIG. 58 shows instead how the retraction of the balancing piston 112 and of the ball body 108 and of all the components connected thereto is obtained by pushing the lever 104 downwards (anticlockwise with respect to the figure), where the balls 107, by virtue of the friction generated by the pressure thrust, move the ring slider 110 inwards, compressing the spring 420, and where the seal 410 is at the decompression niches 411 and the residual pressure is discharged.

Figure 59:
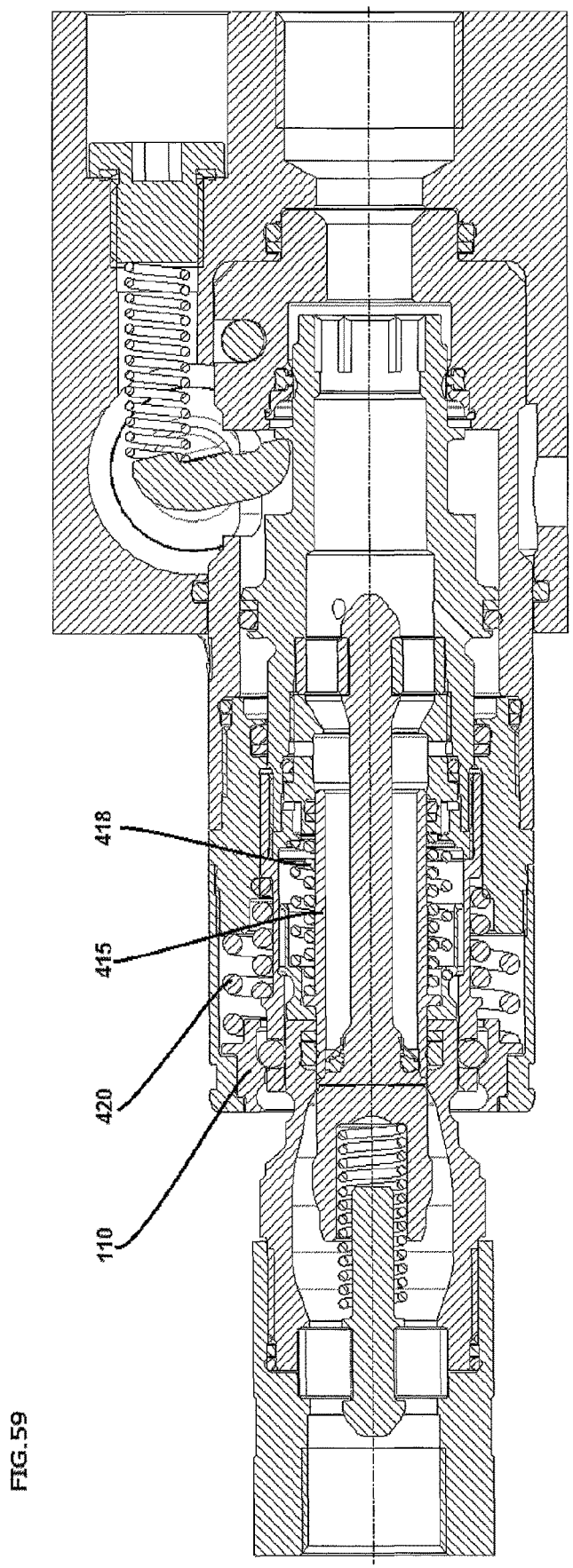

At this point, once the friction of the balls has ceased, the ring slider 110 is repositioned by the spring 420 and the inner slider 415 returns to position pushed by the spring 418 thereby closing the oil passage (FIG. 59).

Figure 60:
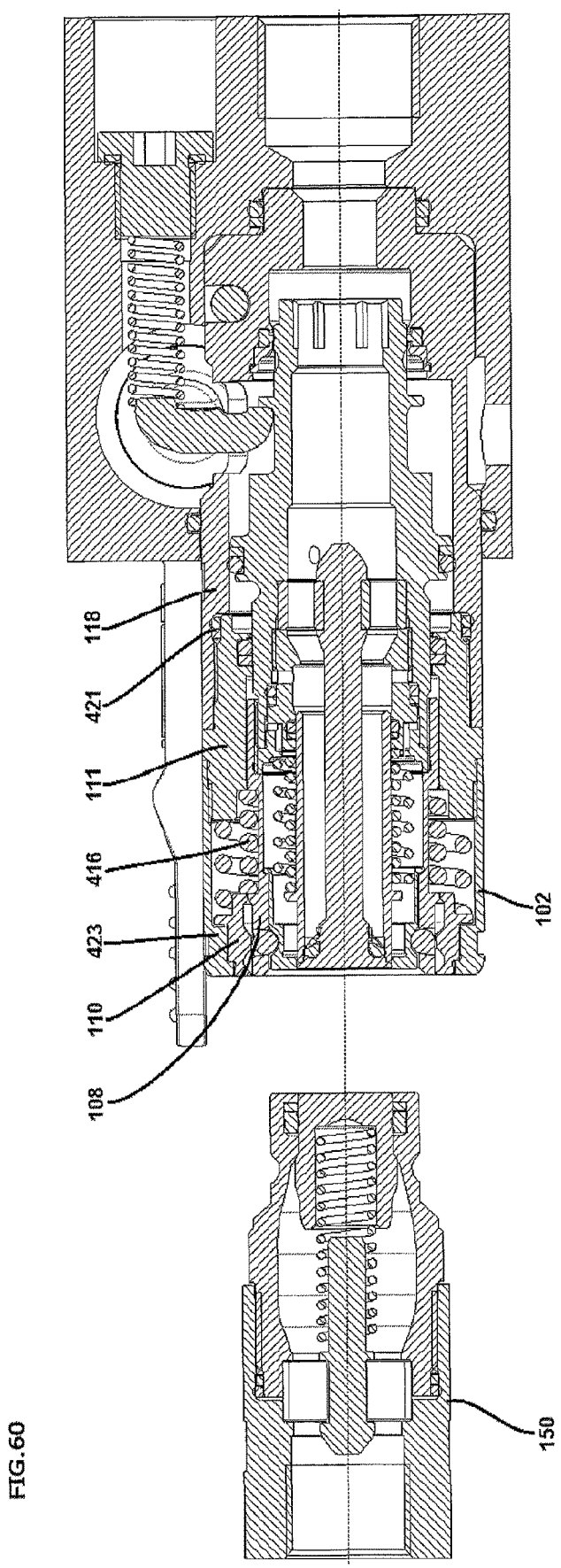
Figure 61:
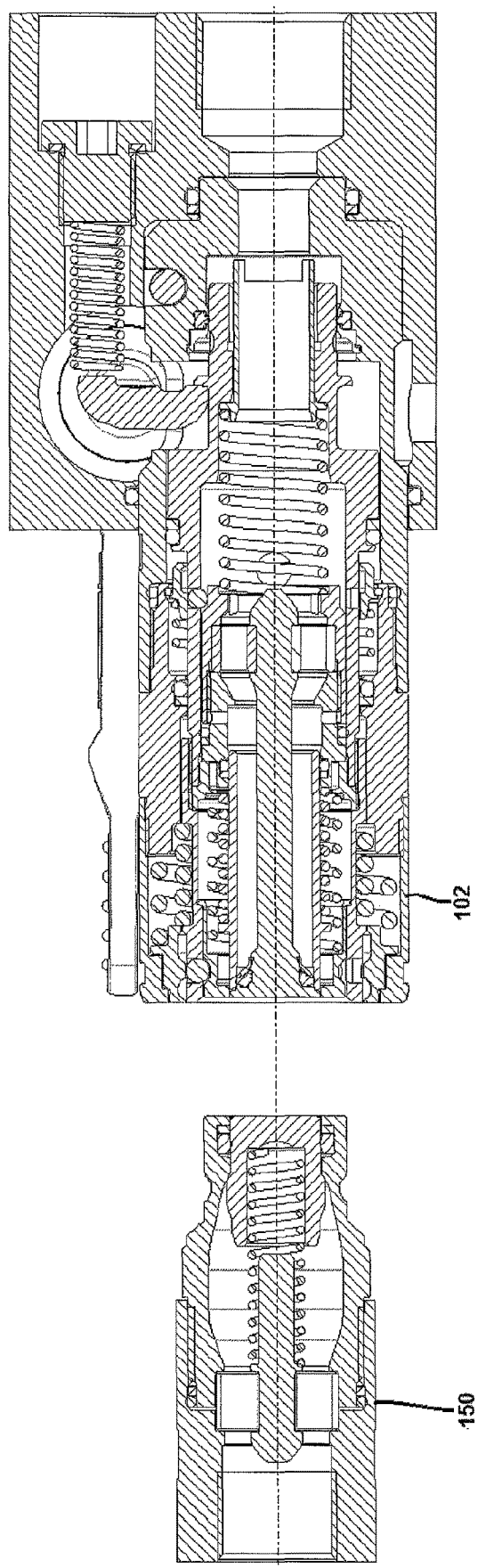

Finally, FIG. 60 shows the male coupling 150 and female coupling 102 after the disconnection, where the spring 416 has repositioned the ball body 108 and all the components connected thereto. Furthermore, the O-ring type seal 421 is inserted between the central connector 111 and the adapter 118, an outer ring 423 being inserted to protect the inner components and to create a mechanical stop for the ring slider 110.

A further embodiment of the coupling according to the present invention and of the respective connection and disconnection methods will be described below with reference to figures from 61 to 73, where in the figures from 61 to 73, component parts and/or features previously described above with reference to other figure are identified by means of the same reference numerals. The cartridge according to the present invention allows push-pull type connection/disconnection, connection in the presence of residual pressure, disconnection in the presence of residual pressure (by actuating the lever), connection with pressurized male connection and an opening ratio equal to about 2.5:1.

Figure 62:
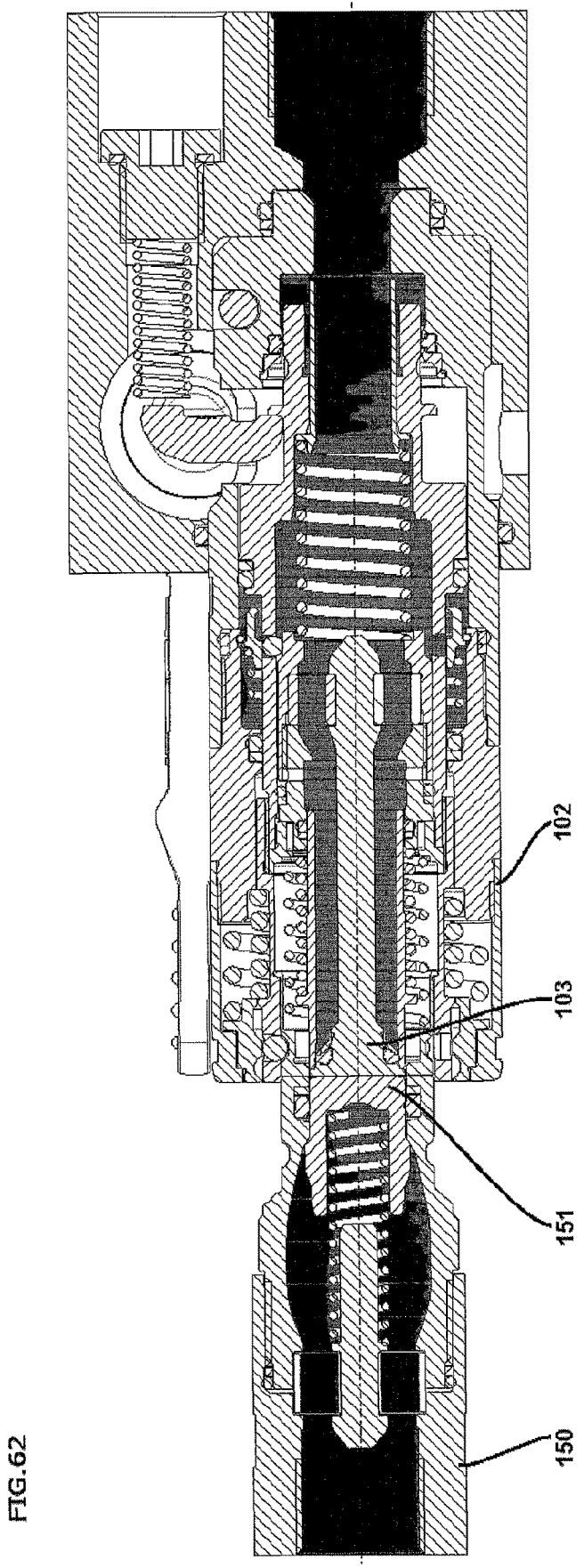

During the first step of connecting shown in FIG. 62, the valve 151 of the male coupling 150 enters into contact with the valve 103 of the cartridge 102. The dark part in the figure indicates the presence of pressure in the cartridge 102 and in the male coupling 150.

Figure 63:
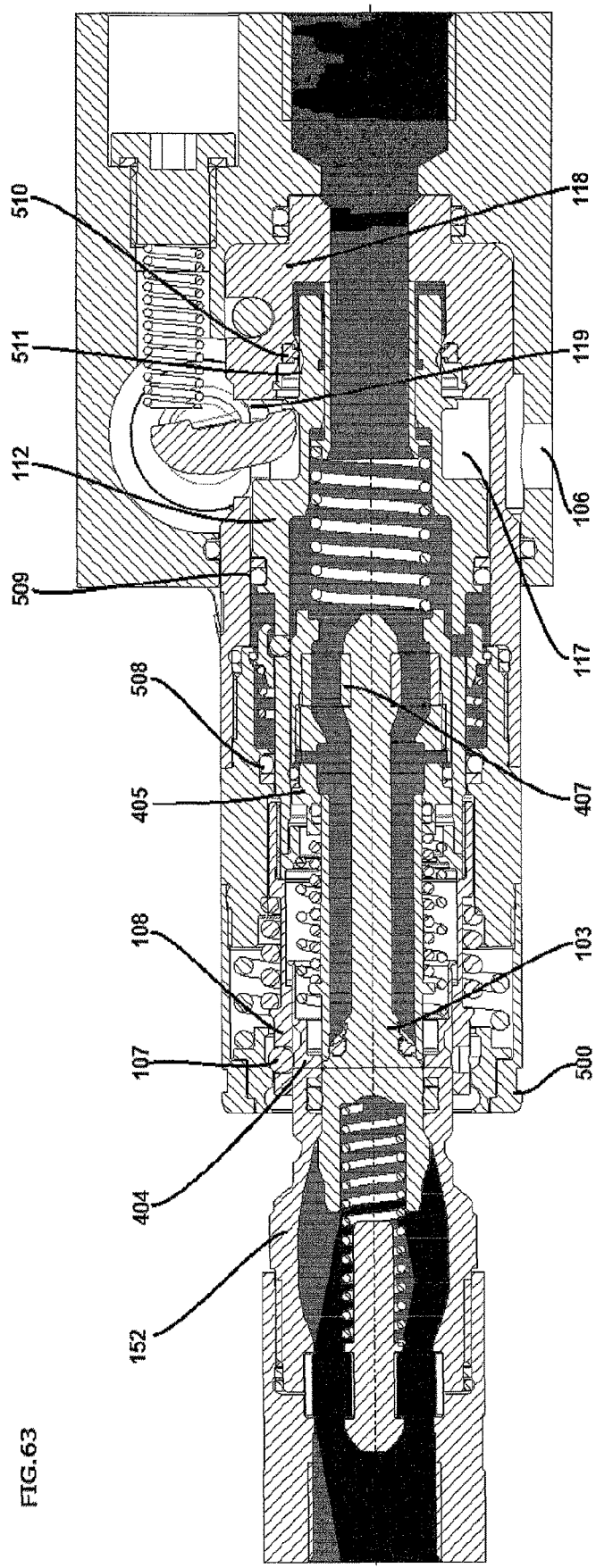

FIG. 63 shows a next step of connecting in which the pin 152 of the male coupling 150 pushes the outer slider 404 of the female coupling, where by virtue of the particular shape of the outer slider 404 and the presence of the ball ring 107, the ball body 108 is moved to retracted position. An inner body 405, a balancing piston 112, two half-shells 407 and the valve 103 are connected to the ball body 108. The aforesaid component assembly is hydraulically balanced by virtue of the particular arrangement of the seals 508, 509 and 510.

Decompressing niches 511 are present in the balancing piston 112 which allow the elimination of the residual pressure previously present in the cartridge 102 because they create a passage gap between the balancing piston 112 and the seal 510, where the decompressed oil enters into a crown-shaped chamber 117 obtained between the balancing piston 112 and the adapter 118 by virtue of a hole 119 present in the adapter 118 from which it may pour out and then exit from the hole 106, and be possibly recovered.

Figure 64:
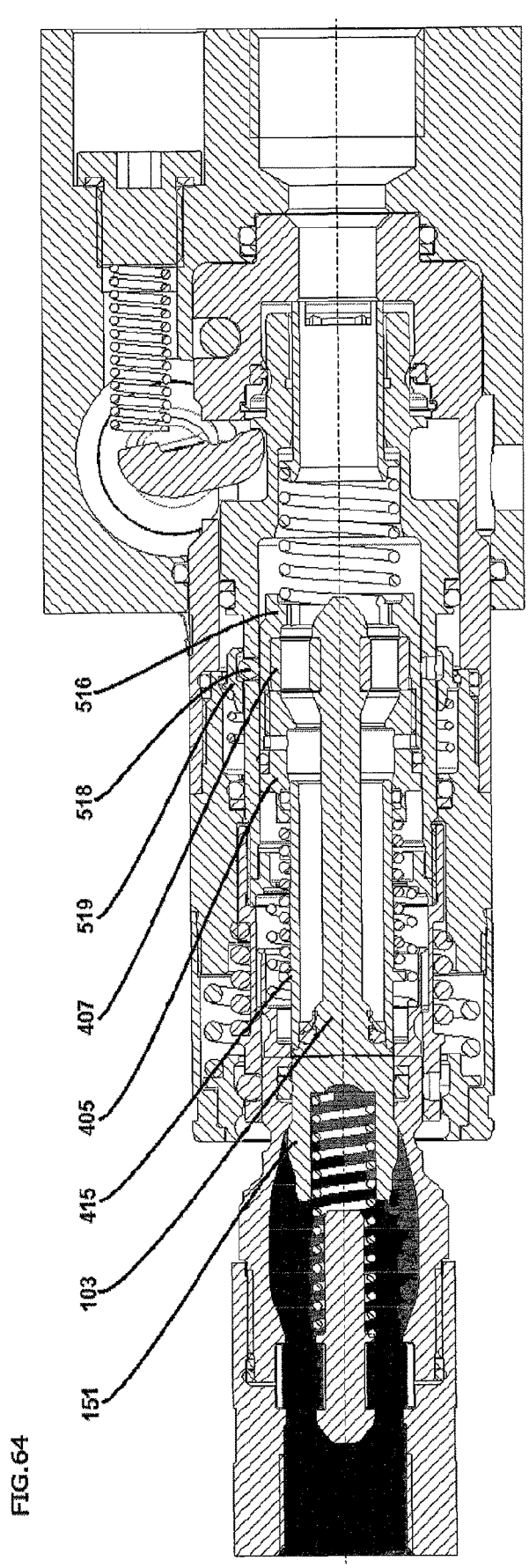

During the step after the connection in FIG. 64, the valve 151 of the male coupling 150, by pushing the valve 103, also retracts the following components: half-shells 407, inner body 405, mechanical block body 516 and inner slider 415, where the mechanical block balls 518 are pushed into the mechanical lock stop seat 519. It is worth noting that the pressure in the cartridge 102 was released.

Figure 65:
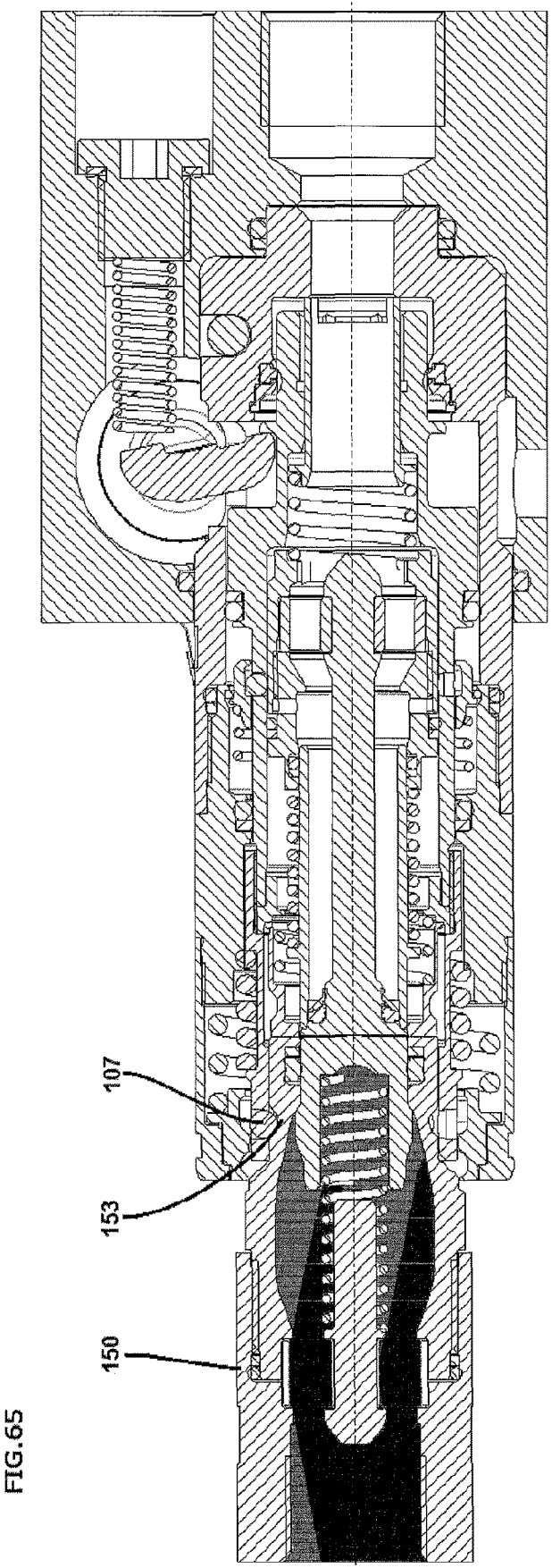
Figure 66:
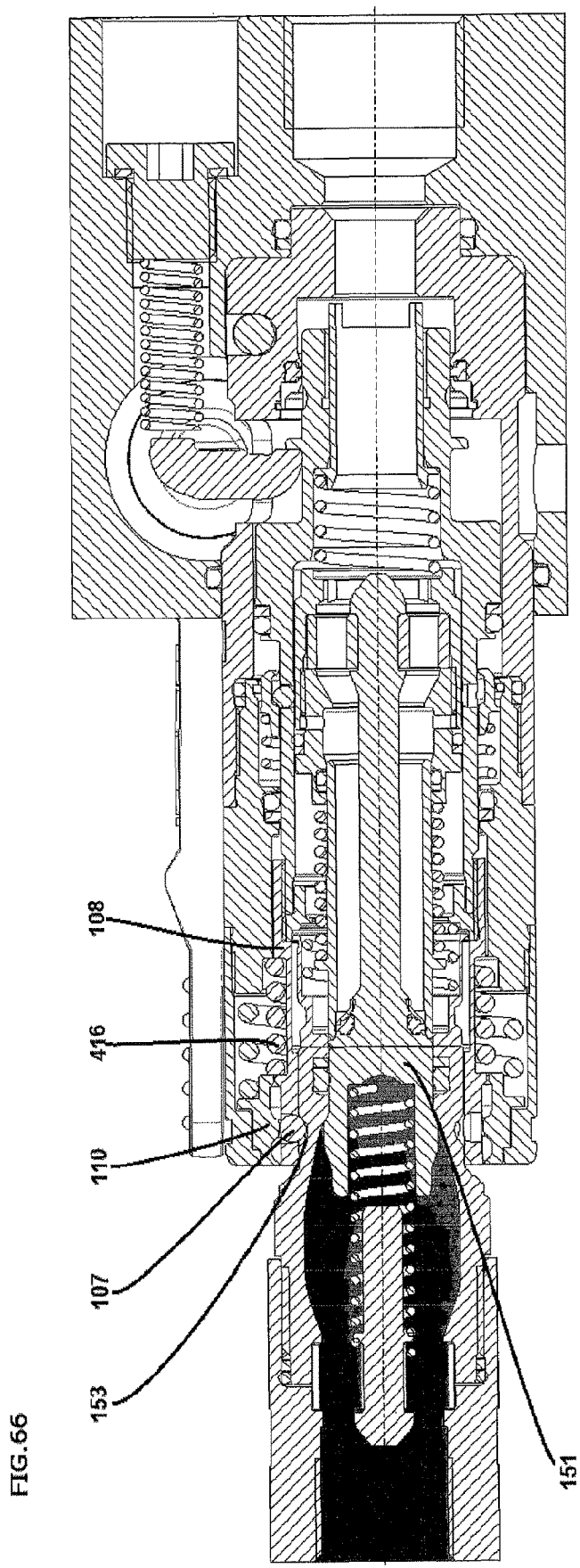

FIG. 65 shows a next step of connecting in which the balls 107 are at the groove 453 of the male coupling 150, where the spring 416 has repositioned the ball body 108 and all the components connected thereto and the balls 107 are locked between the groove 453 and the ring slider 110 with the male coupling 150 connected to the female coupling 102.

It is worth noting that the male coupling 150 is connected to the female part but the valve 151 is still closed, thereby maintaining pressure in the male coupling.

In order to open the valve 151 of the male coupling 150 it is thus sufficient to pressurize the cartridge 102. For the purpose, a component assembly is present in the cartridge 102 consisting of inner body 405, mechanical lock body 516, half-shells 407 and valve 103, which is hydraulically imbalanced by virtue of the seals 521 and 522 which work on the two different diameters.

Figure 67:
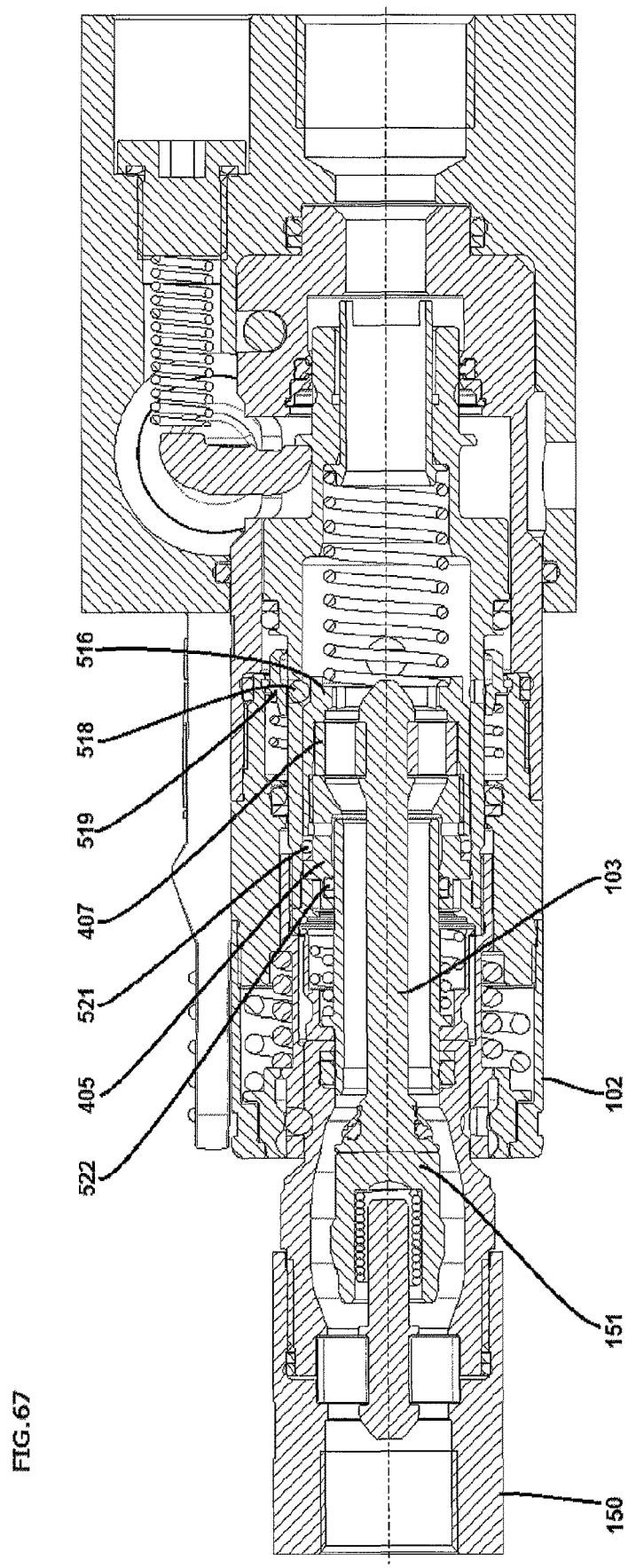

Therefore, in order to open the valve 151 of the male coupling 150 it is sufficient to apply a pressure considerably lower pressure than that present in the male coupling (opening ratio). FIG. 67 shows the performed coupling with respective opening of the valves.

It is worth noting that the mechanical lock body 516 is locked in position by a crown of balls 518 which cannot move radially because of the presence of the stop 519 which prevents their displacement (such a system is usually referred to as a "mechanical lock").

The disconnection method in the absence of pressure and simply by pulling the male coupling 150 towards the outside of the cartridge 102 will be described below with reference to the figures from 68 to 69.

Figure 68:
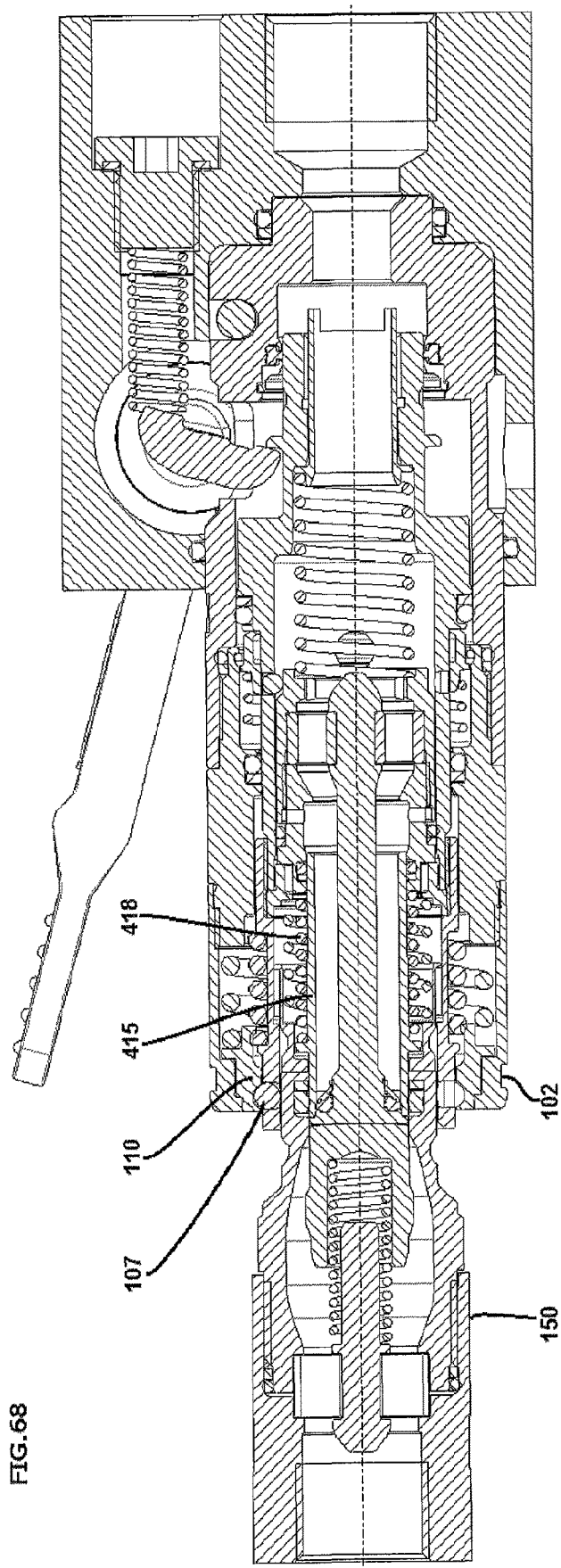

Starting from coupled position in FIG. 67 and pulling the male coupling 150 towards the outside of the cartridge 102, the balls 107 are repositioned at a groove present inside the ring slider 110 (FIG. 68), whereas the inner slider 415 returns to position pushed by the spring 418, thereby closing the oil passage.

Figure 69:
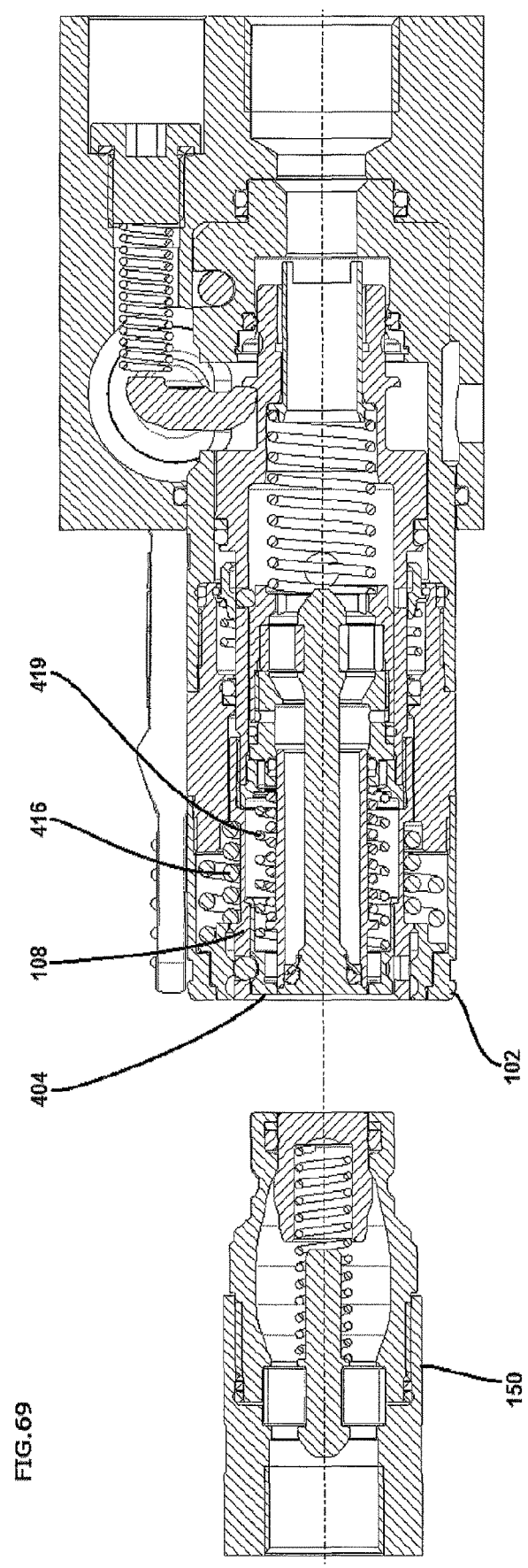

Finally, with the male coupling 150 and the female coupling 102 mutually disconnected (FIG. 69), the spring 416 has repositioned the ball body 108 and all the components connected thereto, where the outer slider 404 was repositioned by the spring 419.

Figures from 70 to 73 show the disconnection by actuating the lever 104.

Figure 70:
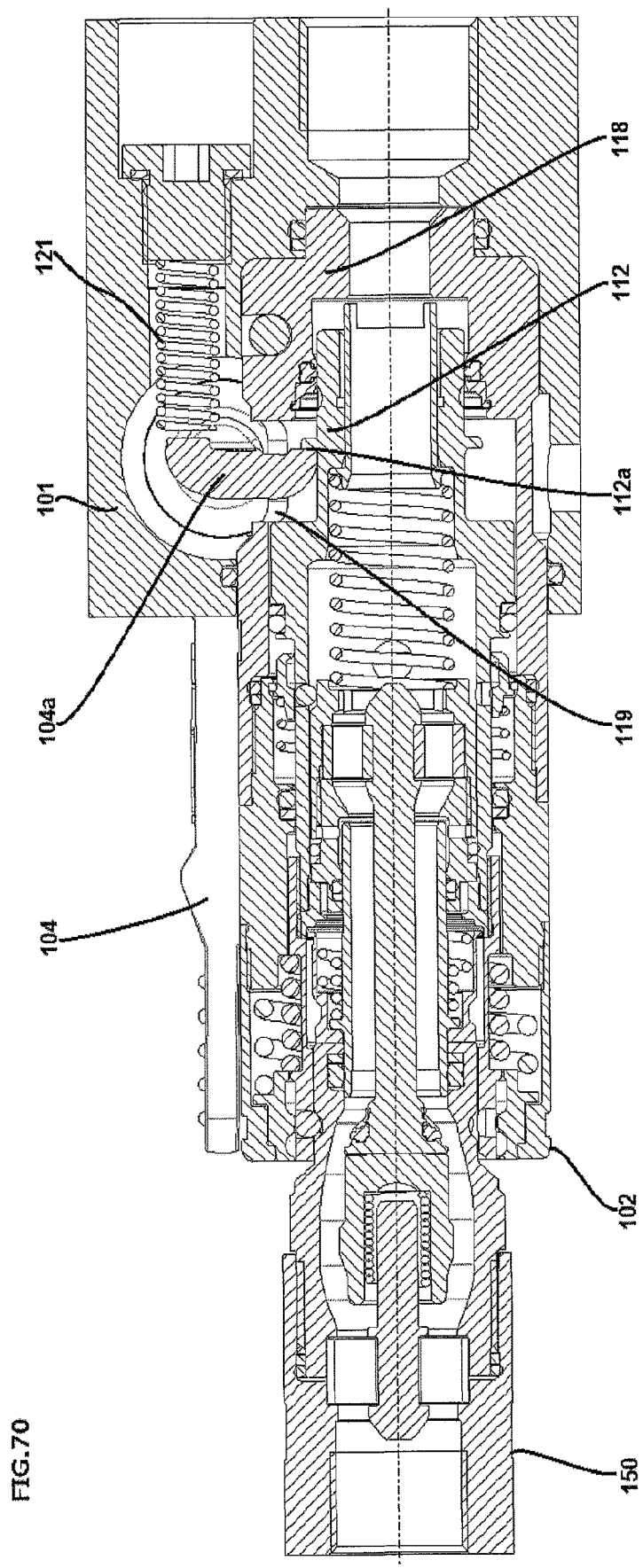

With the male coupling 150 and the female coupling 102 mutually connected (FIG. 70), the leg 104a is in contact with a surface 112a of the balancing piston 112 by virtue of the thrust of the spring 121.

Figure 71:
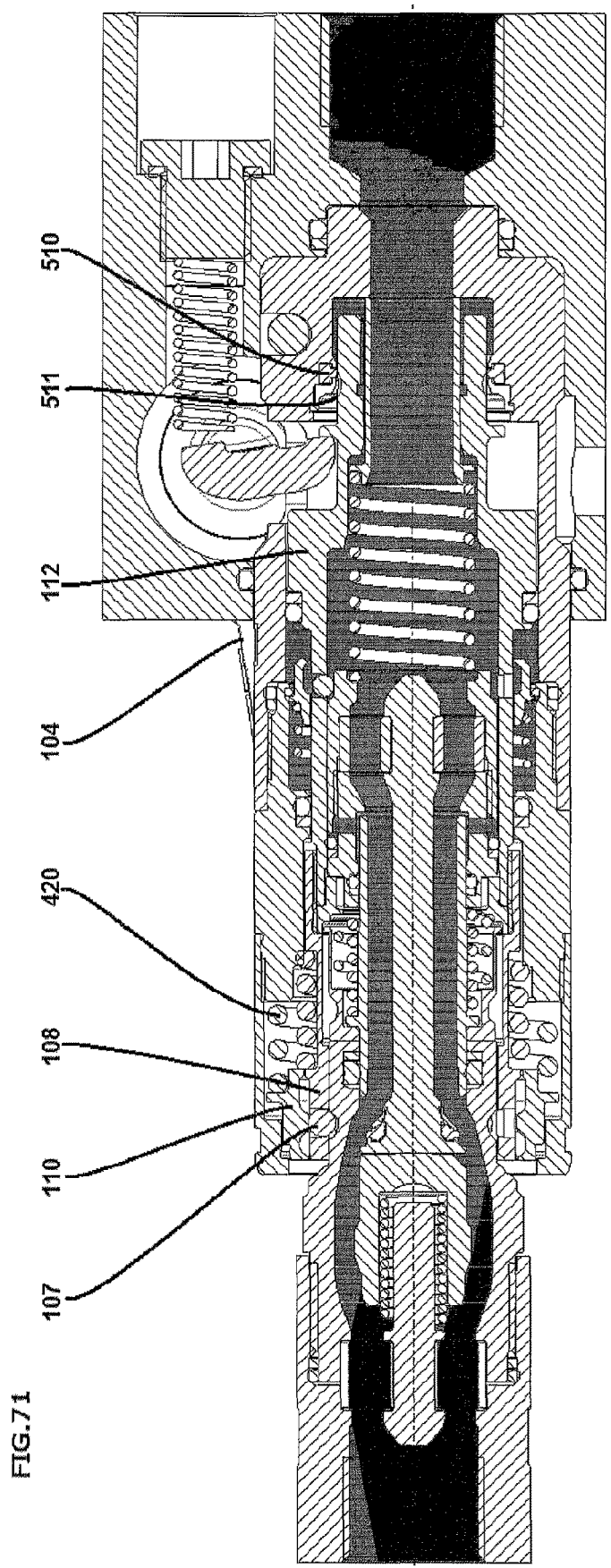

So, the retraction of the balancing piston 112 and of the ball body 108 and of all the components connected thereto is obtained by pushing the lever 104 downwards (FIG. 71). Furthermore, the balls 107, by virtue of the friction generated by the pressure thrust, move the ring slider 515 towards the inside, compressing the spring 420, where the seal 510 is at the decompression niches 511, thereby allowing the pressure relief.

Figure 72:
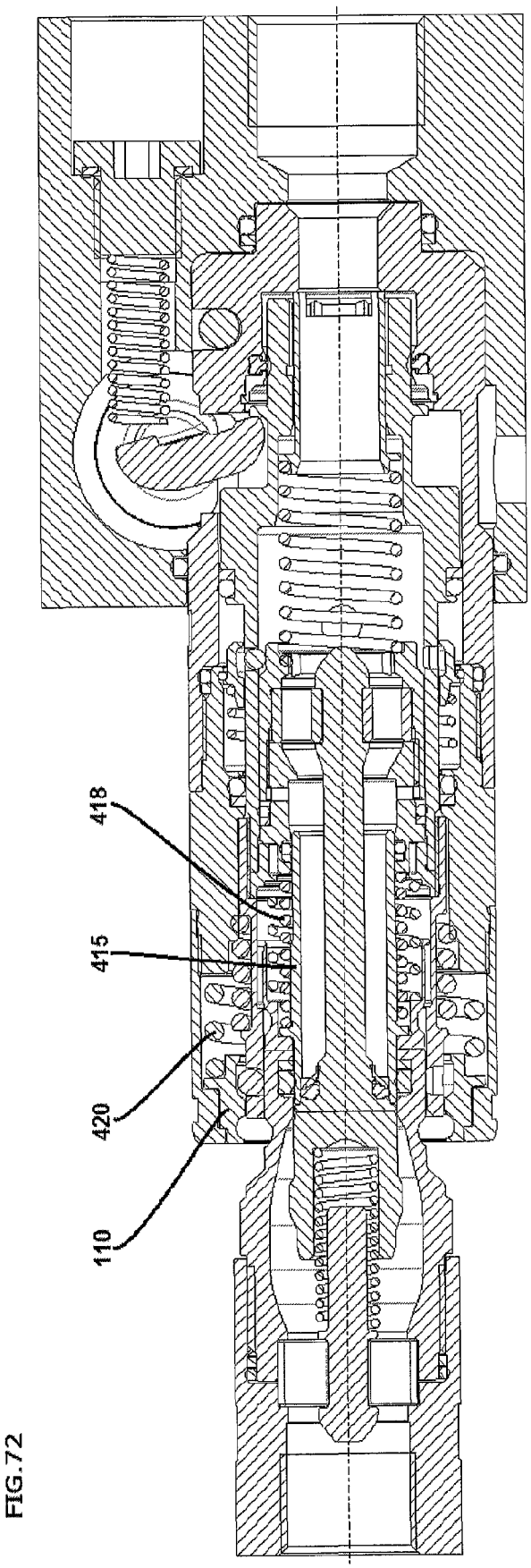

At this point, the ring slider 110 is repositioned by the spring 420 once the ball friction ceases; furthermore, the inner slider 415 returns to position pushed by the spring 418, thus closing the passage of oil (FIG. 72).

Figure 73:
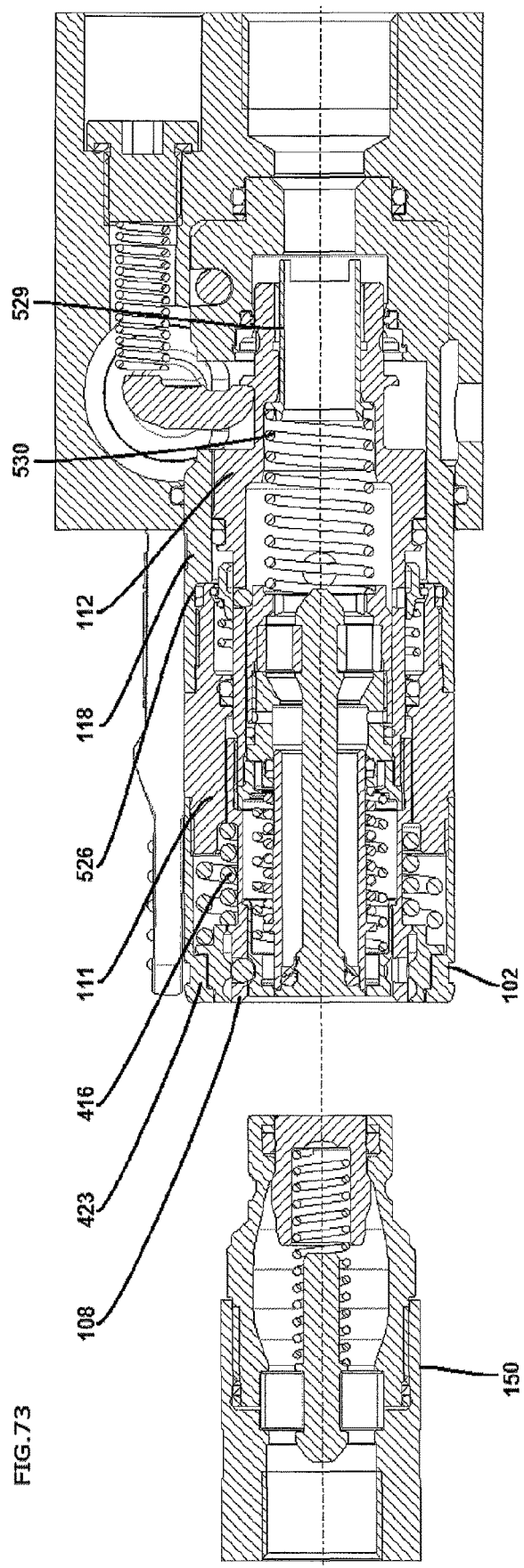

FIG. 73 shows the male coupling 150 and the cartridge 102 after the disconnection. It is worth noting that the spring 416 has repositioned the ball body 108 and all the components connected thereto. An O-ring type seal 526 is inserted between the central connector 111 and the adapter 118, an outer ring 423 being inserted to protect the inner components. A pusher 529 is inserted in the balancing piston 112 to vary the resting of the spring 530 in some steps and guaranteeing better reactivity of the cartridge.

We have thus demonstrated by means of the detailed description of the embodiments of the present invention shown in the drawings given above that the present invention achieves the set objects by overcoming the drawbacks found in the prior art.

In particular, the present invention:

allows the central flow of the oil or fluid in general (and thus guarantee less loss of load) which today is only possible in simple interface manifolds;

allows the simple and immediate replacement of the quick coupling (e.g. in case of malfunctioning);

offers the possibility of using and exchanging a wide range of couplings, in particular of ISO 7241 couplings and ISO 16028 couplings (of the agri or flat face type);

offers the possibility of using couplings of the same type (and/or referred to the same ISO standard), but with different size (e.g. size ½" or ¾"); allows both the connection and the disconnection also in the presence of residual pressure in one or both couplings and without using the lever (today possible exclusively in the case of manifolds with integrated cartridges by actuating the lever);

allows the connection and disconnection both with and without the actuation of the lever;

allows the recovery of possibly decompressed (clean) oil;

facilitates and simplifies the connection and disconnection operations in general;

guarantees a reliable connection without the risk of accidental disconnection;

allows to provide a compact system with small dimensions, low cost, and which can be installed on a wide range of equipment according to simple methods and equally low cost.

Although the present invention is explained above by means of a detailed description of the embodiments shown in the drawings, the present invention is not limited to the embodiments described above and shown in the drawings. On the contrary, all the modifications and/or variants of the embodiments described above and shown in the drawings, which will be obvious and immediate to those skilled in the art, are included in the scope of the present invention.

The scope of the present invention is thus defined by the claims.

The invention claimed is:

1. An hydraulic and/or pneumatic connector assembly, said assembly comprising an interface manifold which defines a first housing seat and a female coupling for an hydraulic and/or pneumatic quick connector, said female coupling being adapted to be alternatively connected to and disconnected from a corresponding male coupling of said connector, said female coupling comprising a female valve assembly with a valve adapted to be translated alternatively between a first closing position and a second opening position, wherein the flow of a fluid from said female coupling towards said male coupling and/or in the opposite direction is possible with said valve in said second opening position, wherein said female coupling comprises a hollow main body, with defines a first substantially tubular inner cavity with a longitudinal extension axis (A) for the flow of said fluid, said female valve assembly being housed in said first inner cavity of said hollow main body, said hollow main body comprising a first end portion housed in a first housing seat of said interface manifold, wherein said first inner cavity of said hollow main body is placed in fluid connection with at least one inner channel of said interface manifold, said female coupling comprising mechanical constraining means for mutually constraining said first end portion of said hollow main body in said first housing seat, wherein said mechanical constraining means are shaped so as to prevent both the rotation and the translation of said hollow main body with respect to said first housing seat, wherein said female valve assembly comprised a hollow inner body housed in said first inner cavity of said hollow main body which can be translated with respect to said hollow main body, said hollow inner body defining a second inner cavity in fluid communication with said first inner cavity, said first hollow inner body comprising switching means which can be engaged by a switching lever constrained to and partially housed in said interface manifold, wherein said lever is adapted to be rotated with respect to a rotation axis which is substantially perpendicular with respect to said longitudinal extension axis (A) of said first inner cavity of said hollow main body, wherein the rotation of said lever in a first rotation direction results in said switching means being engaged and thus in the translation of said hollow inner body in a first direction, wherein said lever comprises a grip external to said interface manifold and an engagement leg housed inside said interface manifold and extending across a through opening of said hollow main body, and wherein said assembly comprises elastic contrasting means housed in said interface manifold, the rotation of said lever in said first rotation direction occurring against the elastic bias applied by said elastic contract means.

2. The assembly according to claim 1, wherein said elastic contrasting means comprise a helical spring, wherein said lever comprises a second leg which extends in direction opposite to said first leg, and wherein said helical spring is engaged by said second leg.

3. The assembly according to claim 1, wherein said mechanical constraining means are shaped so as to prevent both the rotation of said hollow main body with respect to any rotation axis substantially parallel to said longitudinal extension axis (A) of said first inner cavity and the translation of said hollow main body along any direction substantially parallel to said longitudinal extension axis (A) of said first inner cavity.

4. The assembly according to claim 1, wherein said mechanical constraining means comprise an engagement seat defined by said first end portion of said hollow main body and a pin or peg-shaped constraining member adapted to be inserted in a second housing seat of said interface manifold so as to engage said engagement seat.

5. The assembly according to claim 4, wherein said engagement seat of said first end portion comprises a groove which extends in depth from the outer surface of said first end portion of said hollow main body and along a direction which is substantially perpendicular to said longitudinal extension axis (A) of said first inner cavity of said hollow main body.

6. The assembly according to claim 1, wherein said switching means comprise a protrusion which extends from the outer surface of said hollow inner body across said through opening of said main hollow body.

7. The assembly according to claim 6, wherein said protrusion has an annular shape and defines an engagement surface which is substantially perpendicular to said longitudinal extension axis (A) of said first inner cavity of the hollow main body, and wherein said engagement surface can be engaged by said lever.

* * * * *